(12) United States Patent
Flinn et al.

(10) Patent No.: US 10,783,464 B2
(45) Date of Patent: Sep. 22, 2020

(54) METHOD AND DEVICE FOR TEMPORALLY SEQUENCED ADAPTIVE RECOMMENDATIONS OF ACTIVITIES

(75) Inventors: Steven Dennis Flinn, Sugar Land, TX (US); Naomi Felina Moneypenny, Houston, TX (US)

(73) Assignee: ManyWorlds, Inc., Brenham, TX (US)

( * ) Notice: Subject to any disclaimer, the term of this patent is extended or adjusted under 35 U.S.C. 154(b) by 1442 days.

(21) Appl. No.: 13/315,198

(22) Filed: Dec. 8, 2011

(65) Prior Publication Data
US 2012/0089915 A1     Apr. 12, 2012

Related U.S. Application Data

(60) Division of application No. 13/270,054, filed on Oct. 10, 2011, now abandoned, which is a continuation of
(Continued)

(51) Int. Cl.
*G06Q 10/06* (2012.01)
*G06Q 30/02* (2012.01)
(Continued)

(52) U.S. Cl.
CPC ............. *G06Q 10/06* (2013.01); *G06F 16/60* (2019.01); *G06Q 10/0631* (2013.01);
(Continued)

(58) Field of Classification Search
CPC .............. G06Q 10/06; G06Q 10/0631; G06Q 10/0633; G06Q 30/0269; G06Q 30/0631; G06F 16/60
See application file for complete search history.

(56) References Cited

U.S. PATENT DOCUMENTS

| 5,375,244 A | 12/1994 | McNair |
| 5,754,939 A | 5/1998 | Herz et al. |

(Continued)

FOREIGN PATENT DOCUMENTS

| WO | PCT/US2004/037176 | 6/2005 |
| WO | PCT/US2004/038692 | 6/2005 |

OTHER PUBLICATIONS

Maria Barra, et al. "'Common' Web Paths in a Group Adaptive System," 2003 Proceedings of the Fourteenth ACM Conference on Hypertext and Hypermedia (2003).
(Continued)

*Primary Examiner* — Matthew S Gart
*Assistant Examiner* — Stephen S Swartz

(57) ABSTRACT

A method and device for temporally sequenced recommendations of activities delivers to users temporally sequenced objects comprising user activities, wherein the delivered objects are selected based, at least in part, on inferences of preferences from usage behaviors. The delivered objects may include activities associated with processor-based devices in addition to human activities. Variations of the system and method include delivering the temporally sequenced objects in accordance with the contents of the objects and user feedback with regard to the objects. Information as to why objects were delivered to users may be provided to the users.

4 Claims, 54 Drawing Sheets

Related U.S. Application Data application No. 11/559,145, filed on Nov. 13, 2006, now abandoned, which is a continuation of application No. PCT/US2005/011951, filed on Apr. 8, 2005.

(60) Provisional application No. 60/572,565, filed on May 20, 2004.

(51) Int. Cl.
    *G06Q 30/06*     (2012.01)
    *G06F 16/60*     (2019.01)

(52) U.S. Cl.
    CPC ..... *G06Q 10/0633* (2013.01); *G06Q 30/0206* (2013.01); *G06Q 30/0269* (2013.01); *G06Q 30/0631* (2013.01)

(56) References Cited

U.S. PATENT DOCUMENTS

| | | | |
|---|---|---|---|
| 5,790,426 A | 8/1998 | Robinson | |
| 5,867,799 A | 2/1999 | Lang et al. | |
| 5,870,559 A | 2/1999 | Leshem et al. | |
| 5,950,200 A | 9/1999 | Sudai et al. | |
| 5,999,942 A * | 12/1999 | Talati | |
| 6,029,195 A | 2/2000 | Herz | |
| 6,041,311 A | 3/2000 | Chislenko et al. | |
| 6,154,723 A * | 11/2000 | Cox | 704/270 |
| 6,321,221 B1 | 11/2001 | Bieganski | |
| 6,326,946 B1 | 12/2001 | Moran et al. | |
| 6,374,290 B1 | 4/2002 | Scharber et al. | |
| 6,438,579 B1 | 8/2002 | Hosken | |
| 6,571,279 B1 | 5/2003 | Herz et al. | |
| 6,611,822 B1 * | 8/2003 | Beams et al. | 706/11 |
| 6,647,257 B2 * | 11/2003 | Owensby | 455/414.1 |
| 6,771,765 B1 * | 8/2004 | Crowther et al. | 379/265.09 |
| 6,795,826 B2 | 9/2004 | Flinn et al. | |
| 6,801,227 B2 | 10/2004 | Bocionek et al. | |
| 6,834,195 B2 * | 12/2004 | Brandenberg et al. | 455/456.3 |
| 6,845,374 B1 | 1/2005 | Oliver et al. | |
| 6,871,163 B2 | 3/2005 | Hiller et al. | |
| 6,873,967 B1 * | 3/2005 | Kalagnanam et al. | 705/26.44 |
| 6,912,505 B2 | 6/2005 | Linden et al. | |
| 6,922,672 B1 | 7/2005 | Hailpern | |
| 6,934,748 B1 | 8/2005 | Louviere | |
| 6,970,871 B1 * | 11/2005 | Rayburn | |
| 6,981,040 B1 | 12/2005 | Konig | |
| 7,073,129 B1 | 7/2006 | Robarts et al. | |
| 7,110,989 B2 | 9/2006 | Iemoto et al. | |
| 7,188,153 B2 | 3/2007 | Lunt et al. | |
| 7,324,963 B1 | 1/2008 | Ruckart | |
| 7,366,759 B2 | 4/2008 | Trevithick | |
| 7,401,121 B2 * | 7/2008 | Wong et al. | 709/204 |
| 7,493,294 B2 | 2/2009 | Flinn et al. | |
| 7,512,612 B1 | 3/2009 | Akella et al. | |
| 7,519,912 B2 | 4/2009 | Moody et al. | |
| 7,526,458 B2 | 4/2009 | Flinn et al. | |
| 7,526,459 B2 | 4/2009 | Flinn et al. | |
| 7,526,464 B2 | 4/2009 | Flinn et al. | |
| 7,539,652 B2 | 5/2009 | Flinn et al. | |
| 7,558,748 B2 | 7/2009 | Ehring et al. | |
| 7,568,148 B1 | 7/2009 | Bharat et al. | |
| 7,571,183 B2 | 8/2009 | Renshaw et al. | |
| 7,606,772 B2 | 10/2009 | Flinn et al. | |
| 7,630,986 B1 * | 12/2009 | Herz et al. | |
| 7,818,392 B1 | 10/2010 | Martino et al. | |
| 7,904,341 B2 | 3/2011 | Flinn et al. | |
| 7,904,511 B2 * | 3/2011 | Ryan et al. | 709/204 |
| 7,921,036 B1 | 4/2011 | Sharma et al. | |
| 7,958,457 B1 | 6/2011 | Brandenberg et al. | |
| 8,065,383 B2 | 11/2011 | Carlson et al. | |
| 8,069,076 B2 | 11/2011 | Oddo | |
| 8,108,245 B1 | 1/2012 | Hosea et al. | |
| 2001/0049623 A1 | 12/2001 | Aggarwal et al. | |
| 2002/0049738 A1 | 4/2002 | Epstein | |
| 2002/0052873 A1 | 5/2002 | Delgado et al. | |
| 2002/0069102 A1 | 6/2002 | Vellante et al. | |
| 2002/0093537 A1 * | 7/2002 | Bocioned et al. | 345/777 |
| 2002/0161664 A1 | 8/2002 | Shaya et al. | |
| 2002/0180805 A1 | 12/2002 | Chickering et al. | |
| 2003/0023427 A1 | 1/2003 | Cassin et al. | |
| 2003/0028498 A1 * | 2/2003 | Hayes-Roth | 706/17 |
| 2003/0055666 A1 | 3/2003 | Roddy | |
| 2003/0149612 A1 | 8/2003 | Berghofer et al. | |
| 2003/0154126 A1 | 8/2003 | Gehlot et al. | |
| 2003/0216960 A1 | 11/2003 | Postrel | |
| 2003/0225550 A1 * | 12/2003 | Hiller et al. | 702/186 |
| 2003/0233374 A1 | 12/2003 | Spinola et al. | |
| 2004/0068552 A1 | 4/2004 | Kotz et al. | |
| 2004/0186776 A1 | 9/2004 | Llach | |
| 2005/0097008 A1 | 5/2005 | Ehring et al. | |
| 2005/0097204 A1 | 5/2005 | Horowitz et al. | |
| 2005/0267973 A1 | 12/2005 | Carlson et al. | |
| 2006/0042483 A1 | 3/2006 | Work et al. | |
| 2006/0143214 A1 | 6/2006 | Teicher | |
| 2006/0230021 A1 | 8/2006 | Diab et al. | |
| 2007/0287473 A1 * | 12/2007 | Dupray | 455/456.1 |
| 2013/0073473 A1 * | 3/2013 | Heath | G06Q 30/06 705/319 |

OTHER PUBLICATIONS

Johan Bollen, "Group User Models for Personalized Hyperlink Recommendations," 1892 Lecture Notes in Computer Science 38-50 (2000).

A. Dieberger, et al., "Social Navigation: Techniques for Building More Usable Systems," Interactions 36-45 (2000).

Bamshad Mobasher, et al, "Creating Adaptive Web Sites Through Usage-Based Clustering of URLs," 1999 Workshop on Knowledge and Data Engineering Exchange 19-25 (1999).

Nan Niu, "Understanding Web Usage for Dynamic Web-Site Adaptation: A Case Study," 2002 Proceedings of the Fourth International Workshop on Web Site Evolution (2002).

Cyrus Shahabi & Yi-Shin Chen, "An Adaptive Recommendation System without Explicit Acquisition of User Relevance Feedback," 14 Distributed and Parallel Databases 173-192 (2003).

Osmar R. Zaiane, "Building a Recommender Agent for e-Learning Systems," Proceedings of the International Conference on Computers in Education (2002).

Jinmook Kim, et al., "Using Implicit Feedback for User Modeling in Internet and Internet Searching," College Park: College of Library and Information Services, University of Maryland (2000).

R. Cowie, et al., "Emotion Recognition in Human-Computer Interaction," IEEE Signal Processing Magazine 32-80 (2001).

Rosalind W. Picard & Jonathan Klein, "Computers that Recognise and Respond to User Emotion: Theoretical and Practical Implications," MIT Media Lab Tech Report 538 (2001).

Joannis Vlachakis, et al., "An Integrated Web Personalization Platform Based on Content Structures and Usage Behavior" (2000).

Tarek Helmy, et al., "Adaptive Exploiting User Profile and Interpretation Policy for Searching and Browsing the Web on KODAMA System," Graduate School of Information Science and Electrical Engineering, Kyushu University (2000).

Mike Reddy and Graham P. Fletcher, "An Adaptive Mechanism for Web Browser Cache Management," IEEE Internet Computing 78-81, Jan.-Feb. 1998.

Cheung et al., "Mining customer product ratings for personalized marketing," Decision Support Systems 231-243 (2003).

Aguilera, M., et al., Matching Events in a Content-based Subscription System. (1999) In PODC'99 Atlanta, GA, pp. 53-61

Lukose, R. et al., SHOCK: Communicating with Computational Messages and Automatic Private Profiles. (2003) WWW2003, May 20-24, Budapest, Hungary.

Co-pending US. Appl. No. 13/337,489 Office Action dated Aug. 27, 2012

U.S. Appl. No. 11/559,145 Office Action dated May 18, 2012.

U.S. Appl. No. 13/270,054 Office Action dated May 9, 2012.

(56) References Cited

OTHER PUBLICATIONS

U.S. Appl. No. 13/337,489 Office Action dated May 22, 2012.
U.S. Appl. No. 13/337,500 Office Action dated Jun. 6, 2012.

* cited by examiner

Process Lifecycle Management Framework

Innovation Network Process

METHOD AND DEVICE FOR TEMPORALLY SEQUENCED ADAPTIVE RECOMMENDATIONS OF ACTIVITIES

CROSS-REFERENCE TO RELATED APPLICATIONS

The present application is a divisional of U.S. patent application Ser. No. 13/270,054, filed on Oct. 10, 2011, which is a continuation of U.S. patent application Ser. No. 11/559,145, filed on Nov. 13, 2006, which is a continuation of International Patent Application No. PCT/US2005/011951, filed on Apr. 8, 2005, which claimed benefit under 35 U.S.C. § 119(e) to U.S. Provisional Patent Application No. 60/572,565, filed May 20, 2004.

FIELD OF THE INVENTION

This invention relates to extending the business process paradigm so as to make processes more explicitly adaptive over time. More specifically, adaptive recombinant processes relates to processes that automatically structure and re-structure themselves so as to deliver increasing value to the participants in the processes over time.

BACKGROUND OF THE INVENTION

The business process paradigm was first introduced in a rigorous form by Rummler and Brache in the late 1980's, and was increasingly popularized by authors such as Michael Hammer, and a wide range of business consultants, during the 1990's. The terms "process redesign" or "process reengineering" have been typically used to denote the explicit establishment of processes that are optimized for specific business requirements. It should be understood that although the modifier "business" may be applied to the term "process" herein, processes are relevant to, and may apply to, non-business organizations or institutions, as well as individuals.

Business processes can be broadly defined as a set of activities that collectively perform a business function. The activities within a process are typically performed in a specific sequence, with the sequence of activities subsequent to any specified activity being potentially dependent on conditions and decisions taken at the previous activity step.

The prior art associated with process design constitutes developing processes that are optimized for current business conditions, while attempting to build in enough flexibility in the design of the process for the process to remain effective if business conditions change within a limited range over time. Training of individuals performing tasks within processes is often a mixture of formalized training, classroom and/or on-line training, as well as on-the-job experience. In general, however, the current process paradigm is not one of adaptive processes; that is, processes that can effectively change as business conditions change without significant, explicit human redesign efforts, and processes that adapt to the on-going learning needs, and more generally, the preferences or interests, of individual participants in the processes. Specifically, the current process paradigm does not have a built-in learning mechanism, resulting in a significant penalty in efficiency and effectiveness.

SUMMARY OF THE INVENTION

In accordance with the embodiments described herein, a method and system for adaptive recombinant processes is disclosed.

The present invention, "adaptive recombinant processes," is a method and system for embedding adaptation and learning within any type of process. Adaptive recombinant processes enable design and implementation of processes that automatically capture process participant behaviors associated with the use of, interaction with, or, most generally, participation in, the associated process. These process participant behaviors include both individual and community usage behaviors. The resulting adaptive process can thereby effectively reconfigure itself on a continuous and potentially real-time basis, based, at least in part, on inferences of preferences or interests derived from process interactions by participants in the process. Such inferences may be conducted on an automatic or semi-automatic basis; in either case, application of the inferences can potentially dramatically reduce explicit, manual process design and redesign efforts. Adaptive recombinant processes can also dramatically reduce traditional training costs, and effectively integrates the domains of e-learning and knowledge management directly within business processes.

Furthermore, adaptive recombinant processes can enable the syndication of processes or elements of processes among organizations, which can then be automatically or semi-automatically integrated with existing processes or process elements. This recombinant process approach can significantly increase process adaptiveness and increase efficiency through the maximizing of reuse. Furthermore, an evolutionary approach may be used to create a diversity of processes that can be evaluated automatically or semi-automatically, and then preferentially combined based on evaluation results.

Adaptive recombinant processes enables both increasing the adaptiveness of existing classes of processes and the enablement of entirely new types of processes that were not feasible with prior methods. An example of increasing the adaptiveness of existing processes is building in "real-time learning" within any instance of existing classes of processes, to create an adaptive "cockpit" that facilitates process learning, use and execution. Examples of new types of processes enabled by adaptive recombinant processes include processes that are underpinned by syndication and/or recombination of processes and sub-processes across a series or network of organizations. Such capabilities may be applied to facilitate, for example, marketing and business development, product or service/solution development and delivery, innovation, coordinated operations, and/or collaborative learning. Specific examples of new types of processes enabled by adaptive recombinant processes are adaptive online asset management, adaptive viral marketing processes, adaptive sales and marketing processes, adaptive commercial processes such as adaptive product and service bundling and pricing, processes enabled by location-aware and collectively adaptive systems, and adaptive publishing processes.

Adaptive recombinant processes can apply the fuzzy content network approach as defined in U.S. Pat. No. 6,795,826, entitled "Fuzzy Content Network Management and Access," and adaptive recombinant systems approaches as defined in PCT Patent Application No. PCT/US04/37176, entitled "Adaptive Recombinant Systems," filed on Nov. 4, 2004, both of which are incorporated by reference herein, as if set forth in their entirety.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with the embodiments described herein, a method and a system for development, management and application of adaptive processes is disclosed.

Processes

Processes are ubiquitous throughout the business world, and apply as well to non-business institutions such as government and non-profit organizations and institutions. In the following descriptions of processes and the application of adaptive recombinant processes, business examples will typically be used, but it should be understood that the descriptions of processes and related features, and the application of adaptive recombinant processes, extends to non-business institutions and organizations.

Processes can be defined as categorizations of activities, along with associated inputs and outputs. A process may apply to, but is not limited to, the following general application areas: marketing, sales, price determination, innovation, research and development (R&D), product development, service and solutions development, business development, tangible or intangible asset management, manufacturing, supply chain management, logistics and transportation, procurement, finance and accounting, investment and portfolio management, human resources, education, entertainment, information technology, security, military, legal, administrative processes and business strategy.

FIGS. 1A, 1B, 2A, 2B and 3 describe prior art and definitions associated with processes.

Figure 1A:
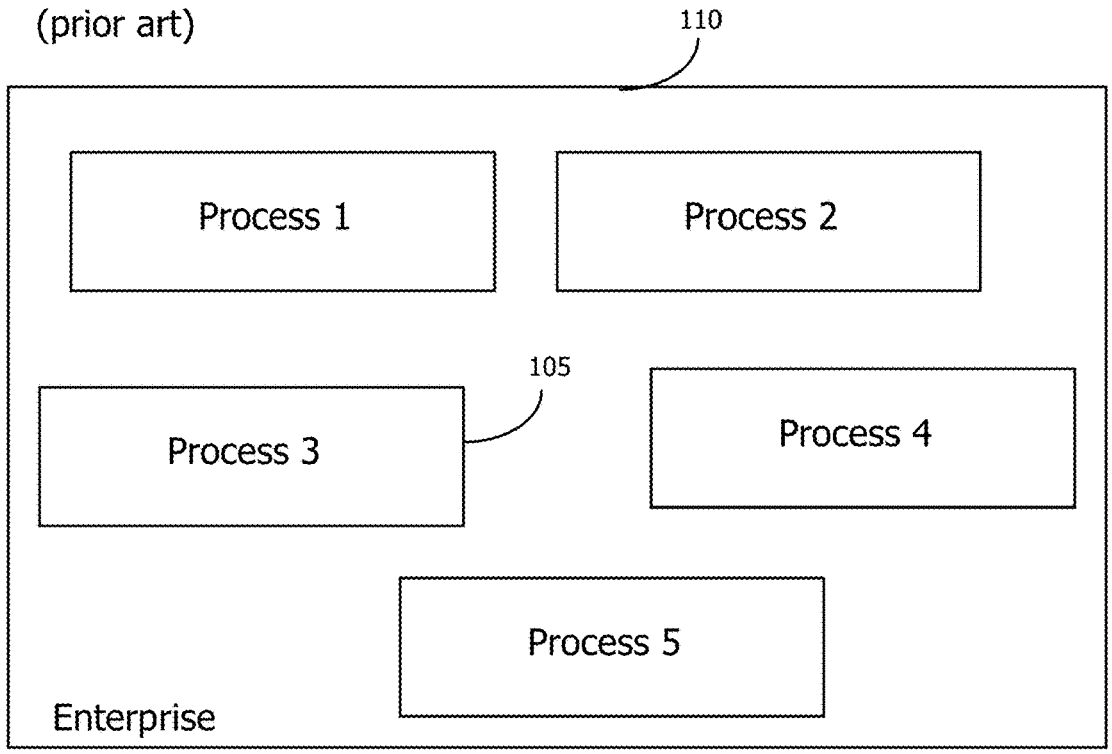
FIGS. 1A and 1B are block diagrams of process and organization topologies, according to the prior art.

FIG. 1A depicts a business enterprise 110 including a plurality of processes, a specific example being "process 3" 105. A business may include one or more processes. It is a typical practice to determine a number of processes that can be effectively remembered and managed by people in the associated business—for example, seven processes (plus or minus two) is a commonly selected number of processes for an organization. Although not explicitly shown in FIG. 1A, each process may have one or more linkages to another process. The linkages may denote a workflow between the processes, or the linkage may denote an information flow, or a linkage may denote both workflow and information flow.

Figure 1B:
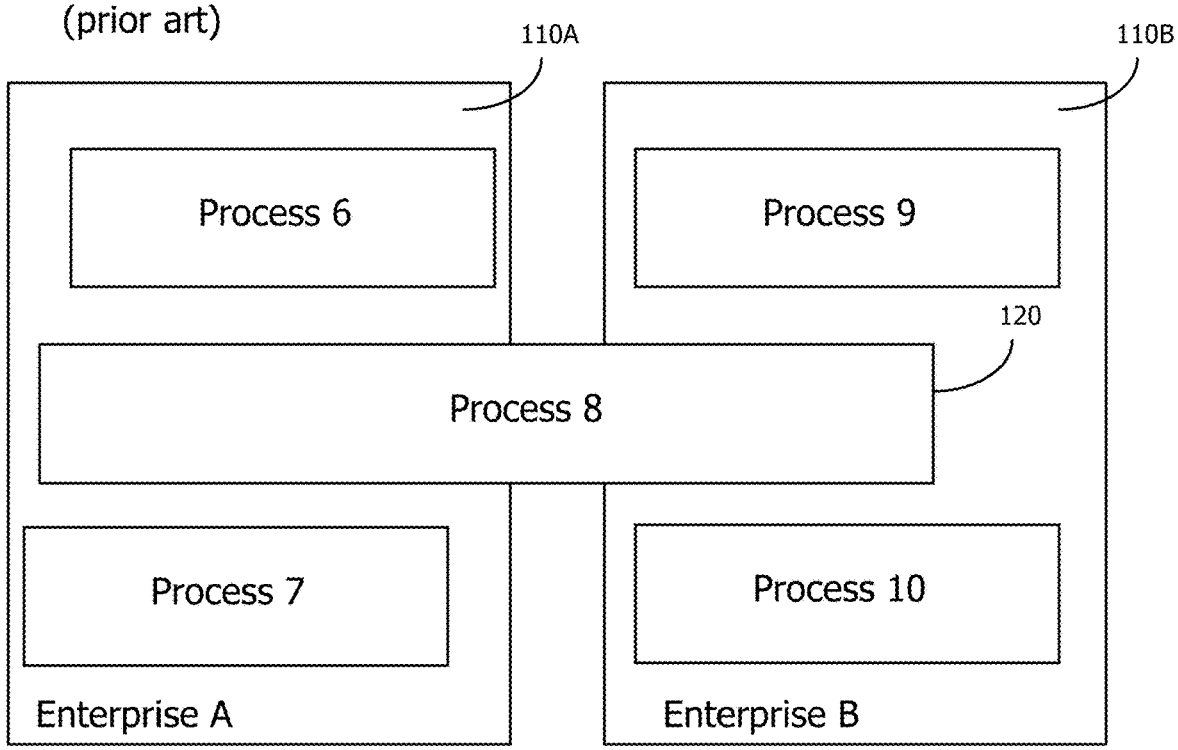

As depicted in FIG. 1B, processes may extend across businesses or enterprises, or most broadly, organizations. For example, in FIG. 1B, "Process 8" 120 is shown extending across "Enterprise A" 110A and "Enterprise B" 110B. It should be understood that, in general, multiple processes may extend across multiple enterprises or organizations.

Figure 2A:
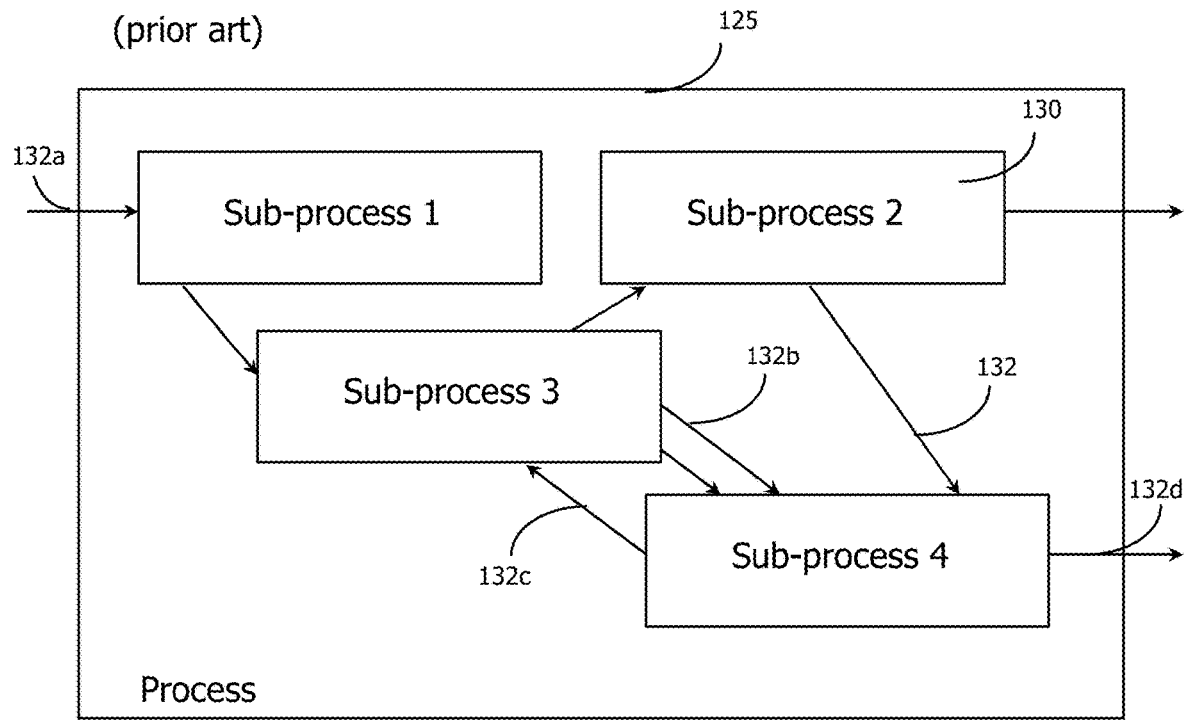
FIGS. 2A and 2B are block diagrams of sub-processes and activities, according to the prior art.

FIG. 2A illustrates that each process 125 may include one or more sub-processes. As in the case of processes, sub-processes may have one or more directed linkages 132 to other sub-processes within the process, or to processes outside the process within which the sub-process exists. These external links may constitute inbound links 132a or outbound links 132d. There may exist a plurality of links between any two sub-processes, and the plurality of links may include inbound 132b or outbound links 132c. Although not explicitly shown in FIG. 2A, each sub-process may contain one or more other sub-processes, and this recursive decomposition of sub-processes can continue without limit. It should be noted, as defined herein, that the only essential distinguishing feature of a sub-process with regard to a process is that a sub-process is understood to be a subset of a process. Where the term sub-process is used herein, it is understood that the term process could be used without loss of generality.

Figure 2B:
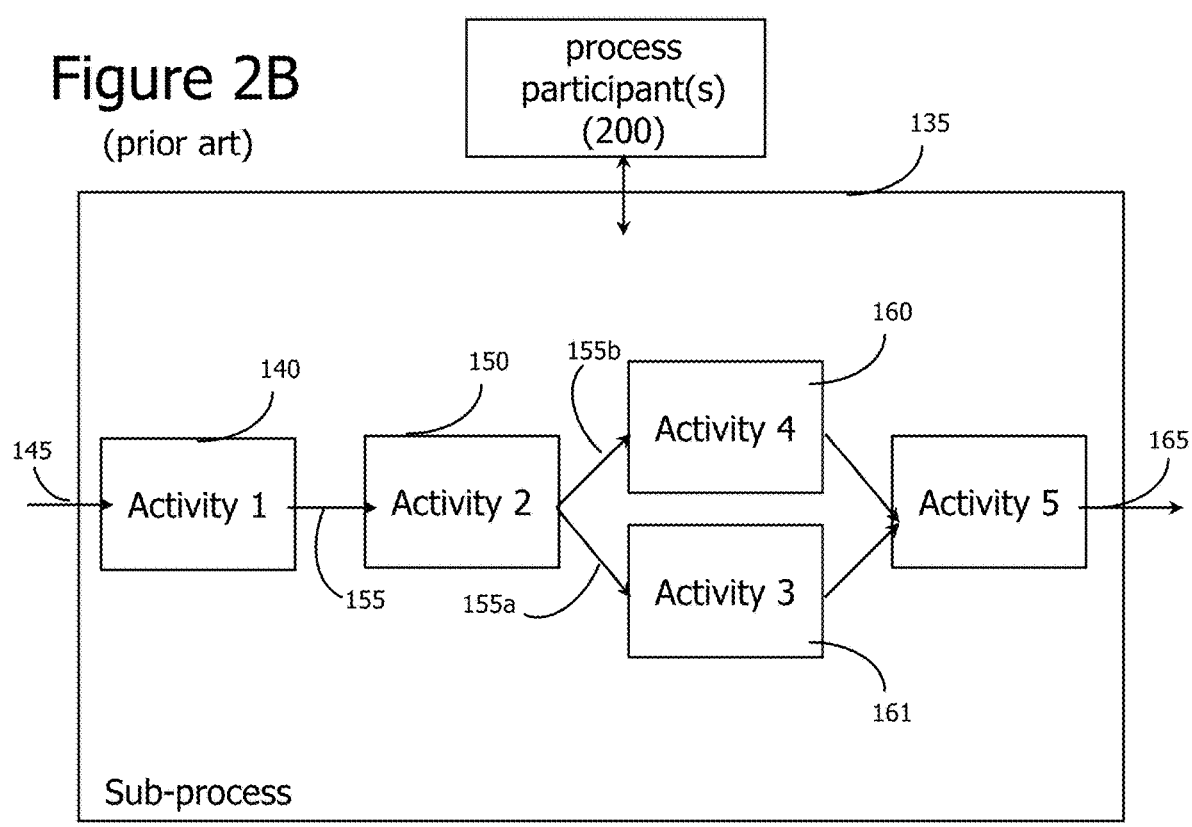

FIG. 2B depicts a sub-process. A sub-process 135 is comprised of other sub-processes (not shown), and/or a series of activities, for example, "Activity 1" 140. These activities are conducted by process participants 200. In a business setting, each activity typically represents a unit of work to be conducted in a prescribed manner by one or more participants 200 in the process, and possibly according to a prescribed workflow. However, as defined herein, an activity may also simply constitute a process participant 200 action or behavior. For example, a process participant 200 for a sales process might be a prospective customer, and a behavior of the prospective customer may constitute an activity. In such cases a process participant, for example, a customer or prospective customer, may not be aware that their behaviors or interactions with a process constitute conducting a formally defined activity, although from the perspective of another process participant or the process owner, the activity may constitute a formally defined activity.

Participants in a process 200, or "process participants," are defined as individuals that perform some activity within a process, or otherwise interact with a process, or provide input to, or use the output from, a process or sub-process. For example, a process participant in a sales process may include sales people that perform selling activities, but may also include customers or prospective customers that interact with the sales process, including the review and consideration of, and/or the purchasing of goods or services. Further, managers who rely on input from, and/or provide guidance to, the sales process may be considered process participants in the sales process. Further, specific actions or behaviors of the customer or prospective customer may be defined as activities corresponding to the process or sub-process.

Although more than one activity is depicted in FIG. 2B, it should be understood that a process or sub-process may include only a single activity.

Any two activities may be linked, which implies a temporal sequencing or workflow, as for example the linkage 155 between "Activity 1" 140 and "Activity 2" 150. An activity may be cross-linked, back linked, or forward linked to more than one other activity. An activity may contain conditional decisions that determine which forward links to other activities, such as depicted by links 155a and 155b, are selected during execution of the antecedent activity 150. Parallel activities may exist as represented by "Activity 3" 161 and "Activity 4" 160. Inbound links 145 to activities of the sub-process 135 from other processes, sub-processes or activities may exist, as well as outbound links 165 from activities of the sub-process 135 to other processes, sub-processes, or activities.

Figure 3:
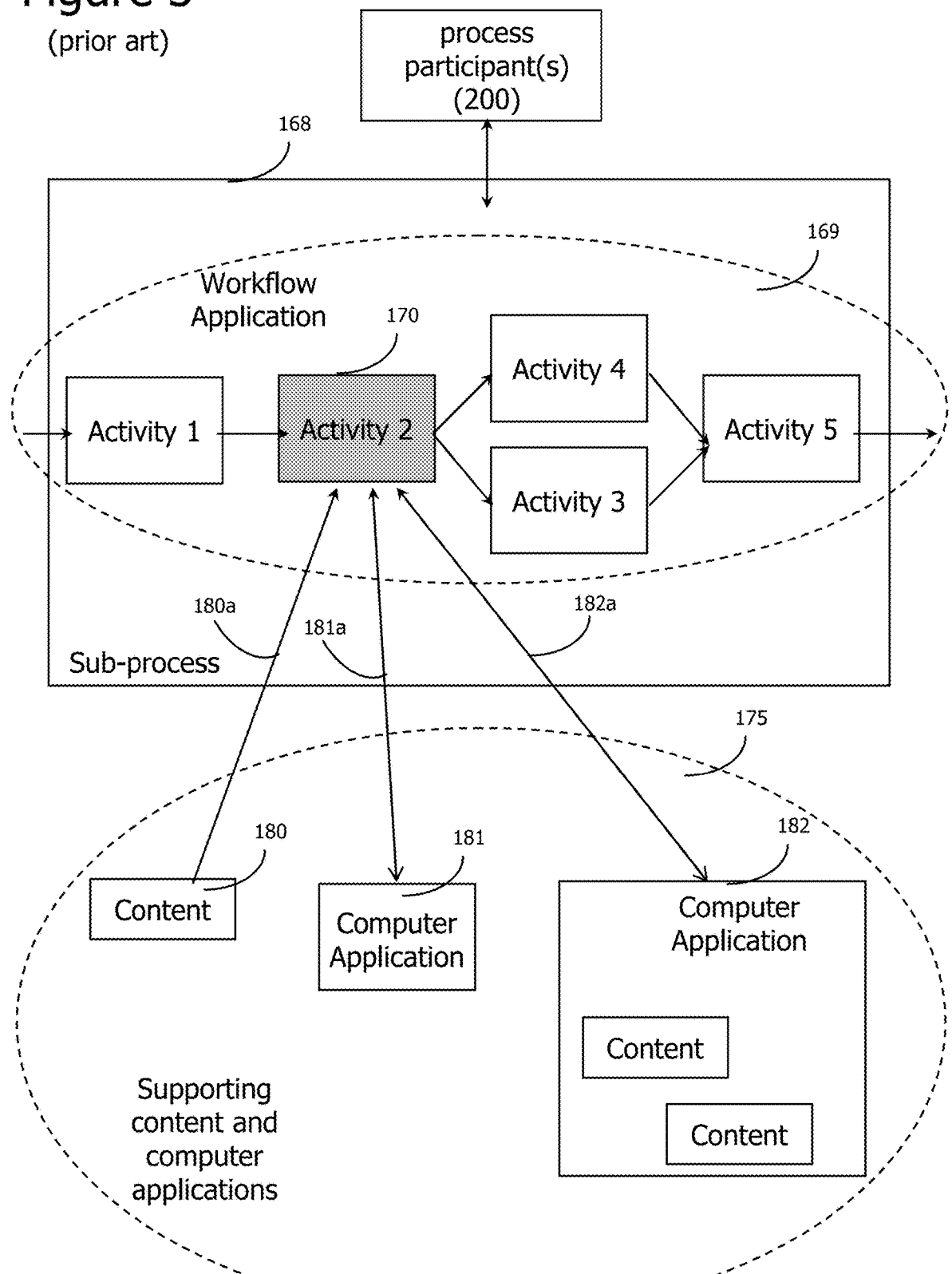
FIG. 3 is a block diagram describing the relationship between a process and associated supporting content and computer applications, according to the prior art.

FIG. 3 illustrates a general approach to information and computing infrastructure support for processes. The workflow of activities within a process or sub-process 168 may be managed by a computer-based workflow application 169 that enables the appropriate sequencing of workflow. Each activity, as for example "Activity 2" 170, may be supported by on-line content or computer applications 175. On-line content or computer applications 175 include pure content 180, a computer application 181, and a computer application that includes content 182. Information or content may be accessed by the sub-process 168 from each of these sources, shown as content access 180*a*, information access 181*a*, and information access 182*a*.

For example, content 180 may be accessed 180*a* (a content access 180*a*) as an activity 170 is executed. Although multiple activities are depicted in FIG. 3, a process or sub-process may include only one activity. The term "content" is defined broadly herein, to include text, graphics, video, audio, multi-media, computer programs or any other means of conveying relevant information. During execution of the activity 170, an interactive computer application 181 may be accessed. During execution of the activity 170, information 181*a* may be delivered to, as well as received from the computer application 181. A computer application 182, accessible by process participants 200 during execution of the activity 170, and providing and receiving information 182*a* during execution of the activity 170, may also contain and manage content such that content and computer applications and functions that support an activity 170 may be combined within a computer application 182. An unlimited number of content and computer applications may support a given activity, sub-process or process. A computer application 182 may directly contain the functionality to manage workflow 169 for the sub-process 168, or the workflow functionality may be provided by a separate computer-based application.

Adaptive Processes

Figure 4A:
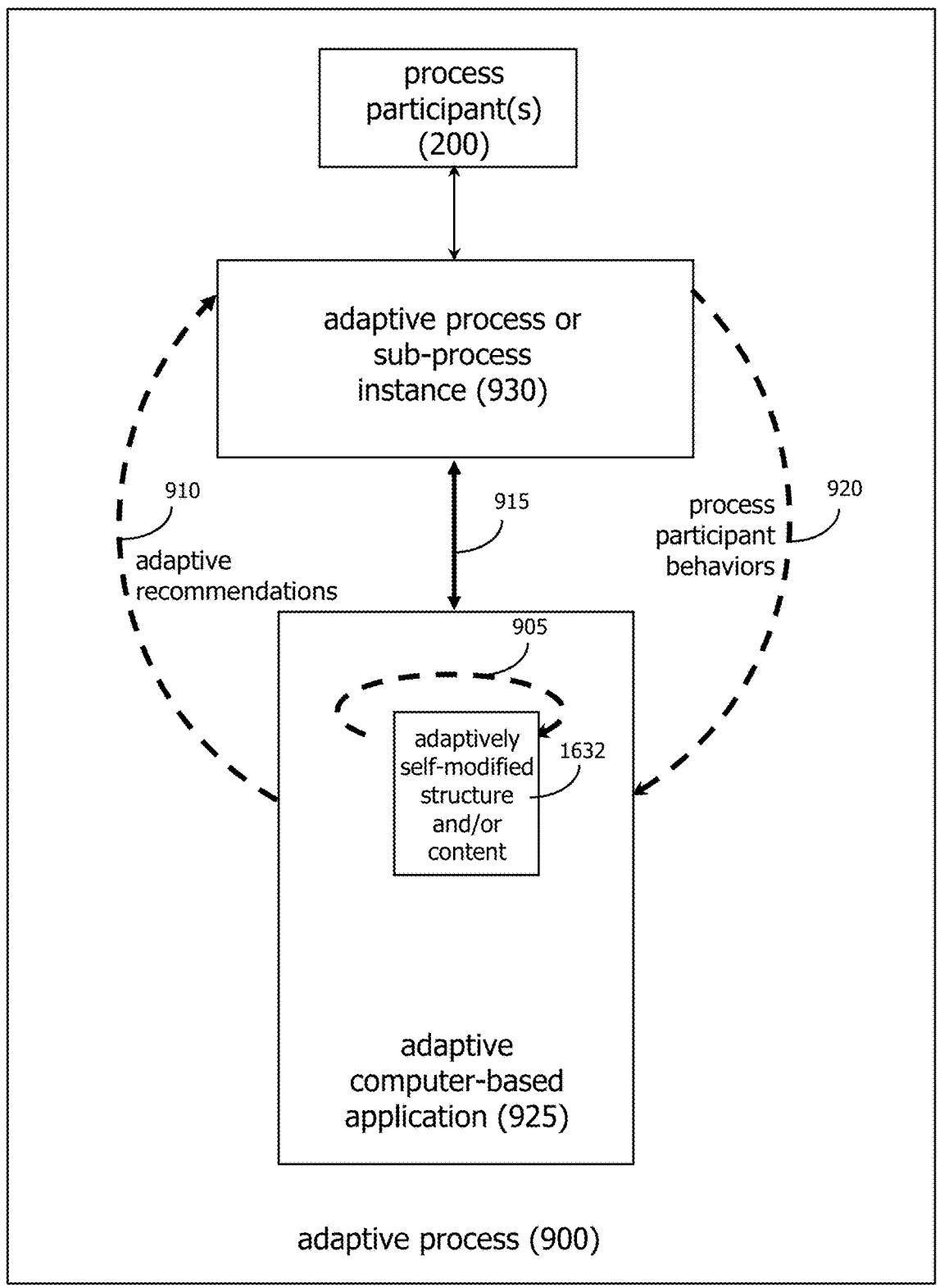
FIG. 4A is a block diagram of an adaptive process, according to some embodiments.
Figure 4B:
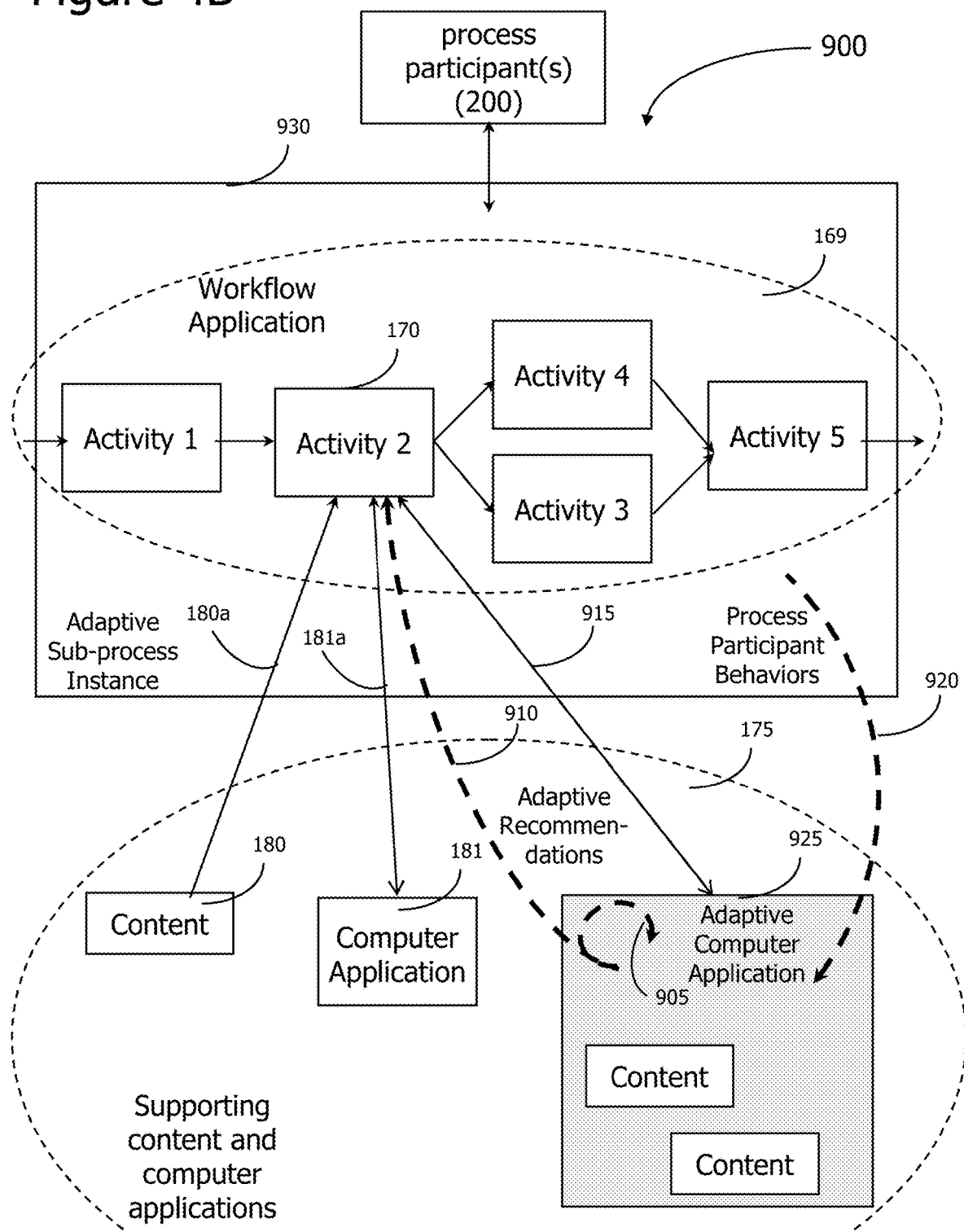
FIG. 4B is a detailed block diagram of the adaptive process of FIG. 4A, according to some embodiments.

FIGS. 4A and 4B depict the application of adaptive recommendations to support a process or sub-process, according to some embodiments. In FIG. 4A, an adaptive process 900 is depicted, which includes one or more process participants 200, an adaptive instance of a process or sub-process 930 (hereinafter, adaptive process instance 930 or process instance 930), and an adaptive computer-based application 925. In FIG. 4B, the adaptive process 900 may include many of the features of the prior art process in FIG. 3. Thus, the adaptive process instance 930 features the workflow application 169, if applicable, with multiple activities 170, one or more of which may be linked. Further, the adaptive computer-based application 925 is depicted as part of supporting content and computer applications 175. FIG. 4A provides a broad overview of the adaptive process 900 while FIG. 4B includes many more details.

One or more participants 200 in the adaptive process instance 930 generate behaviors associated with their participation in the process instance 930. The participation in the process instance 930 may include interactions with computer-based systems 181 and content 180, such as content access 180*a* and information access 181*a*, but may also include behaviors not directly associated with interactions with computer-based systems or content.

Process participants 200 may be identified by the adaptive computer-based application 925 through any means of computer-based identification, including, but not limited to, sign-in protocols or bio-metric-based means of identification; or through indirect means based on identification inferences derived from selective process usage behaviors 920.

The adaptive process 900 includes an adaptive computer-based application 925, which includes one or more system elements or objects, each element or object being executable software and/or content that is meant for direct human access. The adaptive computer-based application 925 tracks and stores selective process participant behaviors 920 associated with a process instance 930. It should be understood that the tracking and storing of selective behaviors by the adaptive computer-based application 925 may also be associated with one or more other processes, sub-processes, and activities other than the process instance 930, though this is not explicitly depicted in FIGS. 4A and 4B. In addition to the direct tracking and storing of selective process usage behaviors, the adaptive computer-based application 925 may also indirectly acquire selective behaviors associated with process usage through one or more other computer-based applications that track and store selective process participant behaviors.

FIGS. 4A and 4B also depict adaptive recommendations 910 being generated and delivered by the adaptive computer-based application 925 to process participants 200. The adaptive recommendations 910 are shown being delivered to one or more process participants 200 engaged in "Activity 2" 170 of the adaptive process instance 930 in FIG. 4B. It should be understood that the adaptive recommendations 910 may be delivered to process participants 200 during any activity or any other point during participation in a process or sub-process.

The adaptive recommendations 910 delivered by the adaptive computer-based application 925 are informational or computing elements or subsets of the adaptive computer-based application 925, and may take the form of text, graphics, Web sites, audio, video, interactive content, other computer applications, or embody any other type or item of information. These recommendations are generated to facilitate participation in, or use of, an associated process, sub-process, or activity. The recommendations are derived by combining the context of what the process participant is currently doing and the inferred preferences or interests of the process participant based, at least in part, on the behaviors of one or more process participants, to generate recommendations. As the process, sub-process or activity is executed more often by the one or more process participants, the recommendations adapt to become increasingly effective. Hence, the adaptive process 900 itself can adapt over time to become increasingly effective.

Furthermore, the adaptive recommendations 910 may be applied to automatically or semi-automatically self-modify 905 the structure, elements, objects, content, information, or software of a subset 1632 of the adaptive computer-based application 925, including representations of process workflow. (The terms "semi-automatic" or "semi-automatically," as used herein, are defined to mean that the described activity is conducted through a combination of one or more automatic computer-based operations and one or more direct human interventions.) For example, the elements, objects, or items of content of the adaptive computer-based application 925, or the relationships among elements, objects, or items of content associated with the adaptive computer-based application 925 may be modified 905 based on inferred preferences or interests of one or more process participants. These modifications may be based solely on inferred preferences or interests of the one or more process participants 200 derived from process usage behaviors, or the modifications may be based on inferences of preferences or interests of process participants 200 from process usage behaviors integrated with inferences based on the intrinsic characteristics of elements, objects or items of content of the adaptive computer-based application 925. These intrinsic characteristics may include patterns of text, images, audio, or any other information-based patterns.

For example, inferences of subject matter based on the statistical patterns of words or phrases in a text-based item of content associated with the adaptive computer-based application 925 may be integrated with inferences derived from the process usage behaviors of one or more process participants to generate adaptive recommendations 910 that may be applied to deliver to participants in the process, or may be applied to modify 905 the structure of the adaptive computer-based application 925, including the elements, objects, or items of content of the adaptive computer-based application 925, or the relationships among elements, objects, or items of content associated with the adaptive computer-based application 925.

Structural modifications 905 applied to the adaptive computer-based application 925 enables the structure to adapt to process participant preferences, interests, or requirements over time by embedding inferences on these preferences, interests or requirements directly within the structure of the adaptive computer-based application 925 on a persistent basis.

Adaptive recommendations generated by the adaptive computer-based application 925 may be applied to modify the structure, including objects and items of content, of other computer-based systems 175, including the computer-based workflow application 169, supporting, or accessible by, participants in the process instance 930. For example, a system that manages workflow 169 may be modified through application of adaptive recommendations generated by the adaptive computer-based application 925, potentially altering activity sequencing or other workflow aspects for one or more process participants associated with the adaptive process instance 930.

In addition to adaptive recommendations 910 being delivered to process participants 200, process participants 200 may also access or interact 915 with adaptive computer-based application 925 in other ways. The access of, or interaction with, 915 the adaptive computer-based application 925 by process participants 200 is analogous to the interactions 182a with computer application 182 of FIG. 3. However, a distinguishing feature of adaptive process 900 is that the access or interaction 915 of the adaptive computer-based application 925 by process participants 200 may include elements 1632 of the adaptive computer-based application 925 that have been adaptively self-modified 905 by the adaptive computer-based application 925.

Figure 4C:
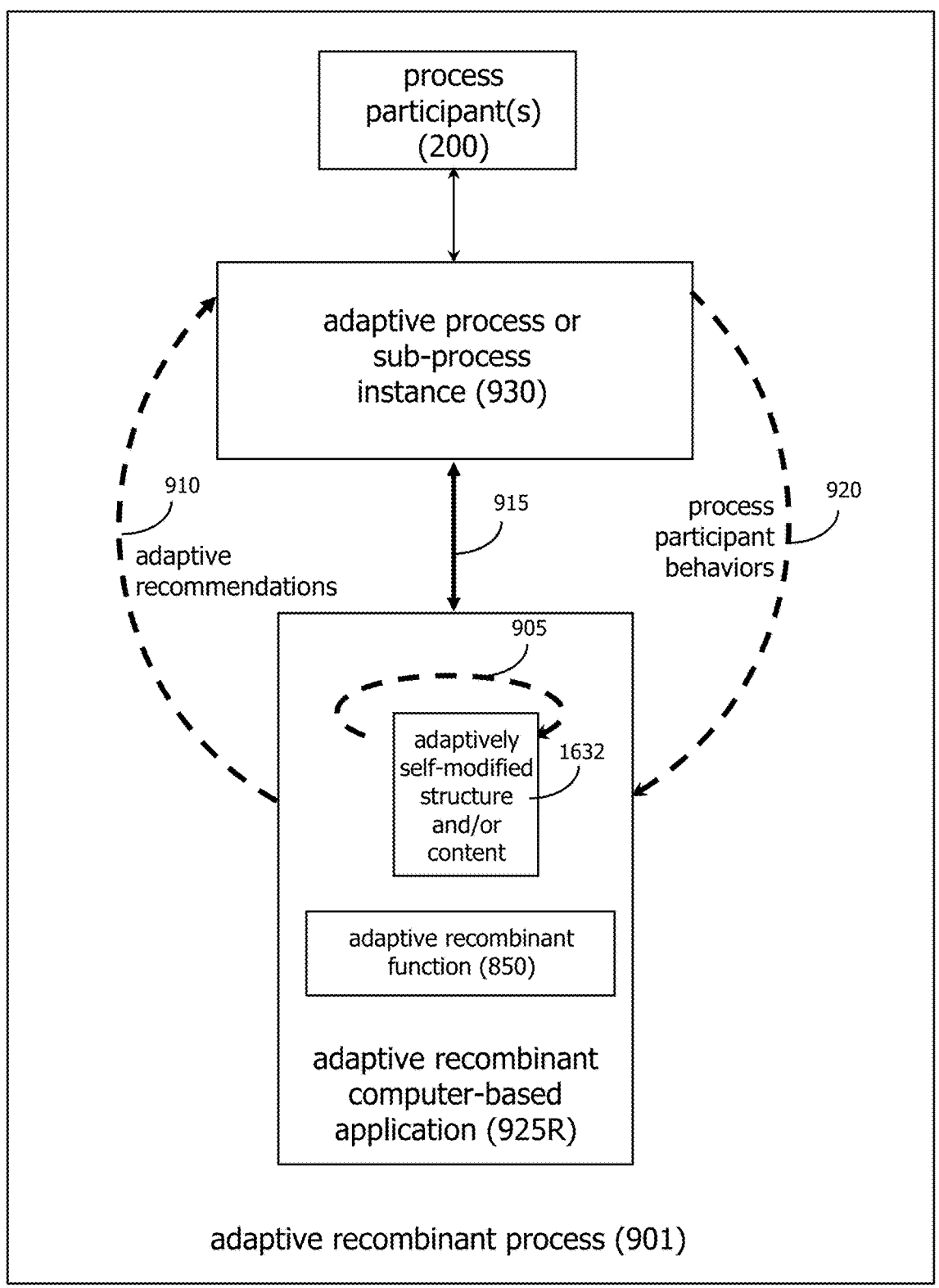
FIG. 4C is a block diagram of an adaptive recombinant process, according to some embodiments.

FIG. 4C depicts an extension of the adaptive process 900 of FIG. 4A in which the adaptive recombinant function 850 is combined with the adaptive computer-based application 925 to form an adaptive recombinant computer-based application 925R. The adaptive recombinant computer-based application 925R enables the management of multiple computer-based representations of adaptive process or sub-process instances 930, where each process or sub-process representation may be in whole or in part. Further, the adaptive recombinant computer-based application 925R enables the management of multiple information structures associated with a specific process instance 930. The management of the representations of process or sub-process instances 930 and/or multiple information structures thereof, may include the distribution and combination of the representations of process or sub-process instances 930 and/or other information structures, within or across computing systems and/or organizations. These capabilities enable the adaptive recombinant process 901.

For some process applications described herein, adaptive process 900 is sufficient to implement the application. Other process applications described herein utilize the additional adaptive recombinant capabilities 850 provided by the adaptive recombinant process 901 for full implementation. Notwithstanding that the term "adaptive recombinant processes" is the general term used herein to describe the present invention, it should be understood that in some process application areas, the additional adaptive recombinant capabilities 850 of the adaptive recombinant process 901 (that are extensions to the adaptive process capabilities of the adaptive process 900) are not necessary for implementation.

Process Participant Behavior Categories

In Table 1, several different process participant behaviors 920, which may also be described as process "usage" behaviors without loss of generality, are identified by the adaptive computer-based application 925 and categorized. The usage behaviors 920 may be associated with the entire community of process participants, one or more sub-communities, or with individual process participants or users associated with the sub-process instance 930.

TABLE 1

Usage behavior categories and usage behaviors

| usage behavior category | usage behavior examples |
|---|---|
| navigation and access | activity, content and computer application accesses, including buying/selling paths of accesses or click streams |
| subscription and self-profiling | personal or community subscriptions to process topical areas interest and preference self-profiling affiliation self-profiling (e.g., job function) |
| collaborative | referral to others discussion forum activity direct communications (voice call, messaging) content contributions or structural alterations |
| reference | personal or community storage and tagging personal or community organizing of stored or tagged information |
| direct feedback | user ratings of activities, content, computer applications and automatic recommendations user comments |
| attention | direction of gaze brain patterns |
| physical location | current location location over time relative location to users/object references |

A first category of process usage behaviors 920 is known as system navigation and access behaviors. System navigation and access behaviors include usage behaviors 920 such as accesses to, and interactions with online computer applications and content such as documents, Web pages, images, videos, audio, multi-media, interactive content, interactive computer applications, e-commerce applications, or any other type of information item or system "object." These process usage behaviors may be conducted through use of a keyboard, a mouse, oral commands, or using any other input device. Usage behaviors 920 in the system navigation and access behaviors category may include, but are not limited to, the viewing or reading of displayed information, typing written information, interacting with online objects orally, or combinations of these forms of interactions with computer-based applications.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors 920 is known as subscription and self-profiling behaviors. Subscriptions may be associated with specific topical areas or other elements of the adaptive computer-based application 925, or may be associated with any other subset of the adaptive computer-based application 925. Subscriptions may thus indicate the intensity of interest with regard to elements of the adaptive computer-based application 925. The delivery of information to fulfill subscriptions may occur online, such as through electronic mail (email), on-line newsletters, XML feeds, etc., or through physical delivery of media.

Self-profiling refers to other direct, persistent (unless explicitly changed by the user) indications explicitly designated by the one or more process participants regarding their preferences and interests, or other meaningful attributes. A process participant 200 may explicitly identify interests or affiliations, such as job function, profession, or organization, and preferences, such as representative skill level (e.g., novice, business user, advanced). Self-profiling enables the adaptive computer-based application 925 to infer explicit preferences of the process participant. For example, a self-profile may contain information on skill levels or relative proficiency in a subject area, organizational affiliation, or a position held in an organization. A process participant 200 that is in the role, or potential role, of a supplier or customer may provide relevant context for effective adaptive e-commerce applications through self-profiling. For example, a potential supplier may include information on products or services offered in his or her profile. Self-profiling information may be used to infer preferences and interests with regard to system use and associated topical areas, and with regard to degree of affinity with other process participant community subsets. A process participant may identify preferred methods of information receipt or learning style, such as visual or audio, as well as relative interest levels in other communities.

A third category of usage behaviors 920 is known as collaborative behaviors. Collaborative behaviors are interactions among the one or more process participants. Collaborative behaviors may thus provide information on areas of interest and intensity of interest. Interactions including online referrals of elements or subsets of the adaptive computer-based application 925, such as through email, whether to other process participants or to non-process participants, are types of collaborative behaviors obtained by the adaptive computer-based application 925.

Other examples of collaborative behaviors include, but are not limited to, online discussion forum activity, contributions of content or other types of objects to the adaptive computer-based application 925, or any other alterations of the elements, objects or relationships among the elements and objects of adaptive computer-based application 925. Collaborative behaviors may also include general user-to-user communications, whether synchronous or asynchronous, such as email, instant messaging, interactive audio communications, and discussion forums, as well as other user-to-user communications that can be tracked by the adaptive computer-based application 925.

A fourth category of process usage behaviors 920 is known as reference behaviors. Reference behaviors refer to the saving or tagging of specific elements or objects of the adaptive computer-based application 925 for recollection or retrieval at a subsequent time. The saved or tagged elements or objects may be organized in a manner customizable by process participants. The referenced elements or objects, as well as the manner in which they are organized by the one or more process participants, may provide information on inferred interests of the one or more process participants and the associated intensity of the interests.

A fifth category of process usage behaviors 920 is known as direct feedback behaviors. Direct feedback behaviors include ratings or other indications of perceived quality by individuals of specific elements or objects of the adaptive computer-based application 925, or the attributes associated with the corresponding elements or objects. The direct feedback behaviors may therefore reveal the explicit preferences of the process participant. In the adaptive computer-based application 925, the adaptive recommendations 910 may be rated by process participants 200. This enables a direct, adaptive feedback loop, based on explicit preferences specified by the process participant. Direct feedback also includes user-written comments and narratives associated with elements or objects of the computer-based system 925.

A sixth category of process usage behaviors is known as attention behaviors. These behaviors are associated with the focus of attention of process participants and/or the intensity of the intention. For example, the direction of the visual gaze of one or more process participants may be determined. This behavior can inform inferences associated with preferences or interests even when no physical interaction with the adaptive computer-based application 925 is occurring. Even more direct assessment of the level of attention may be conducted through access to the brain patterns or signals associated with the one or more process participants. Such patterns of brain functions during participation in a process can inform inferences on the preferences or interests of process participants, and the intensity of the preferences or interests. The brain patterns assessed may include MRI images, brain wave patterns, relative oxygen use, or relative blood flow by one or more regions of the brain.

Attention behaviors may include any other type of physiological response of a process participant 200 that may be relevant for making preference or interest inferences, independently, or collectively with the other usage behavior categories. Other physiological responses may include, but are not limited to, utterances, gestures, movements, or body position. Attention behaviors may also include other physiological responses such as breathing rate, blood pressure, or galvanic response.

A seventh category of process usage behaviors is known as physical location behaviors. Physical location behaviors identify physical location and mobility behaviors of process participants. The location of a process participant may be inferred from, for example, information associated with a Global Positioning System or any other positionally or locationally aware system or device. The physical location of physical objects referenced by elements or objects of adaptive computer-based application 925 may be stored for future reference. Proximity of a process participant to a second process participant, or to physical objects referenced by elements or objects of the computer-based application, may be inferred. The length of time, or duration, at which one or more process participants reside in a particular location may be used to infer intensity of interests associated with the particular location, or associated with objects that have a relationship to the physical location. Derivative mobility inferences may be made from location and time data, such as the direction of the process participant, the speed between locations or the current speed, the likely mode of transportation used, and the like. These derivative mobility inferences may be made in conjunction with geographic contextual information or systems, such as through interaction with digital maps or map-based computer systems.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by the adaptive computer-based application 925. The temporal patterns may include historical patterns, including how recently an element, object or item of content associated with adaptive computer-based application 925. For example, more recent behaviors may be inferred to indicate more intense current interest than less recent behaviors.

Another temporal pattern that may be tracked and contribute to preference inferences that are derived is the duration associated with the access or interaction with the elements, objects or items of content of the adaptive computer-based application 925, or the user's physical proximity to physical objects referenced by system objects of the adaptive computer-based application 925, or the user's physical proximity to other process participants. For example, longer durations may generally be inferred to indicate greater interest than short durations. In addition, trends over time of the behavior patterns may be captured to enable more effective inference of interests and relevancy. Since adaptive recommendations 910 may include one or more elements, objects or items of content of the adaptive computer-based application 925, the usage pattern types and preference inferencing may also apply to interactions of the one or more process participants with the adaptive recommendations 910 themselves.

Process Participant Behavior and Usage Framework

Figure 5:
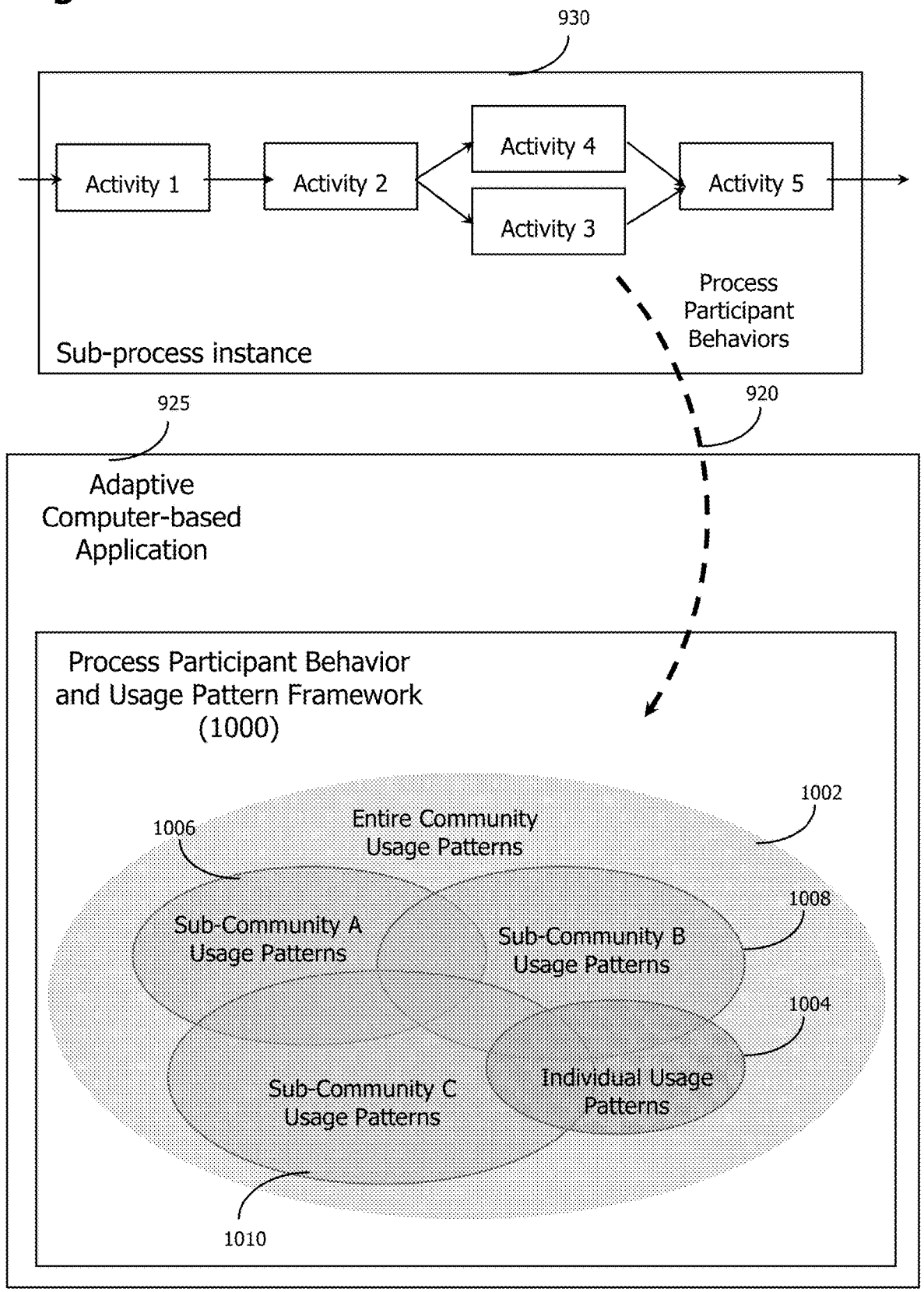
FIG. 5 is a diagram of the process participant usage framework, according to some embodiments.

FIG. 5 depicts a usage framework 1000 for performing preference inferencing of tracked or monitored usage behaviors 920 associated with a process or sub-process instance 930 by the adaptive computer-based application 925. The usage framework 1000 summarizes the manner in which process usage patterns are managed within the adaptive computer-based application 925. Usage behavioral patterns associated with an entire community, affinity group, or segment of process participants 1002 are captured by the adaptive computer-based application 925. In another case, usage patterns specific to an individual, shown in FIG. 5 as individual usage patterns 1004, are captured by the adaptive computer-based application 925. Various sub-communities of usage associated with process participants may also be defined, as for example sub-community A usage patterns 1006, sub-community B usage patterns 1008, and sub-community C usage patterns 1010.

Memberships in the communities are not necessarily mutually exclusive, as depicted by the overlaps of the sub-community A usage patterns 1006, sub-community B usage patterns 1008, and sub-community C usage patterns 1010 (as well as and the individual usage patterns 1004) in the usage framework 1000. Recall that a community may include a single process participant or multiple process participants. Sub-communities may likewise include one or more process participants. Thus, the individual usage patterns 1004 in FIG. 5 may also be described as representing the process usage patterns of a community or a sub-community. For the adaptive computer-based application 925, usage behavior patterns may be segmented among communities and individuals so as to effectively enable adaptive recommendations 910, 905 for each sub-community or individual.

The communities identified by the adaptive computer-based application 925 may be determined through self-selection, through explicit designation by other process participants or external administrators (e.g., designation of certain process participants as "experts"), or through automatic determination by the adaptive computer-based application 925. The communities themselves may have relationships between each other, of multiple types and values. In addition, a community may be composed not of human users, or solely of human users, but instead may include one or more other computer-based systems, which may have reason to interact with the adaptive computer-based application 925. Or, such computer-based systems may provide an input into the adaptive computer-based application 925, such as by being the output from a search engine. The interacting computer-based system may be another instance of the adaptive computer-based application 925.

The usage behaviors 920 included in Table 1 may be categorized by the adaptive computer-based application 925 according to the usage framework 1000 of FIG. 5. For example, categories of usage behavior may be captured and categorized according to the entire community usage patterns 1002, sub-community usage patterns 1006, and individual usage patterns 1004. The corresponding usage behavior information may be used to infer preferences and interests at each of the user levels.

Multiple usage behavior categories shown in Table 1 may be used by the adaptive computer-based application 925 to make reliable inferences of the preferences of a process participant with regard to elements, objects, or items of content associated with the adaptive computer-based application 925. There are likely to be different preference inferencing results for different process participants. In addition, preference inferencing may be different with regard to optimizing the delivery of adaptive recommendations 910 to process participants than the preference inferencing optimized for modifying the structure 905 of the adaptive computer-based application 925, as modifications to the structure are likely to be persistent and affect many process participants.

As an example, simply using the sequences of content accesses as the sole relevant usage behavior on which to base updates to the structure will generally yield unsatisfactory results. This is because the structure itself, through navigational proximity, will create a tendency toward certain navigational access sequence biases. Using just object or content access sequence patterns as the basis for updates to the structural will therefore tend to reinforce the pre-existing structure of the adaptive computer-based application 925, which may limit the adaptiveness of the adaptive computer-based application 925.

By introducing different or additional behavioral characteristics, such as the duration of access of an item of content, on which to base updates to the structure of adaptive computer-based application 925, a more adaptive process is enabled. For example, duration of access will generally be much less correlated with navigational proximity than access sequences will be, and therefore provide a better indicator of true user preferences. Therefore, combining access sequences and access duration will generally provide better inferences and associated system structural updates than using either usage behavior alone. Effectively utilizing additional usage behaviors as described above will generally enable increasingly effective system structural updating. In addition, the adaptive computer-based application 925 may employ user affinity groups to enable even more effective system structural updating than are available merely by applying either individual (personal) usage behaviors or entire community usage behaviors.

Furthermore, relying on only one or a limited set of usage behavioral cues and signals may more easily enable potential "spoofing" or "gaming" of the computer-based application 925. "Spoofing" or "gaming" the adaptive computer-based application 925 refers to conducting consciously insincere or otherwise intentional usage behaviors 920, so as to influence the adaptive recommendations 910 or adaptive modifications 905 to the intrinsic elements and structure of the adaptive computer-based application 925. Utilizing broader sets of system usage behavioral cues and signals may lessen the effects of spoofing or gaming. One or more algorithms may be employed by computer-based application 925 to detect such contrived usage behaviors, and when detected, such behaviors may be compensated for by the preference and interest inferencing algorithms of computer-based application 925.

In some embodiments, the computer-based application 925 may provide process participants 200 with a means to limit the tracking, storing, or application of their usage behaviors 920. A variety of limitation variables may be selected by the process participant 200. For example, a process participant 200 may be able to limit usage behavior tracking, storing, or application by usage behavior category described in Table 1. Alternatively, or in addition, the selected limitation may be specified to apply only to particular user communities or individual process participants 200. For example, a process participant 200 may restrict the application of the full set of her process usage behaviors 920 to preference or interest inferences by adaptive computer-based application 925 for application to only herself, and make a subset of process behaviors 920 available for application to process participants only within her workgroup, but allow none of her process usage behaviors to be applied by computer-based application 925 in making inferences of preferences or interests for other process participants.

Process Participant Communities

As described above, a process participant associated with an adaptive process instance 930 may be a member of one or more communities of interest, or affinity groups, with a potentially varying degree of affinity associated with the respective communities. These affinities may change over time as interests of the user 200 and communities evolve over time. The affinities or relationships among process participants and communities may be categorized into specific types. An identified process participant 200 may be considered a member of a special sub-community containing only one member, the member being the identified process participant. A process participant can therefore be thought of as just a specific case of the more general notion of process participant or user segments, communities, or affinity groups.

Figure 6:
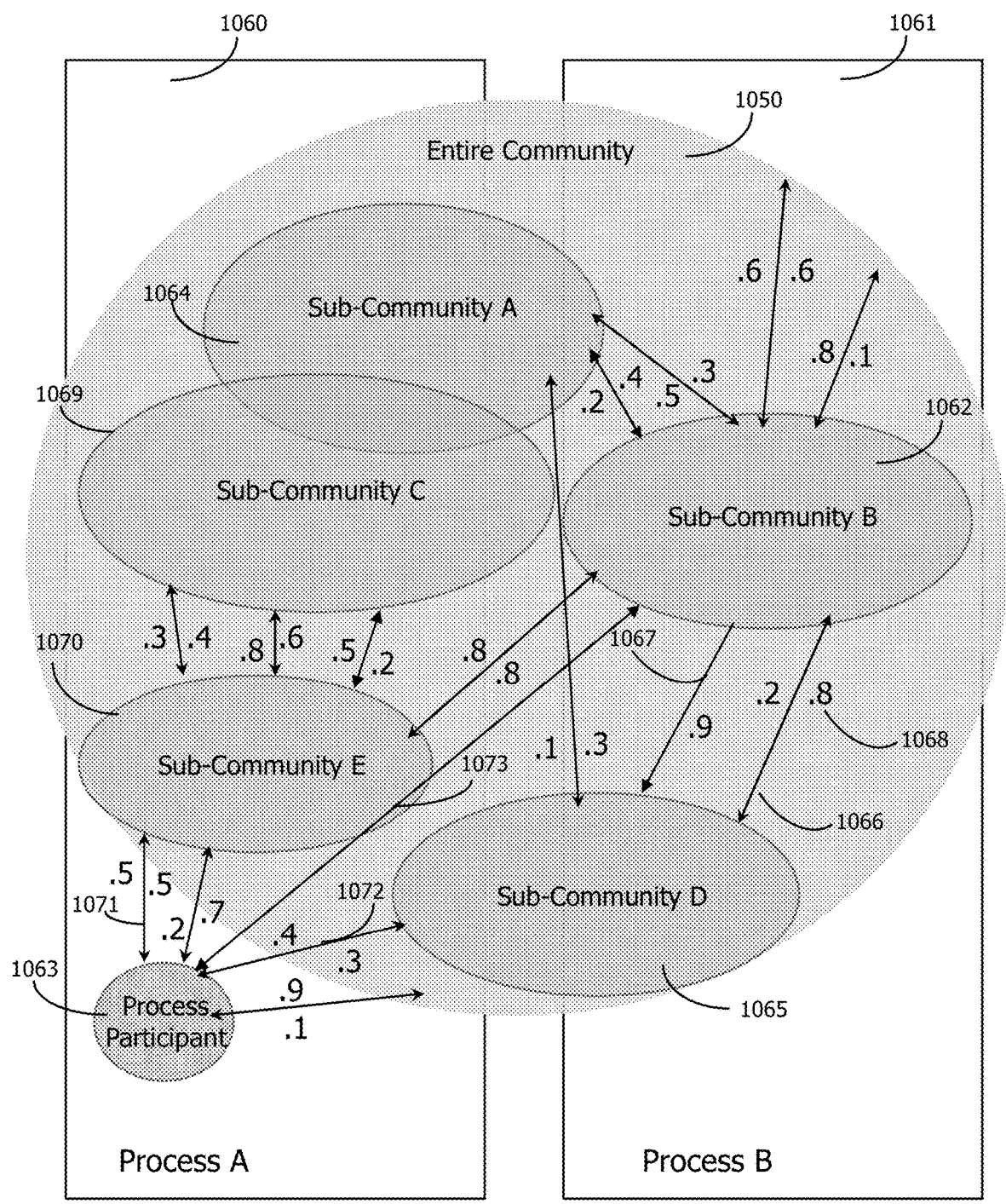
FIG. 6 is a diagram of process participant communities and associated relationships, according to some embodiments.

FIG. 6 illustrates the affinities among user communities and how these affinities may automatically or semi-automatically be updated by the adaptive computer-based application 925 based on user preferences which are derived from process participant behaviors 920. An entire community 1050 is depicted in FIG. 6. The community may extend across organizational, functional, or process boundaries. The entire community 1050 extends across process A 1060 and process B 1061. The entire community 1050 includes sub-community A 1064, sub-community B 1062, sub-community C 1069, sub-community D 1065, and sub-community E 1070. A process participant 1063 who is not part of the entire community 1050 is also featured in FIG. 6.

Sub-community B 1062 is a community that has many relationships or affinities to other communities. These relationships may be of different types and differing degrees of relevance or affinity. For example, a first relationship 1066 between sub-community B 1062 and sub-community D 1065 may be of one type, and a second relationship 1067 may be of a second type. (In FIG. 6, the first relationship 1066 is depicted using a double-pointing arrow, while the second relationship 1067 is depicted using a unidirectional arrow.)

The relationships 1066 and 1067 may be directionally distinct, and may have an indicator of relationship or affinity associated with each distinct direction of affinity or relationship. For example, the first relationship 1066 has a numerical value 1068, or relationship value, of "0.8." The relationship value 1068 thus describes the first relationship 1066 between sub-community B 1062 and sub-community D 1065 as having a value of 0.8.

The relationship value may be scaled as in FIG. 6 (e.g., between 0 and 1), or may be scaled according to another interval. The relationship values may also be bounded or unbounded, or they may be symbolically represented (e.g., high, medium, low).

The process participant 1063, which could be considered a process participant community including a single member, may also have a number of relationships to other communities, where these relationships are of different types, directions and relevance. From the perspective of the process participant 1063, these relationship types may take many different forms. Some relationships may be automatically formed by the adaptive computer-based application 925, for example, based on interests or geographic location or similar traffic/usage patterns. Thus, for example the entire community 1050 may include process participants in a particular city. Some relationships may be context-relative. For example, a community to which the process participant 1063 has a relationship could be associated with a certain process, and another community could be related to another process. Thus, sub-community E 1070 may be the process participants associated with a product development business to which the process participant 1063 has a relationship 1071; sub-community B 1062 may be the members of a cross-business innovation process to which the user 1063 has a relationship 1073; sub-community D 1065 may be experts in a specific domain of product development to which the process participant 1063 has a relationship 1072. The generation of new communities which include the process participant 1063 may be based on the inferred interests of the process participant 1063 or other process participants within the entire community 1050.

Membership of communities may overlap, as indicated by sub-communities A 1064 and C 1069. The overlap may result when one community is wholly a subset of another community, such as between the entire community 1050 and sub-community B 1062. More generally, a community overlap will occur whenever two or more communities contain at least one process participant or user in common. Such community subsets may be formed automatically by the adaptive process 900, based on preference inferencing from process participant behaviors 920. For example, a subset of a community may be formed based on an inference of increased interest or demand of particular content or expertise of an associated community. The adaptive computer-based application 925 is also capable of inferring that a new community is appropriate. The adaptive computer-based application 925 of the adaptive process 900 will thus create the new community automatically.

For each process participant, whether residing within, say, sub-community A 1064, or residing outside the community 1050, such as the process participant 1063, the relationships (such as arrows 1066 or 1067), affinities, or "relationship values" (such as numerical indicator 1068), and directions (of arrows) are unique. Accordingly, some relationships (and specific types of relationships) between communities may be unique to each process participant. Other relationships, affinities, values, and directions may have more general aspects or references that are shared among many process participants, or among all process participants of the adaptive process 900. A distinct and unique mapping of relationships between process participants, such as is illustrated in FIG. 6, could thus be produced for each process participant by the adaptive computer-based application 925.

The adaptive computer-based application 925 may automatically generate communities, or affinity groups, based on process participant behaviors 920 and associated preference inferences. In addition, communities may be identified by process participants, such as administrators of the process or sub-process instance 930. Thus, the adaptive computer-based application 925 utilizes automatically generated and manually generated communities in generating adaptive recommendations 910, 905.

The communities, affinity groups, or user segments aid the adaptive computer-based application 925 in matching interests optimally, developing learning groups, prototyping process designs before adaptation, and many other uses. For example, some process participants that use or interact with the adaptive computer-based application 925 may receive a preview of a new adaptation of a process for testing and fine-tuning, prior to other process participants receiving this change.

The process participants or communities may be explicitly represented as elements or objects within the adaptive computer-based application 925. This feature enhances the extensibility and adaptability of the adaptive process 900.

Adaptive System

Figure 7:
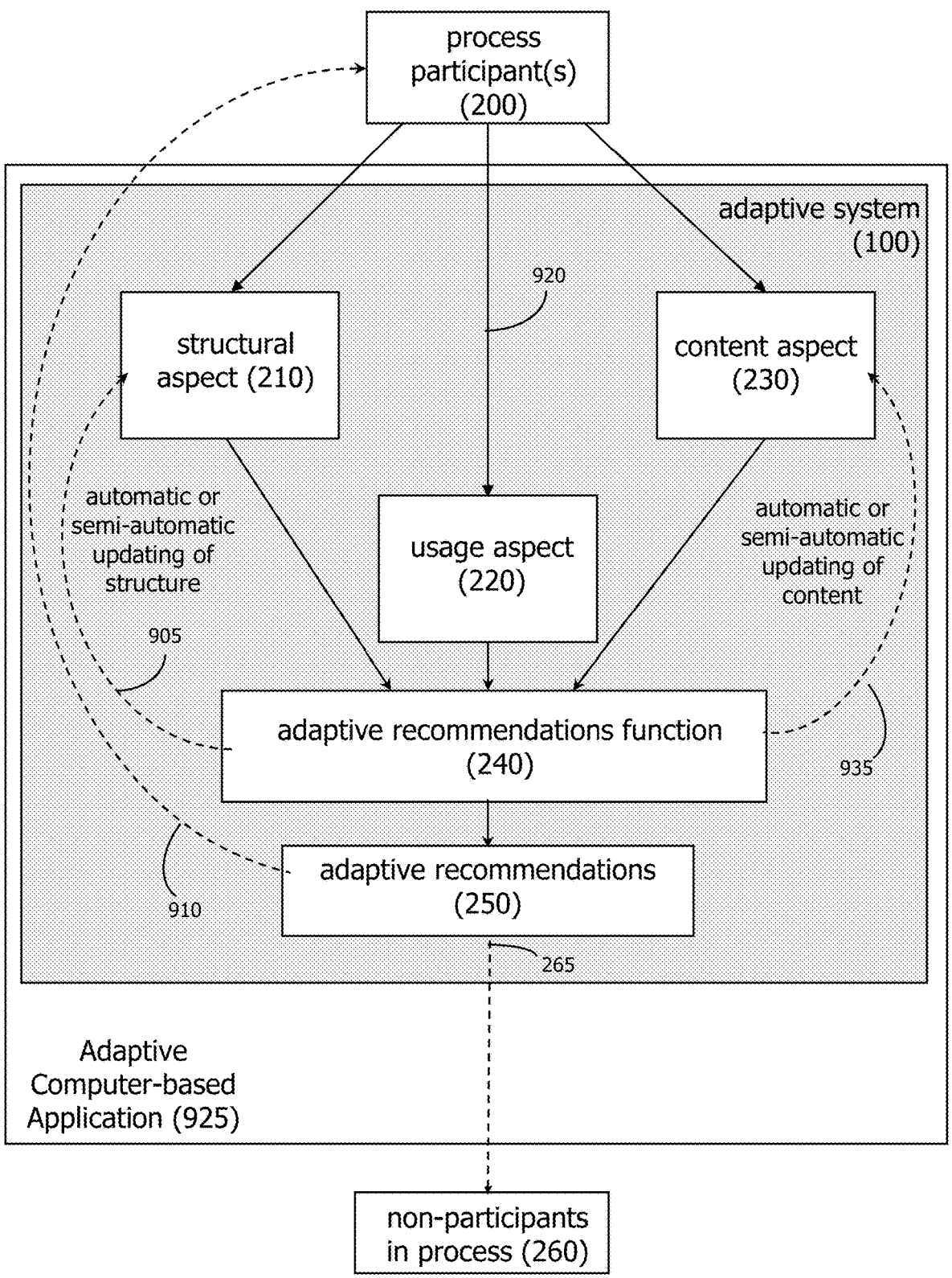
FIG. 7 is a block diagram of an adaptive system, according to some embodiments.

FIG. 7 depicts a possible configuration of the adaptive computer-based application 925, as part of the adaptive process 900 of FIGS. 4A and 4B. The adaptive computer-based application 925 includes, at least in part, an adaptive system 100 (shaded for convenience of identification), according to some embodiments. The adaptive system 100 includes three aspects: 1) a structural aspect 210, a usage aspect 220, and a content aspect 230. One or more process participants 200 (who may also be termed "users" of the adaptive process 900) interact with, or are monitored by, the adaptive system 100, which tracks selected behaviors 920 of the process participants, which are in turn selectively stored and processed by the usage aspect 220. An adaptive recommendations function 240 generates adaptive recommendations based on inputs from the usage aspect 220, and, optionally, based on the structural aspect 210 and/or the content aspect 230. The adaptive recommendations function 240 determines inferred interests of process participants 200, and generates adaptive recommendations 250 that may be delivered 910 to process participants 200 or may be delivered 265 to non-process participants 260. The adaptive recommendations function 240 may also apply adaptive recommendations to modify 905 the structural aspect 210 or to modify 935 the content aspect 230.

In some embodiments, the adaptive process 900 utilizes the methods and systems of adaptive fuzzy network and process models, as defined in U.S. Pat. No. 6,795,826, entitled "Fuzzy Content Network Management and Access," and PCT Patent Application No. PCT/US04/37176, entitled "Adaptive Recombinant Systems," filed on Nov. 4, 2004, which are hereby incorporated by reference as if set forth in their entirety.

Figure 8:
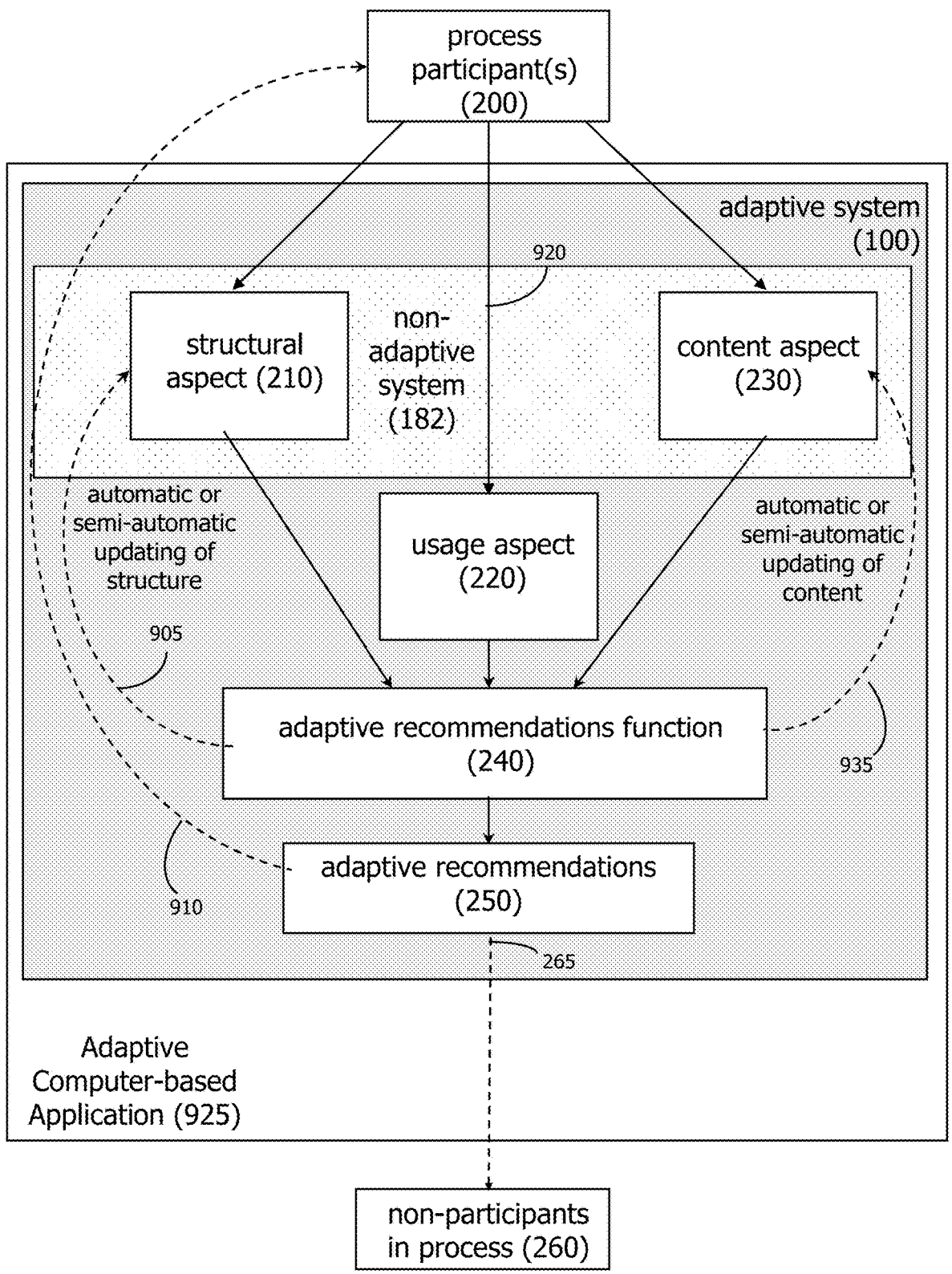
FIG. 8 is a block diagram contrasting the adaptive system of FIG. 7 with a non-adaptive system, according to some embodiments.

FIG. 8 contrasts the non-adaptive computer-based application 182 (FIG. 3) with the adaptive computer-based application 925 (FIGS. 4A and 4B). In FIG. 8, an adaptive computer-based application 925 includes the non-adaptive computer-based application 182 (FIG. 3), plus other features of the adaptive system 100 (FIG. 7). The non-adaptive computer-based application 182 includes at least a structural aspect and a content aspect, but does not include a usage aspect 220 and an adaptive recommendations function 240, and therefore cannot generate and apply 910, 905, 935 adaptive recommendations. The structural aspect or content aspect of the non-adaptive computer-based application 182 may be integrated with a usage aspect 220 and an adaptive recommendation function 240 to create the adaptive system 100 (FIG. 7), and hence, the adaptive computer-based application 925. This integration may be through integration of the associated software functions of the structural aspect 210 and the content aspect 230 of the non-adaptive computer-based application 182 with a usage aspect 220 and an adaptive recommendation function 240. Or, the integration may be effected through transmission of elements of the structural aspect 210 and the content aspect 230 of the non-adaptive computer-based application 182 with a second system that contains usage aspect 220 and an adaptive recommendation function 240.

As used herein, one or more process participants 200 may be a single user or multiple users of the adaptive computer-based application 925. As shown in FIG. 8, the one or more process participants or users 200 may receive 910 the adaptive recommendations 250. Individuals not participating in the process 260 of the adaptive system 100 may also receive 265 adaptive recommendations 250 from the adaptive system 100.

The process participant or user 200 may be a human entity, a computer system, or a second adaptive system (distinct from the adaptive system 100) that interacts with, or otherwise uses the adaptive computer-based application 925 and the associated adaptive system 100. The one or more users 200 may include non-human users of the adaptive system 100. In particular, one or more other adaptive systems may serve as virtual system "users." These other adaptive systems may operate in accordance with the architecture of the adaptive system 100. Thus, multiple adaptive systems may be mutual users for one another. These adaptive systems may each support the same process, or each system 100 may each support different processes.

It should be understood that the structural aspect 210, the content aspect 230, the usage aspect 220, and the recommendations function 240 of the adaptive system 100, and elements of each, may be contained within one computer, or distributed among multiple computers. Furthermore, one or more non-adaptive computer-based applications 182 may be modified to comprise one or more adaptive systems 100 by integrating the usage aspect 220 and the recommendations function 240 with the one or more non-adaptive computer-based applications 182.

The term "computer system" or the term "system," without further qualification, as used herein, will be understood to mean either a non-adaptive or an adaptive system. Likewise, the terms "system structure" or "system content," as used herein, will be understood to refer to the structural aspect 210 and the content aspect 230, respectively, whether associated with the non-adaptive system 182 or the adaptive computer-based application 925, and associated adaptive system 100. The term "system structural subset" or "structural subset," as used herein, will be understood to mean a portion or subset of the structural aspect 210 of a system.

Structural Aspect

Figure 9A:
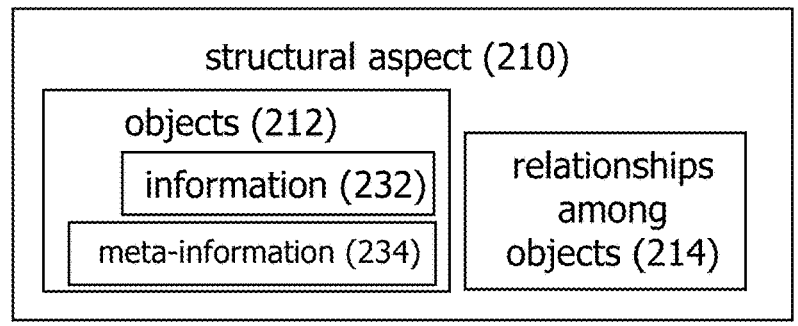
FIG. 9A is a block diagram of the structural aspect of the adaptive system of FIG. 7, according to some embodiments.
Figure 9B:
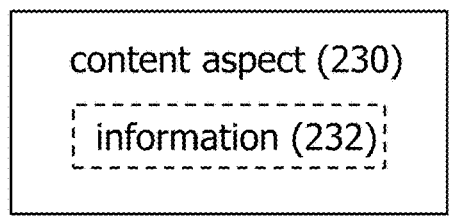
FIG. 9B is a block diagram of the content aspect of the adaptive system of FIG. 7, according to some embodiments.

The structural aspect 210 of the adaptive system 100 is depicted in the block diagram of FIG. 9A. The structural aspect 210 denotes a collection of system objects 212 that are part of the adaptive system 100, as well as the relationships among the objects 214. The relationships among objects 214 may be persistent across user sessions, or may be transient in nature. The objects 212 may include or reference items of content, such as text, graphics, audio, video, interactive content, or embody any other type or item of information. The objects 212 may also include references to content, such as pointers. Computer applications, executable code, or references to computer applications may also be stored or referenced as objects 212 in the adaptive system 100. The content of the objects 212 is known herein as information 232. The information 232, though part of the object 214, is also considered part of the content aspect 230, as depicted in FIG. 9B, and as described below.

The objects 212 may be managed in a relational database, or may be maintained in structures such as flat files, linked lists, inverted lists, hypertext networks, or object-oriented databases. The objects 212 may include meta-information 234 associated with the information 232 contained within, or referenced by the objects 212.

As an example, in some embodiments, the World-wide Web may be considered a structural aspect, where web pages constitute the objects of the structural aspect and links between web pages constitute the relationships among the objects. Alternatively, or in addition, in some embodiments, the structural aspect may feature objects associated with an object-oriented programming language, and the relationships between the objects associated with the protocols and methods associated with interaction and communication among the objects in accordance with the object-oriented programming language.

The one or more users 200 of the adaptive system 100 may be explicitly represented as objects 212 within the system 100, thereby becoming directly incorporated within the structural aspect 210. The relationships among objects 214 may be arranged in a hierarchical structure, a relational structure (e.g. according to a relational database structure), or according to a network structure.

Content Aspect

The content aspect 230 of the adaptive system 100 is depicted in the block diagram of FIG. 9B. The content aspect 230 denotes the information 232 contained in, or referenced by the objects 212 that are part of the structural aspect 210. The content aspect 230 of the objects 212 may include text, graphics, audio, video, and interactive forms of content, such as applets, tutorials, courses, demonstrations, modules, or sections of executable code or computer programs. The one or more users 200 interact with the content aspect 230.

The adaptive system 100 may enable an item of information 232 to be decomposed into other items of information 232. For example, a text document could be decomposed into sections, each of which could become separate items of information 232. Further, these items of information could then become an object 212; that is, an explicit element of the structural aspect 210. The decomposition process may also generate appropriate relationships 214 among the decomposed objects, which also become explicit elements of the structural aspect 210. The recursive decomposition of information 232 into other information 232 and associated objects 212 and corresponding relationships among the objects 214 may continue without limit.

The content aspect 230 may be updated or modified 935 (FIG. 7) by the adaptive recommendations function 240 based, at least in part, on the usage aspect 220, including usage behavior metrics. To achieve this, the adaptive system 100 may employ the usage aspect, or elements of the usage aspect, of other systems. Such systems may include, but are not limited to, other computer systems, other networks, such as the World Wide Web, multiple computers within an organization, other adaptive systems, or other adaptive recombinant systems. In this manner, the content aspect 230 benefits from usage occurring in other environments, including other process environments.

Usage Aspect

Figure 9C:
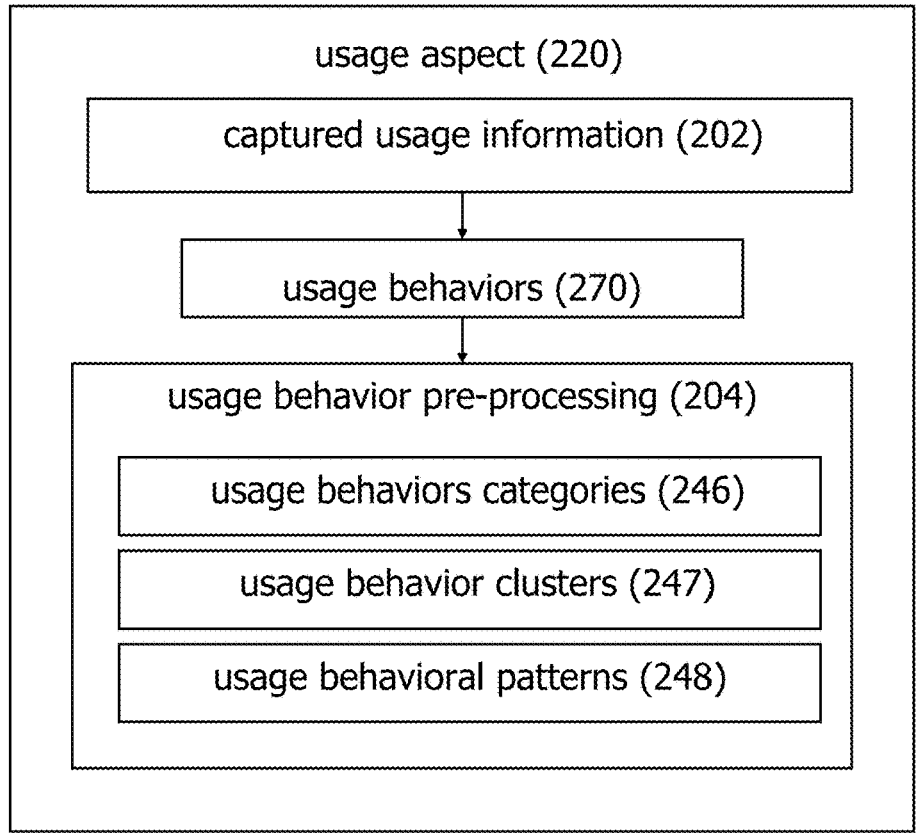
FIG. 9C is a block diagram of the usage aspect of the adaptive system of FIG. 7, according to some embodiments.

The usage aspect 220 of the adaptive system 100 is depicted in the block diagram of FIG. 9C. Recall from FIG. 7 that the usage aspect 220 tracks or monitor usage behaviors 920 of process participants 200. The usage aspect 220 denotes captured usage information 202, further identified as usage behaviors 270, and usage behavior pre-processing 204. The usage aspect 220 thus reflects the tracking, storing, categorization, and clustering of the use and associated usage behaviors 920 of the one or more users or process participants 200 interacting with the adaptive system 100.

The captured usage information 202, known also as system usage or system use 202, includes any interaction by the one or more process participants or users 200 with the system, or monitored behavior by the one or more users 200. The adaptive system 100 may track and store user key strokes and mouse clicks, for example, as well as the time period in which these interactions occurred (e.g., time-stamps), as captured usage information 202. From this captured usage information 202, the adaptive system 100 identifies usage behaviors 270 of the one or more process participants 200 (e.g., web page access or physical location changes of the process participant). Finally, the usage aspect 220 includes usage-behavior pre-processing, in which usage behavior categories 246, usage behavior clusters 247, and usage behavioral patterns 248 are formulated for subsequent processing of the usage behaviors 270 by the adaptive system 100. Some usage behaviors 270 identified by the adaptive system 100, as well as usage behavior categories 246 designated by the adaptive system 100, are listed in Table 1, above, and are described in more detail below.

The usage behavior categories 246, usage behaviors clusters 247, and usage behavior patterns 248 may be interpreted with respect to a single user 200, or to multiple users 200, in which the multiple users may be described herein as a community, an affinity group, or a user segment. These terms are used interchangeably herein. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 246 include types of usage behaviors 270, such as accesses, referrals to other users, collaboration with other users, and so on. These categories and more are included in Table 1, above. Usage behavior clusters 247 are groupings of one or more usage behaviors 270, either within a particular usage behavior category 246 or across two or more usage categories. The usage behavior pre-processing 204 may also determine new "clusterings" of user behaviors 270 in previously undefined usage behavior categories 246, across categories, or among new communities. Usage behavior patterns 248, also known as "usage behavioral patterns" or "behavioral patterns," are also groupings of usage behaviors 270 across usage behavior categories 246. Usage behavior patterns 248 are generated from one or more filtered clusters of captured usage information 202.

The usage behavior patterns 248 may also capture and organize captured usage information 202 to retain temporal information associated with usage behaviors 270. Such temporal information may include the duration or timing of the usage behaviors 270, such as those associated with reading or writing of written or graphical material, oral communications, including listening and talking, or physical location of the process participant 200. The usage behavioral patterns 248 may include segmentations and categorizations of usage behaviors 270 corresponding to a single user of the one or more users 200 or according to multiple users 200 (e.g., communities or affinity groups). The communities or affinity groups may be previously established, or may be generated during usage behavior pre-processing 204 based on inferred usage behavior affinities or clustering. Usage behaviors 270 may also be derived from the use or explicit preferences 252 associated with other adaptive or non-adaptive systems.

Adaptive Recommendations Function

Returning to FIG. 7, the adaptive system 100 includes an adaptive recommendations function 240, which interacts with the structural aspect 210, the usage aspect 220, and the content aspect 230. The adaptive recommendations function 240 generates adaptive recommendations 250 based on the application of the usage aspect 220, and, optionally, the structural aspect 210 and/or the content aspect 230. The adaptive recommendations function 240 may also optionally apply other contextual information, rules, or algorithms through the application of other computer-based functions residing within adaptive system 100, or through access to, or interaction with, other computer-based functions residing outside of adaptive system 100.

The term "recommendations" associated with the adaptive recommendations function 240 is used broadly in the adaptive system 100. The adaptive recommendations 250 generated by recommendations function 240 may be displayed or otherwise delivered 910, 265 to a recommendations recipient. As used herein, a recommendations recipient is an entity who receives the adaptive recommendations 250. Thus, the recommendations recipient may include the one or more process participants 200 of the adaptive system 100, as indicated by the dotted arrow 910 in FIG. 7, or a non-participant 260 of the associated process (see dotted arrow 265). However, the adaptive recommendations function 240 may also be applied internally by the adaptive system 100 to update the structural aspect 210 (see dotted arrow 905). In this manner, the usage behavior 270 of the one or more process participants 200 may be influenced by the system structural alterations that are automatically or semi-automatically applied. Or, the adaptive recommendations function 240 may be used by the adaptive system 100 to update the content aspect 230 (see dotted arrow 935).

Figure 10:
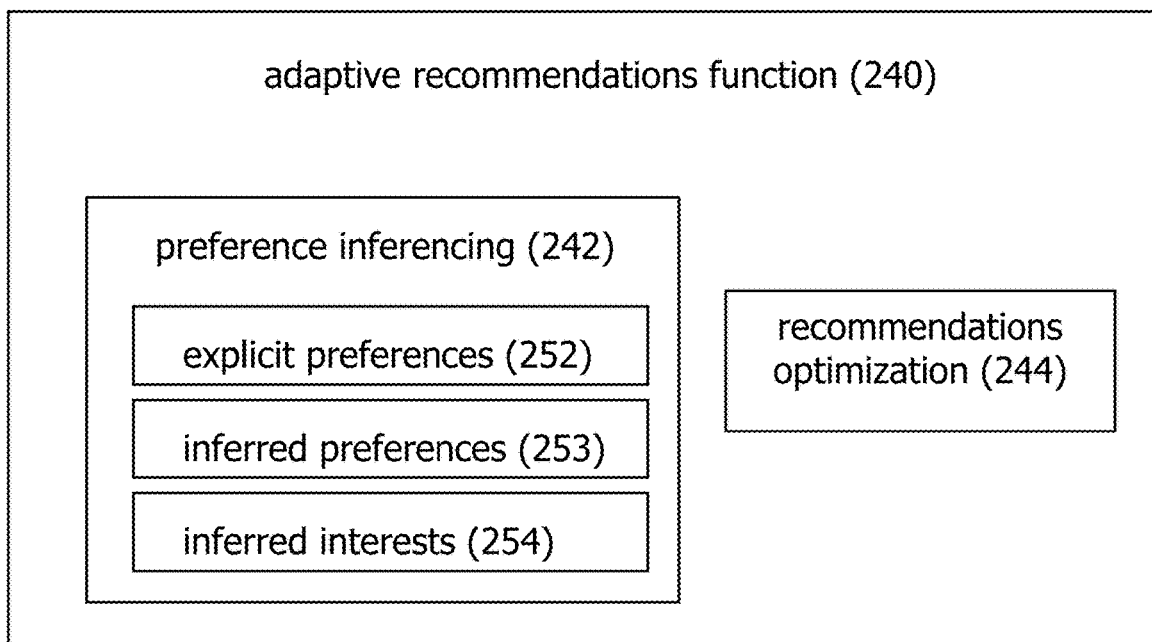
FIG. 10 is a block diagram of the adaptive recommendations function used by the adaptive system of FIG. 7, according to some embodiments.

FIG. 10 is a block diagram of the adaptive recommendations function 240 used by the adaptive system 100 of FIG. 7. The adaptive recommendations function 240 includes two algorithms, a preference inferencing algorithm 242 and a recommendations optimization algorithm 244. These algorithms (which actually may include many more than two algorithms) are used by the adaptive system 100 to generate adaptive recommendations 250.

Preferably, the adaptive system 100 identifies the preferences of the user 200 and self-adapts the adaptive system 100 in view of the preferences. Preferences describe the likes, tastes, partiality, and/or predilection of the user 200 that may be inferred during access of, interaction with, or while attention is directed to, the objects 212 of the adaptive system 100. In general, user preferences exist consciously or sub-consciously within the mind of the user. Since the adaptive system 100 has no direct access to these preferences, they are generally inferred by the preference inferencing algorithm 242 of the adaptive recommendations function 240.

The preference inferencing algorithm 242, infers preferences based, at least in part, on information that may be obtained as the process participant 200 accesses the adaptive system 100. Additional information may also be optionally used by the preference inferencing algorithm 242, including meta-information 234 and intrinsic information 232 within objects 212, and from information, rules, or algorithms accessed from other computer-based functions residing within the adaptive system 100, or through access to, or interaction with, other computer-based functions residing outside of the adaptive system 100.

The preference inferencing algorithm and associated output 242 is also described herein generally as "preference inferencing" or "preference inferences" of the adaptive system 100. The preference inferencing algorithm 242 identifies three types of preferences: explicit preferences 252, inferred preferences 253, and inferred interests 254. Unless otherwise stated, the use of the term "preferences" herein is meant to include any or all of the elements 252, 253, and 254 depicted in FIG. 10.

As used herein, explicit preferences 252 describe explicit choices or designations made by the user 200 during use of the adaptive system 100. The explicit preferences 252 may be considered to more explicitly reveal preferences than inferences associated with other types of usage behaviors. A response to a survey is one example where explicit preferences 252 may be identified by the adaptive system 100.

Inferred preferences 253 describe preferences of the user 200 that are based on usage behavioral patterns 248. Inferred preferences 253 are derived from signals and cues made by the process participant 200, where "signals" are consciously intended communications by the process participant, and "cues" are behaviors that are not intended as explicit communications, but nevertheless provide information of a process participant with which to infer preferences and interests.

Inferred interests 254 describe interests of the user 200 that are based on usage behavioral patterns 248. In general, the adaptive recommendations 250 generated by the adaptive recommendations function 240 are derived from the preference inferencing algorithm 242 and combine inferences from overall user community behaviors and preferences, inferences from sub-community or expert behaviors and preferences, and inferences from personal user behaviors and preferences. As used herein, preferences (whether explicit 252 or inferred 253) are distinguishable from interests (254) in that preferences imply a ranking (e.g., object A is better than object B) while interests do not necessarily imply a ranking.

A second algorithm 244, designated recommendations optimization 244, optimizes the adaptive recommendations 250 generated by the adaptive recommendations function 240 within the adaptive system 100. The adaptive recommendations 250 may be augmented by automated inferences and interpretations about the content within individual and sets of objects 232 using statistical pattern matching of words, phrases or representations, in written or audio format, or in pictorial format, within the content. Such statistical pattern matching may include, but is not limited to, principle component analysis, semantic network techniques, Bayesian analytical techniques, neural network-based techniques, support vector machine-based techniques, or other statistical analytical techniques.

Adaptive Recommendations

As shown in FIG. 7, the adaptive system 100 generates adaptive recommendations 250 using the adaptive recommendations function 240. The adaptive recommendations 250, or suggestions, enable users to more effectively use and navigate through the adaptive system 100.

Figure 11:
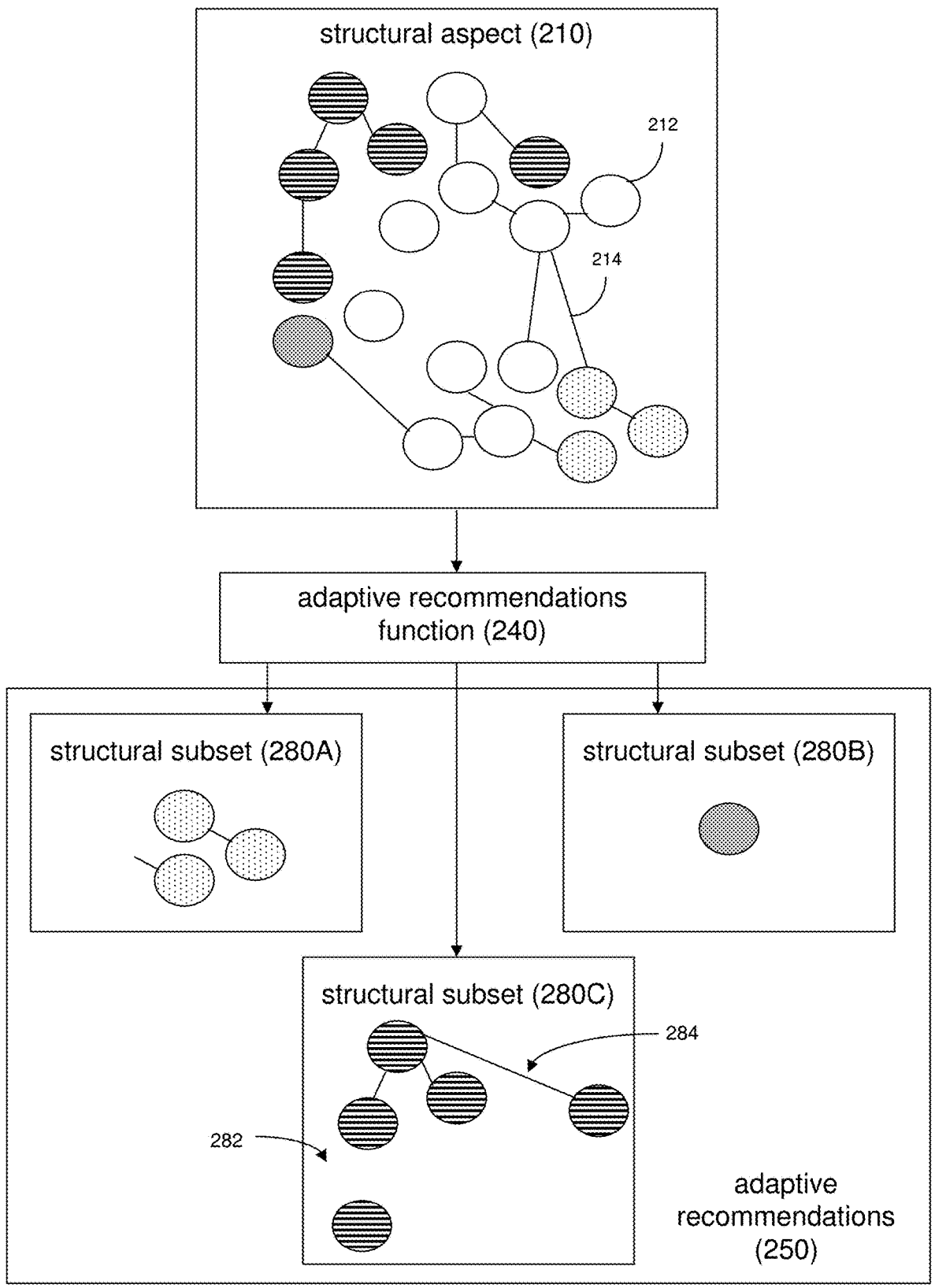
FIG. 11 is a block diagram showing structural subsets generated by the adaptive recommendations function of FIG. 7, according to some embodiments.

The adaptive recommendations 250 are presented as structural subsets of the structural aspect 210. FIG. 11 depicts a hypothetical structural aspect 210, including a plurality of objects 212 and associated relationships 214. The adaptive recommendations function 240 generates adaptive recommendations 250 based on usage of the structural aspect 210 by the one or more process participants 200, possibly in conjunction with considerations associated with the structural aspect 210 and the content aspect 230.

Three structural subsets 280A, 280B, and 280C (collectively, structural subsets 280) are depicted. The structural subset 280A includes three objects 212 and two associated relationships, which are reproduced by the adaptive recommendations function 240 in the same form as in the structural aspect 210 (objects are speckle shaded). The structural subset 280B includes a single object (object is shaded), with no associated relationships (even though the object originally had a relationship to another object in the structural aspect 210).

The third structural subset 280C includes five objects (striped shading), but the relationships between objects has been changed from their orientation in the structural aspect 210. In the structural subset 280C, a relationship 282 has been eliminated while a new relationship 284 has been formed by the adaptive recommendations function 240. The structural subsets 280 depicted in FIG. 11 represent but three of a myriad of possible structural subsets that may be derived from the original network of objects by the adaptive recommendations function 240.

The illustration in FIG. 11 shows a simplified representation of structural subsets 280 being generated from objects 212 and relationships 214 of the structural aspect 210. Although not shown, the structural subset 280 may also include corresponding associated subsets of the usage aspect 220, such as usage behaviors and usage behavioral patterns. As used herein, references to structural subsets 280 are meant to include the relevant subsets of the usage aspect, or usage subsets, as well.

The adaptive recommendations 250 may be in the context of a currently conducted activity or behavior detected by the adaptive system 100, a currently accessed object 232, or a communication with another process participant 200 or non-participant in the process 260. The adaptive recommendations 250 may also be in the context of a historical path of executed system activities, accessed objects 212, or communications during a specific user session or across user sessions. The adaptive recommendations 250 may be without context of a current activity, currently accessed object 212, current session path, or historical session paths. Adaptive recommendations 250 may also be generated in response to direct user requests or queries. Such user requests may be in the context of a current system navigation, access or activity, or may be outside of any such context.

Adaptive recommendations 250 generated by the adaptive recommendations function 240 may combine inferences from community, sub-community (including expert), and personal behaviors and preferences, as discussed above, to deliver to the one or more process participants 200, one or more system structural subsets 280. The process participants 200 may find the structural subsets particularly relevant given the current navigational context of the user within the system, the physical location of the user, and/or a response to an explicit request of the system by the one or more users. In other words, the adaptive recommendation function 240 determines preference "signals" from the "noise" of system usage behaviors.

The sources of user behavioral information, which typically include the objects 212 referenced by the user 200, may also include the actual information 232 contained therein. In generating adaptive recommendations 250, the adaptive system 100 may thus employ search algorithms that use text matching or more general statistical pattern matching to provide inferences on the inferred themes of the information 232 embedded in, or referenced by, individual objects 212. Furthermore, the structural aspect 210 may itself inform the specific adaptive recommendations 250 generated. For example, existing relationship structures within the structural aspect 210 at the time of the adaptive recommendations 250 may be combined with the user preference inferences based on usage behaviors, along with any inferences based on the content aspect 230 (the information 232).

Delivery of Adaptive Recommendations

Figure 12:
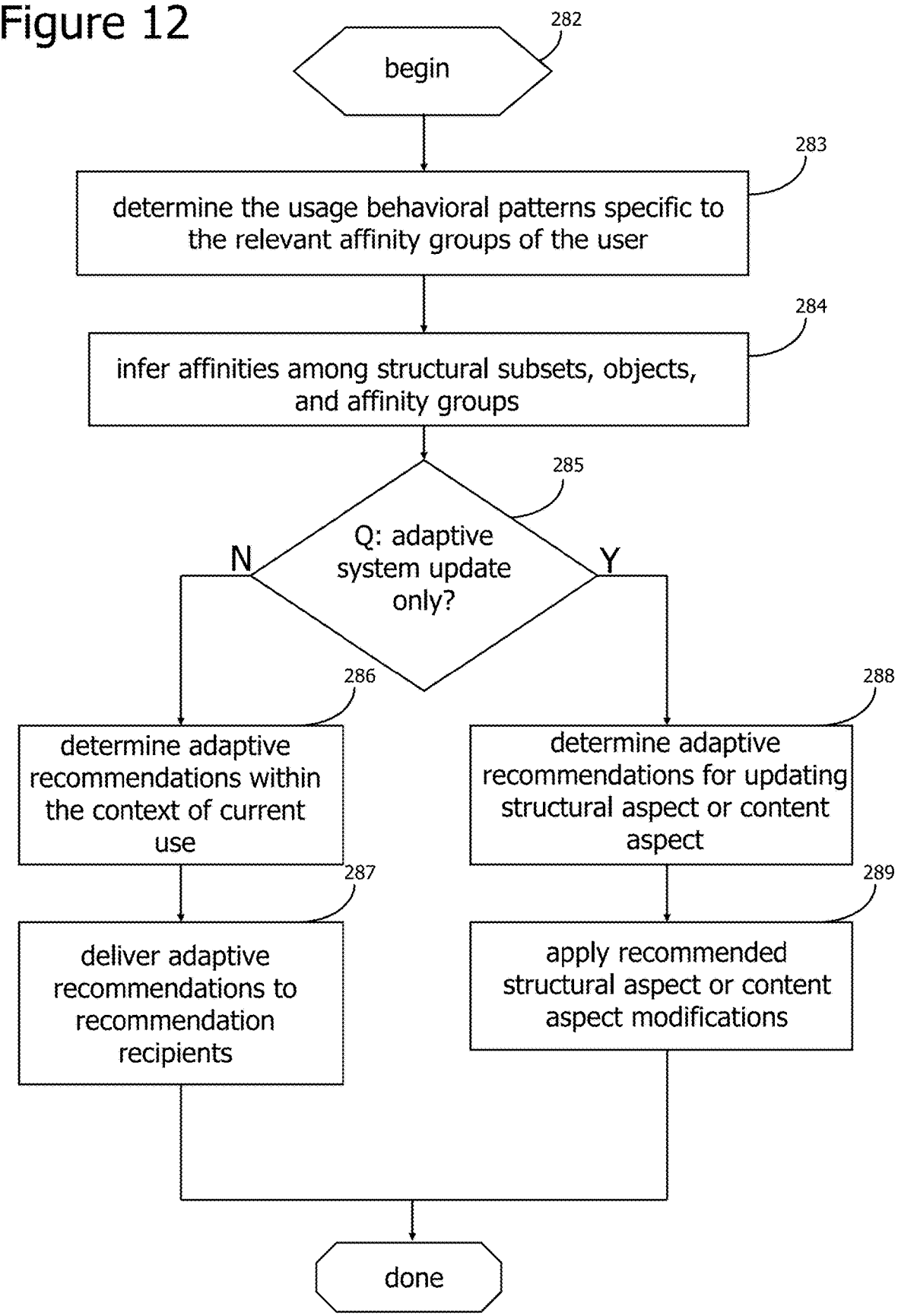
FIG. 12 is a flow chart showing how recommendations of the adaptive system of FIG. 7 are generated, whether to support system navigation and use or to update structural or content aspects of the adaptive system, according to some embodiments.

FIG. 12 is a flow diagram showing how adaptive recommendations 250 are delivered by the adaptive system 100. Recall from FIG. 7 that adaptive recommendations 250 may be delivered directly to the one or more users 200 (dotted arrow 910), or the adaptive recommendations function 240 may be applied to automatically or semi-automatically update the structural aspect 210 (dotted arrow 905) or the content aspect 230 (dotted arrow 935), or adaptive recommendations 250 may be delivered directly to the non-user 260 of the adaptive system 100 (dotted arrow 265).

The adaptive system 100 begins by determining the relevant usage behavioral patterns 248 (FIG. 9C) to be analyzed (block 283). The adaptive system 100 thus identifies the relevant communities, affinity groups, or user segments of the one or more process participants 200. Affinities are then inferred among objects 212, structural subsets 280, and among the identified affinity groups (block 284). This data enables the adaptive recommendations function 240 to generate adaptive recommendations 250 for multiple application purposes. The adaptive system 100 next determines whether the adaptive recommendations function 240 will generate recommendations 250 to be delivered directly to the recommendations recipients (e.g., 910 to process participants 200 or 265 to non-participants 260), or are to be used to update the adaptive system 100 (e.g., 905 to the structural aspect 210 or 935 to the content aspect 230) (block 285). Where the recommendations recipients are to directly receive the adaptive recommendations (the "no" prong of block 285), the adaptive recommendations 250 are generated based on mapping the context of the current system use (or "simulated" use if the current context is external to the actual use of the system) (block 286) to the usage behavior patterns 248 generated by the preference inferencing algorithm 242 (block 286).

Adaptive recommendations are then delivered visually and/or in other communications forms, such as audio, to the recommendations recipients (block 287). The recommendations recipients may be individual users or a group of users, or may be non-users 260 of the adaptive system 100. For Internet-based applications, the adaptive recommendations 250 may be delivered through a web browser directly, or through RSS/Atom feeds and other similar protocols.

Where, instead, adaptive system 100 itself is to be the "recipient" of the adaptive recommendations (the "yes" prong of block 285), the adaptive recommendations function 240 applies the adaptive recommendations to update the structural aspect 210 (905) or the content aspect 230 (935). The adaptive recommendations 250 generated by the adaptive recommendations function 240 are determined based, at least in part, on mapping potential configurations of the structural aspect 210 or content aspect 230 to the affinities generated by the usage behavioral inferences (block 288). The adaptive recommendations 905 or 935 are then delivered to enable updating of the structural aspect 210 or the content aspect 230 (block 289), respectively.

The adaptive recommendations function 240 may operate completely automatically, performing in the background and updating the structural aspect 210 independent of human intervention. Or, the adaptive recommendations function 240 may be used by users or experts who rely on the adaptive recommendations 250 to provide guidance in maintaining the system structure as a whole, or maintaining specific structural subsets 280 (semi-automatic maintenance of the structural aspect 210).

The navigational context for the recommendation 250 may be at any stage of navigation of the structural aspect 210 (e.g., during the viewing of a particular object 212) or may be at a time when the recommendation recipient is not engaged in directly navigating the structural aspect 210. In fact, the recommendation recipient need not have explicitly used the system associated with the recommendation 250.

Some inferences will be weighted as more important than other inferences in generating the recommendation 250. These weightings may vary over time, and across recommendation recipients, whether individual recipients or sub-community recipients. As an example, the characteristics associated with objects 212 which are explicitly stored or tagged by the user 200 in a personal structural aspect 210 would typically be a particularly strong indication of preference as storing or tagging system structural subsets requires explicit action by the user 200. The recommendations optimization algorithms 244 may thus prioritize this type of information to be more influential in driving the adaptive recommendations 250 than, say, general community traffic patterns within the structural aspect 210.

The recommendations optimization algorithm 244 will particularly try to avoid recommending objects 212 that the process participant or user 200 is already familiar with. For example, if the process participant 200 has already stored or tagged the object 212 in a personal structural subset 280, then the object 212 may be a low ranking candidate for recommendation to the user, or, if recommended, may be delivered to the user with a designation acknowledging that the user has already saved or marked the object for future reference. Likewise, if the user 200 has recently already viewed the associated system object (regardless of whether it was saved to his personal system), then the object would typically rank low for inclusion in a set of recommended objects.

The preference inferencing algorithm 242 may be tuned by the individual user. The tuning may occur as adaptive recommendations 250 are provided to the user, by allowing the user to explicitly rate the adaptive recommendations. The user 200 may also set explicit recommendation tuning controls to adjust the adaptive recommendations to her particular preferences. For example, the user 200 may guide the adaptive recommendations function 240 to place more relative weight on inferences of expert preferences versus inferences of the user's own personal preferences. This may particularly be the case if the user was relatively inexperienced in the corresponding domain of knowledge associated with the content aspect 230 of the system, or a structural subset 280 of the system. As the user's experience grows, she may adjust the weighting toward inferences of the user's personal preferences versus inferences of expert preferences.

Adaptive recommendations, which are structural subsets of the adaptive system 100 (see FIG. 11), may be displayed in variety of ways to the user. The structural subsets 280 may be displayed as a list of objects 212 (where the list may be null or a single object). The structural subset 280 may be displayed graphically. The graphical display may provide enhanced information that may include depicting relationships among objects (as in the "relationship" arrows of FIG. 6).

In addition to the structural subset 280, the recommendation recipient may be able to access information or logic to assist in gaining an understanding about why the particular structural subset was selected as the recommendation to be presented to the user. The reasoning may be fully presented to the recommendation recipient as desired by the recommendation recipient, or it may be presented through a series of interactive queries and associated answers, where the recommendation recipient desires more detail. The reasoning may be presented through display of the logic of the recommendations optimization algorithm 244. A natural language (e.g., English) interface may be employed to enable the reasoning displayed to the user to be as explanatory and human-like as possible.

The personal preference of the user may affect the nature of the display of the information. For example some users may prefer to see the structural aspect in a visual, graphic format while other users may prefer a more interactive question and answer or textual display.

Users of the adaptive system 100, and by extension, process participants 200, may be explicitly represented as objects in the structural aspect 210 and hence embodied in structural subsets 280. Either embodied as structural subsets or represented separately from structural subsets 280, the adaptive recommendations 250 may include a set of users of the adaptive system 100 that are determined and displayed to recommendation recipients, providing either implicit or explicit permission is granted by the set of users to be included in the adaptive recommendations 250. The recommendations optimization algorithm 244 may match the preferences of other users of the system with the current user. The preference matching may include applying inferences derived from the characteristics of structural subsets stored or tagged by users, their structural subset subscriptions and other self-profiling information, and their system usage patterns 248. Information about the recommended set of users may be displayed. This information may include names, as well as other relevant information such as affiliated organization and contact information. The information may also include system usage information, such as common system objects subscribed to, etc. As in the case of structural subset adaptive recommendations, the adaptive recommendations of other users may be tuned by an individual user through interactive feedback with the adaptive system 100.

The adaptive recommendations 250 may be in response to explicit requests from the user. For example, a user may be able to explicitly designate one or more objects 212 or structural subsets 280, and prompt the adaptive system 100 for a recommendation based on the selected objects or structural subsets. The recommendations optimization algorithm 244 may put particular emphasis on the selected objects or structural subsets, in addition to applying inferences on preferences from usage behaviors, as well as optionally, content characteristics.

In some embodiments, the adaptive recommendations function 240 may augment the preference inferencing algorithm 242 with considerations related to enhancing the revelation of user preferences, so as to better optimize the adaptive recommendations 250 in the future. In other words, where the value of information associated with reducing uncertainty associated with user preferences is high, the adaptive recommendations function 240 may choose to recommend objects 212 or other recommended structural aspects 210 as an "experiment." For example, the value of information will typically be highest for relatively new users, or when there appears to be a significant change in usage behavioral pattern 248 associated with the user 200. The adaptive recommendations function 240 may employ design of experiment (DOE) algorithms so as to select the best possible "experimental" adaptive recommendations, and to optimally sequence such experimental adaptive recommendations, and to adjust such experiments as additional usage behaviors 270 are assimilated. In some embodiments, the adaptive recommendations function 240 may apply methods and systems disclosed in U.S. Provisional Patent Application Ser. No. 60/652,578, entitled "Adaptive Decision Process," filed Feb. 14, 2005, which is incorporated by reference herein, as if set forth in its entirety.

The preference inferencing 242 and recommendations optimization 244 algorithms may also preferentially deliver content that is specially sponsored; for example, promotional, advertising or public relations-related content.

In summary, the adaptive recommendations generated by the adaptive recommendations function 240 may be delivered 910 to the users 200, delivered 265 to the non-user 260, or delivered 905, 935 back to the adaptive system 100, for updating either the structural aspect 210 (905) or the content aspect 230 (935). The adaptive recommendations 250 generated by the adaptive recommendations function 240 will thus influence subsequent user interactions and behaviors associated with the adaptive system 100, creating a dynamic feedback loop.

Automatic or Semi-Automatic System Structure Maintenance

The adaptive recommendations function 240, optionally in conjunction with system structure maintenance functions that reside within, or are accessible by, the adaptive computer-based application 925 (not shown), may be used to automatically or semi-automatically update and enhance the structural aspect 210 of the adaptive system 100. The adaptive recommendations function 240 may be employed to determine new relationships 214, or modify existing relationships 214, among objects 212 in the adaptive system, within structural subsets 280, or among structural subsets associated with a specific sub-community. The automatic updating may include potentially assigning a relationship between any two objects to zero (effectively deleting the relationship between the two objects). The modified relationships may represent the workflow sequencing among objects within the structural aspect 210, where objects represent a process, sub-process or activity.

In either an autonomous mode of operation, or in conjunction with human expertise, the adaptive recommendations function 240 may be used to integrate new objects 212 into the structural aspect 210, or to delete existing objects 212 from the structural aspect.

The adaptive recommendations function 240 may also be extended to scan and evaluate structural subsets 280 that have special characteristics. For example, the adaptive recommendations function 240 may suggest that certain of the structural subsets that have been evaluated are candidates for special designation. This may include being a candidate for becoming a new specially designated sub-system or structural subset. The adaptive recommendations function 240 will present to human users or experts the structural subset 280 that is suggested to become a new sub-system or structural subset, along with existing sub-system or structural subsets that are deemed "closest" in relationship to the new suggested structural subset. A human user or expert may then be invited to add the object or objects 212, and may manually create relationships 214 between the new object and existing objects.

As another alternative, the adaptive recommendations function 240, optionally in conjunction with the system structure maintenance functions, may automatically generate the object or objects 212, and may automatically generate the relationships 214 between the newly created object and other objects 212 in the structural aspect 210.

This capability is extended such that the adaptive recommendations function 240, in conjunction with system structure maintenance functions, automatically maintains the structural aspect and identified structural subsets 280. The adaptive recommendations function 240 may identify new objects 212, generate associated objects 212, and generate associated relationships 214 among the new objects 212 and existing objects 212, but also may identify objects 212 that are candidates for deletion. The adaptive recommendations function 240 may also automatically delete the object 212 and its associated relationships 214.

The adaptive recommendations function 240, in conjunction with system structure maintenance functions, may apply "global" considerations and logic when conducting modifications to the structural aspect 210 to ensure effective use and navigation of the structural aspect 210. For example, thresholds or limits may guide the absolute number or relative number of relationships among objects. Similarly, rules may be applied to the number of elements in the structural aspect 210 as a whole, or within designated subsets of structural aspect 210. Rules related to the duration an object 212 has been incorporated within the structural aspect 210, or collective quality thresholds for objects 212 may also be applied. These global rules help ensure that adaptive system 100 performs at an optimum possible level of efficiency and effectiveness for process participants 200 collectively, according to some embodiments.

In this way the adaptive recommendations function 240, optionally in conjunction with a system structure maintenance function, may automatically adapt the structural aspect 210 of the adaptive system 100, whether on a periodic or continuous basis, so as to optimize the user experience.

In some embodiments, each of the automatic steps listed above with regard to updating the structural aspect 210 may be employed interactively by human users and experts as desired.

Hence, the adaptive recommendations function 240, driven in part by usage behaviors, automatically or semi-automatically updates the system structural aspect 210 (see dotted arrow 905 in FIG. 7). The feedback loop is closed as process participant interactions with the adaptive system 100 are influenced by the structural aspect 210, providing an adaptive, self-reinforcing feedback loop between the usage aspect 230 and the structural aspect 210.

Automatic or Semi-Automatic System Content Maintenance

As shown in FIG. 7, the adaptive recommendations function 240 may provide the ability to automatically or semi-automatically update the content aspect 230 of the adaptive system 100 (see dotted arrow 935). Examples of on-line content or information 232 within the content aspect 230 that may be updated or modified include text, animation, audio, video, tutorials, manuals, executable code, and interactive applications. Further, meta-information 234, such as reviews and brief descriptions of the content may also be updated or modified 935.

The content aspect information items 232 may be directly modified 235 by the adaptive recommendations function 240. Following are some illustrative examples. For text-based information 232, words or phrases may be altered, alternative languages may be applied, and/or the formatting of information 232 may be altered 235. Hyperlinks may be added or deleted to text-based information 232. For image or graphical-based information 232, images may be altered 235, or formatting such as color may be adjusted 235. For audio-based or video-based information 232, alternative languages may be applied 235 and/or alternative sound tracks may be applied 235.

Advertising or promotional elements may be added, deleted, or adjusted within information 232.

Customized text or multi-media content suitable for online viewing or printing may be generated and stored 235 in the content aspect 230. U.S. patent application Ser. No. 10/715,174 entitled "A Method and System for Customized Print Publication and Management" discloses relevant approaches for updating the content aspect 230 with adaptive print media instances and is incorporated by reference herein, as if set forth in its entirety.

The adaptive recommendations function 240 may operate automatically, performing in the background and updating the content aspect 230 independently of human intervention. Or, the adaptive recommendations function 240 may be used by users 200 or special experts who rely on the adaptive recommendations 250 to provide guidance in maintaining the content aspect 230.

As in the case of the structural aspect 210, different communities may also be used to model the maintenance of the content aspect 230. The communities, affinity groups, and user segments are used to adapt the relevancies and to create, alter or delete relationships 214 between the objects 212. The adaptive recommendations 250 may present the objects 212 to the user 200 in a different combination than initially may have been assembled or inputted, and may treat sections of a superordinate object 212 such as a document, book, manual, video, sound track, or interactive software as multiple subordinate objects 212 that can be recombined in a pattern that is aligned with community usage, by creating or altering relationships between sections of the superordinate object 212.

In addition, as user feedback on system activities and usage behavioral patterns 248 is accumulated, the adaptive system 100 may suggest areas where additional content would be beneficial to users. For example, if the object 212 is frequently rated by users 200 as difficult to understand, or if only expert users in a community are accessing the object, the adaptive system 100 may recognize the need for generating supplemental content (e.g., in the form of documentation or online tutorials or demonstrations), and/or a need to re-structure object 212 and/or the associated meta-information 234 or information 232.

The re-structuring 935 of the object 212 may include decomposing the associated meta-information 234 or information 232 into subordinate objects 212, and/or meta-information 234 or information 232, and applying appropriate relationships 214 to these newly created elements.

Hence, as shown in FIG. 7, the adaptive recommendations function 240, driven in part by usage behaviors 270 (see FIG. 9C), automatically or semi-automatically updates 935 the content aspect 230. The feedback loop is closed as the interactions of the user 200 with the adaptive system 100 are influenced by updates to the content aspect 230, providing an adaptive, self-reinforcing feedback loop between the usage aspect 210 and the content aspect 230, and, in some embodiments, between the usage aspect 210, the structural aspect 220, and the content aspect 230.

Network-Based Embodiments

The structural aspect 210 of the adaptive system 100 may be based on a network structure. The structural aspect 210 thus includes two or more objects, along with associated relationships among the objects. Networks, as used herein, are distinguished from other structures, such as hierarchies, in that networks allow potential relationships between any two objects of a collection of objects. In a network, there does not necessarily exist well-defined parent objects, and associated children, grandchildren, etc., objects, nor a "root" object associated with the entire system, as there would be by definition in a hierarchy. In other words, networks may include cyclic relationships that are not permitted in strict hierarchies. As used herein, a hierarchy can be thought of as just one particular form of a network, with some additional restrictions on relationships among network objects.

The structural aspect 210 of the adaptive system 100 may also have a fuzzy network structure. Fuzzy networks are distinguished from other types of network structures in that the relationships between objects in fuzzy networks may be by degree. In non-fuzzy networks, the relationships between objects are binary. Thus, in non-fuzzy networks, between any two objects relationships either exist or they do not exist.

As used herein, a fuzzy network is defined as a network of information in which each individual item of information may be related to any other individual item of information, and the associated relationship between the two items may be by degree. A fuzzy network can be thought of abstractly as a manifestation of relationships among fuzzy sets (rather than classical sets), hence the designation "fuzzy network." As used herein, a non-fuzzy network is a subset of a fuzzy network, in which relationships are restricted to binary values (i.e., relationship either exists or does not exist).

Generalizing further, both classical networks and fuzzy networks may have a-directional (also called non-directed) or directed links between nodes. Four network topologies are listed in Table 2.

TABLE 2

Network Topologies

| network type | links between nodes | link type |
| --- | --- | --- |
| type i (classical) | binary | a-directional |
| type ii (classical) | binary | distinctly directional |

TABLE 2-continued

Network Topologies

| network type | links between nodes | link type |
| --- | --- | --- |
| type iii (fuzzy) | multi-valued | a-directional |
| type iv (fuzzy) | multi-valued | distinctly directional |

The first two types (i and ii) are classical networks. Fuzzy networks, as used herein, are networks with topologies iii or iv.

For each of the four network topologies listed in Table 2, another possible variation exists: whether the network allows only a single link or multiple links between any two nodes, where the multiple links may correspond to multiple types of links. For example, the fuzzy network types (iii and iv) of Table 2 may permit multiple directionally distinct and multi-valued links between any two nodes in the network. The adaptive system 100 encompasses any of the network topologies listed in Table 2, including those which allow multiple links and multiple link types between nodes.

Mathematically, for a non-fuzzy network, it can be said, without loss of generality, that a relationship translates to either a "0" or a "1"–"0," for example if there is not a relationship, and "1" if there is a relationship. For fuzzy networks, the relationships between any two nodes, when normalized, may have values along a continuum between 0 and 1 inclusive, where 0 implies no relationship between the nodes, and 1 implies the maximum possible relationship between the nodes.

The structural aspect 210 of the adaptive system 100 of FIG. 7 may support any of the network topologies described above. A-directional relationships between nodes (no arrows), directed relationships between nodes (whether single- or double-arrow), and multiple types of relationships between nodes, are supported by the adaptive system 100. Further, relationship indicators which are binary (e.g., 0 or 1) or multi-valued (e.g., range between 0 and 1) are supported by the adaptive system.

It can readily be seen that a hierarchy may be described as a directed fuzzy network with the additional restrictions that the relationship values and indicators associated with each relationship must be either "1" or "0" (or the symbolic equivalent). Further, hierarchies do not support cyclic or closed relationship paths.

Figure 13:
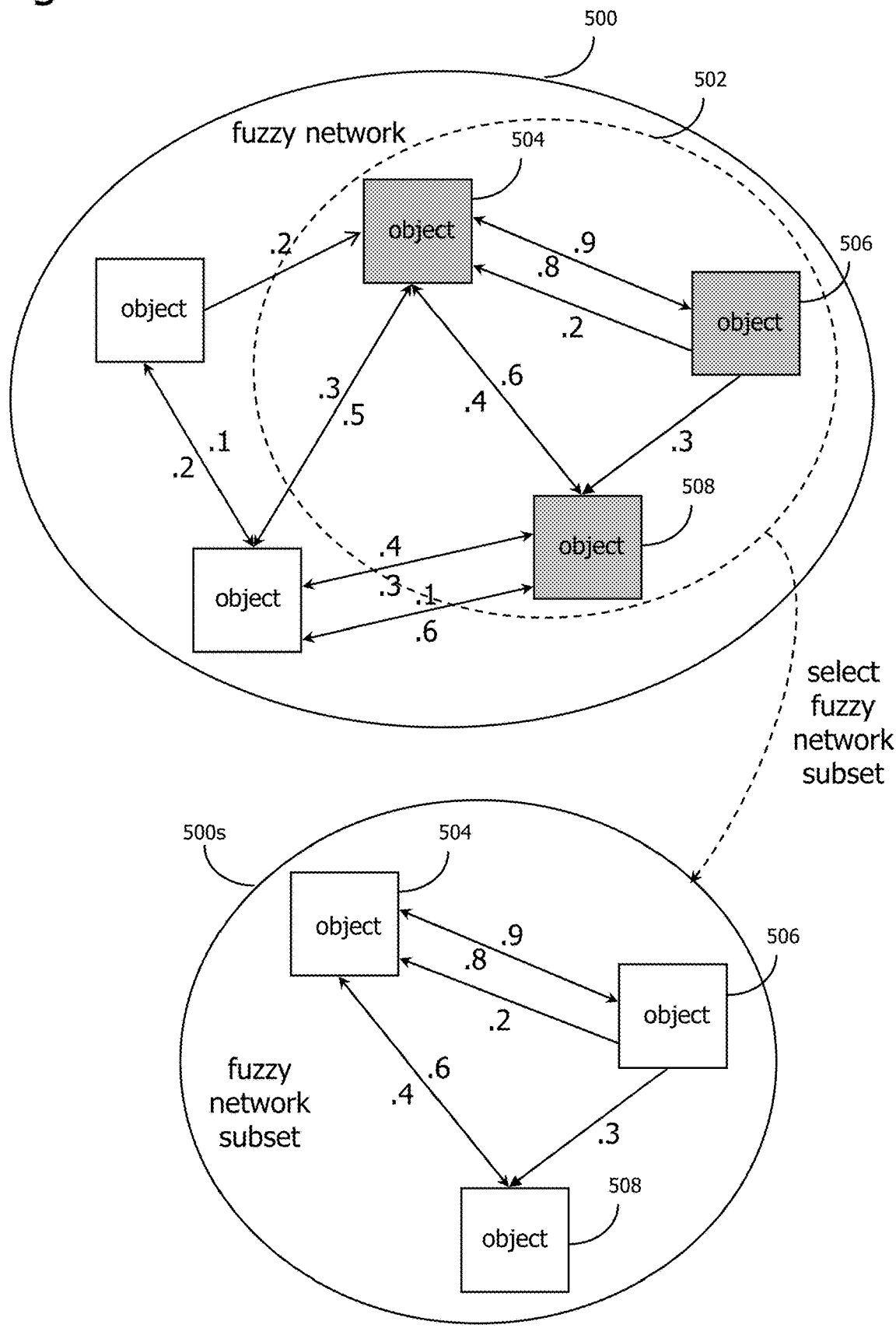
FIG. 13 is a block diagram of a fuzzy network selection operation, according to some embodiments.

FIG. 13 illustrates a fuzzy network 500, including a subset 502 of fuzzy network 500. The subset 502 includes three objects 504, 506, and 508, designated as shaded for ease of identification. The subset 502 also includes associated relationships (arrows) and relationship indicators or weightings (values) among the three objects. The separated subset of the network 502 yields a fuzzy network (subset) 500s.

A particular implementation of a fuzzy network structure, a fuzzy content network, which may advantageously constitute the fuzzy network 500, is disclosed in U.S. Pat. No. 6,795,826, entitled "Fuzzy Content Network Management and Access," and is incorporated by reference herein, as if set forth in its entirety.

Figure 14:
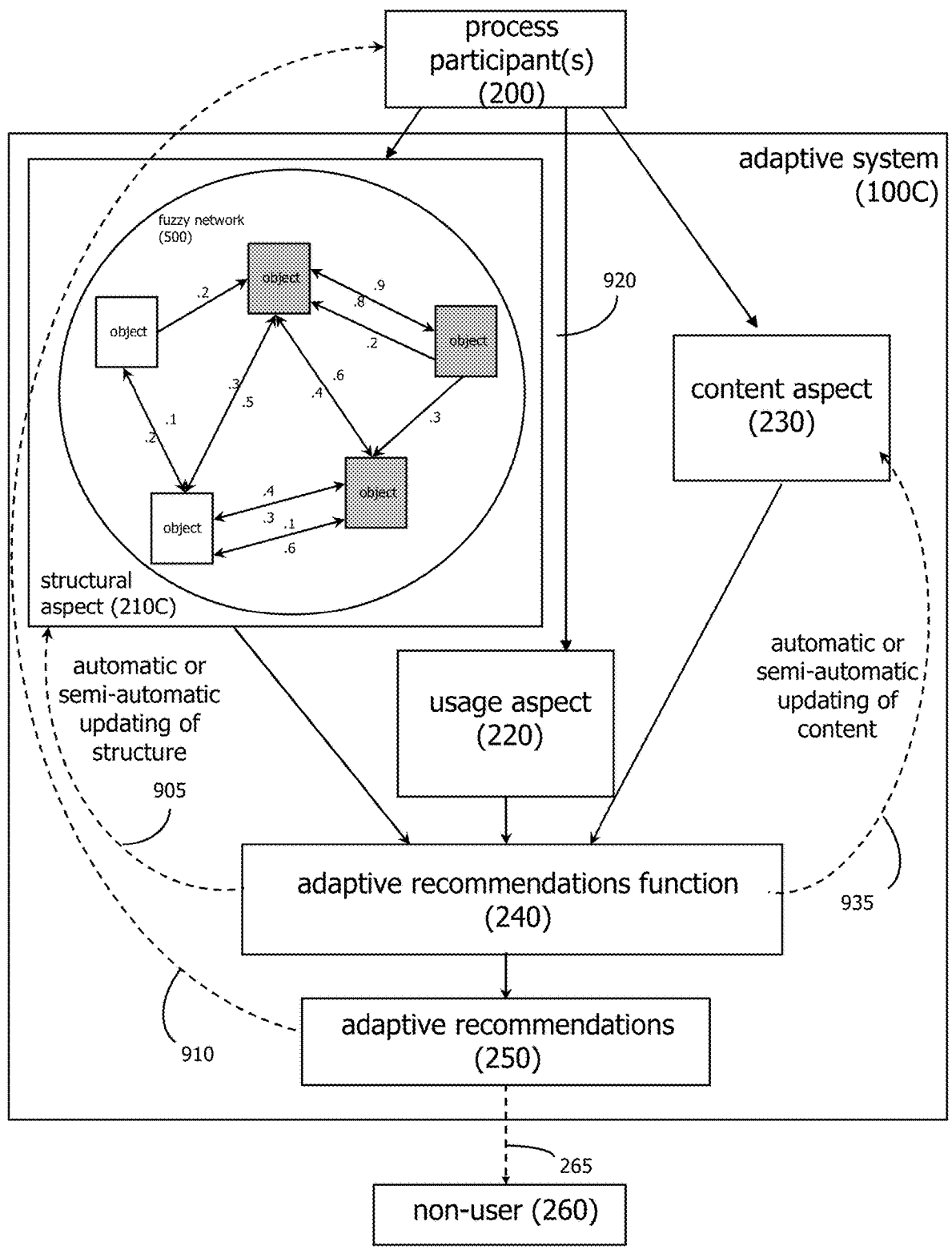
FIG. 14 is a block diagram of the adaptive system of FIG. 7 in which the structural aspect is a fuzzy network, according to some embodiments.

The adaptive system 100 of FIG. 7 may utilize fuzzy network structures, such as the fuzzy network 500 of FIG. 13. In FIG. 14, an adaptive system 100C includes a structural aspect 210C that is a fuzzy network 500. Thus, adaptive recommendations 250 generated by the adaptive system 100C are also structural subsets that are themselves fuzzy networks. Further, although not explicitly shown in FIG. 14, the usage aspect 220 may also be entirely, or in part, represented by a fuzzy network.

Figure 15:
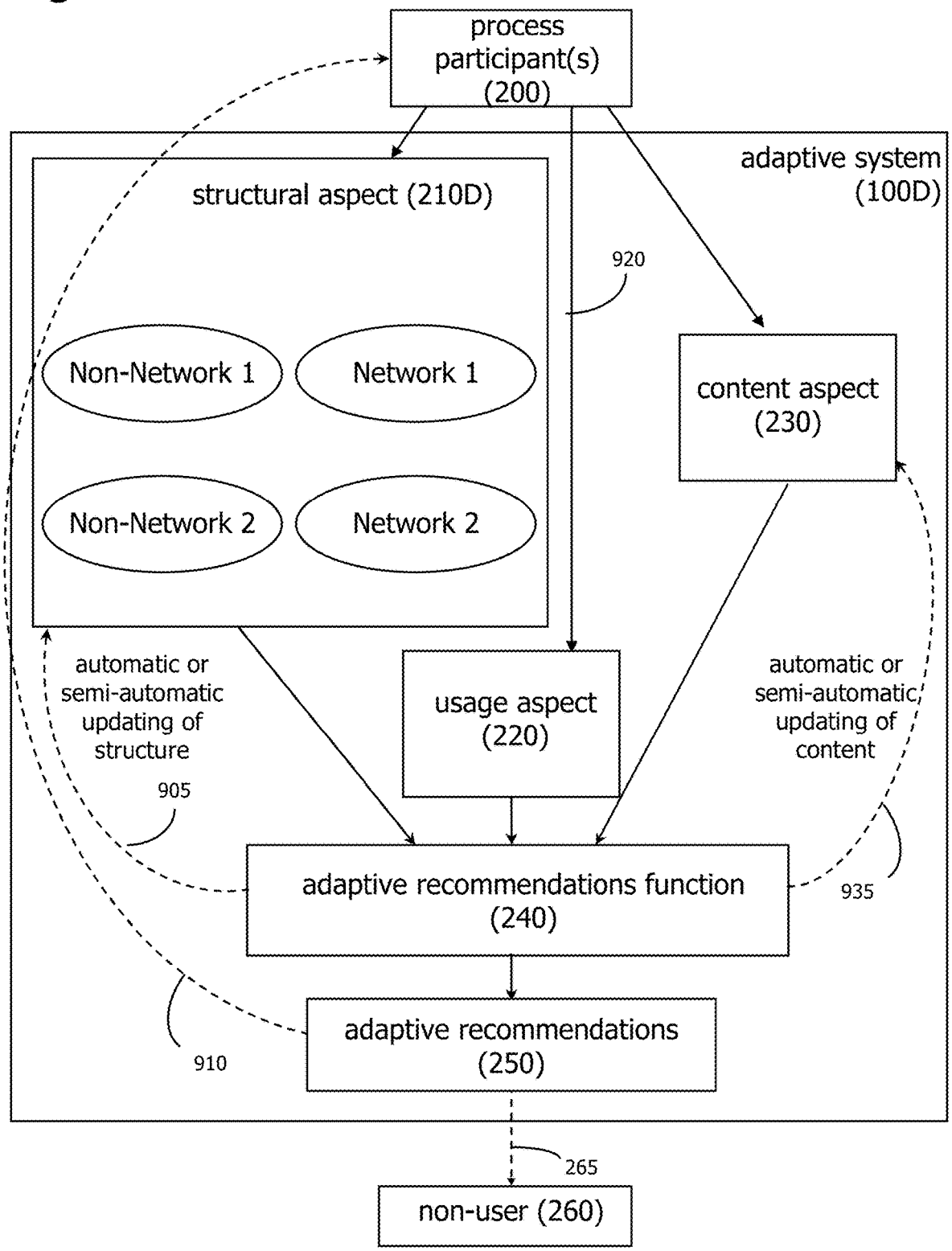
FIG. 15 is a block diagram of a structural aspect including multiple network-based structures, according to some embodiments.

The structural aspect 210 of the adaptive system 100 may include multiple types of structures, comprising network-based structures, non-network-based structures, or combinations of network-based structures and non-network-based structures. In FIG. 15, the adaptive system 100D includes a structural aspect 210D, which includes multiple network-based structures and non-network-based structures. The multiple structures of 210D may reside on the same computer system, or the structures may reside on separate computer systems.

Adaptive Recombinant Systems

Figure 16:
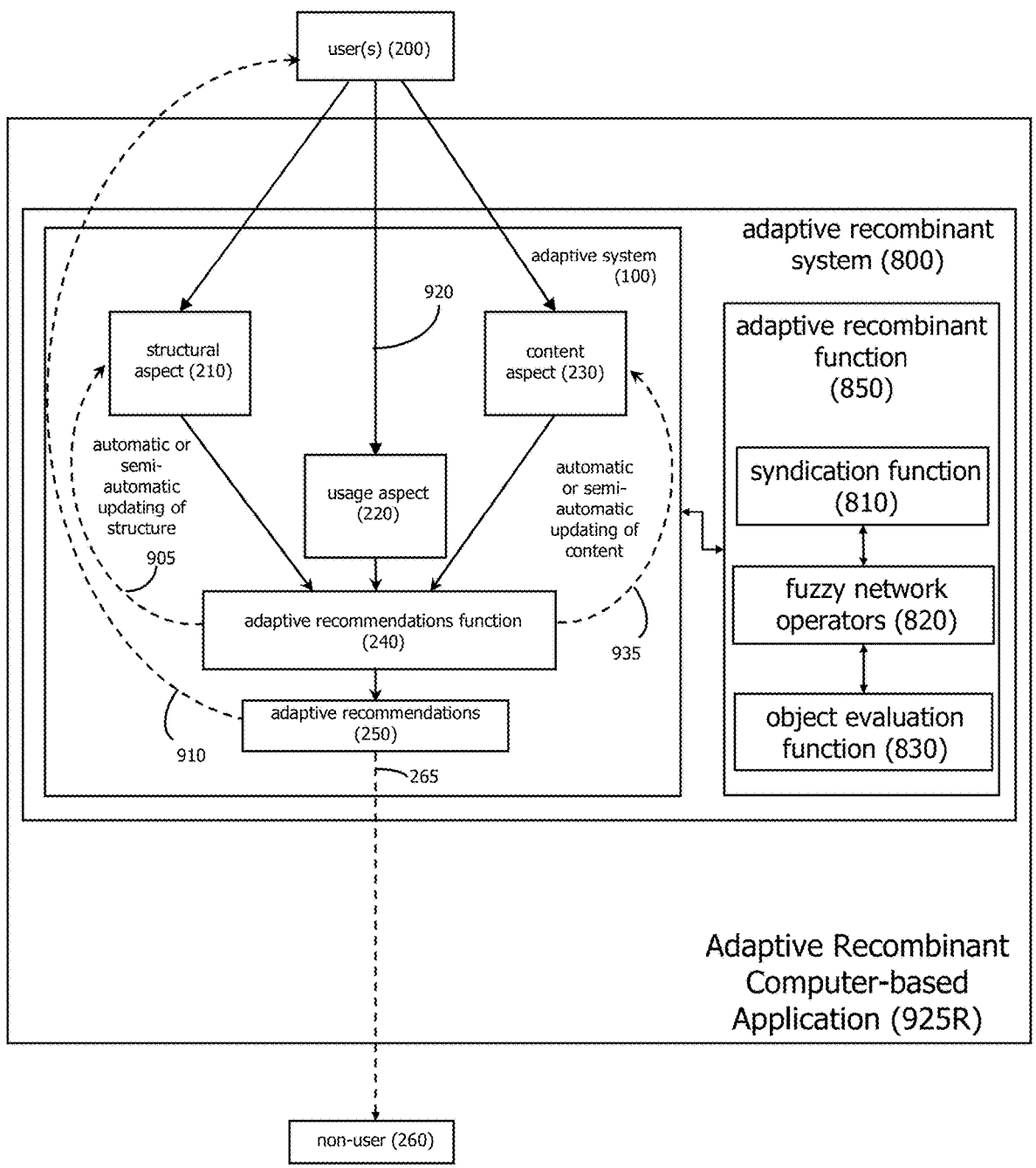
FIG. 16 is a block diagram of an adaptive recombinant system, according to some embodiments.

In FIG. 16, according to some embodiments, a particular configuration of the adaptive recombinant computer-based application 925R (FIG. 4C) is depicted, in which the adaptive recombinant computer-based application 925R includes an adaptive recombinant system 800. The adaptive recombinant system 800 includes the adaptive system 100 of FIG. 7, as well as the adaptive recombinant function 850. The adaptive recombinant function 850 includes a syndication function 810, a fuzzy network operators function 820, and an object evaluation function 830. Just as the adaptive system 100 may be part of the adaptive process 900, the adaptive recombinant system 800 may be part of the adaptive recombinant process 901. The adaptive recombinant function 850, including the syndication function 810, the fuzzy network operators function 820, and the object evaluation function 830 functions may all reside within the adaptive recombinant computer-based application 925R, as shown in FIG. 16, or one or all of the functions may be external to the computer-based application 925R.

The adaptive recombinant system 800 is capable of syndicating and recombining structural subsets 280. The structural subsets 280 may be derived through either direct access of the structural aspect 210 by the fuzzy network operators function 820, or the structural subsets 280 may be generated by the adaptive recommendations function 240. The adaptive recombinant system 800 of FIG. 16 is capable of syndicating (sharing) and recombining the structural subsets, whether for display to the user 200 or non-user 260, or to update the structural aspect 210 and/or the content aspect 230 of the adaptive system 100. In addition, these functions are capable of accessing and updating multiple adaptive systems 100, or aiding in the generation of a new adaptive system 100.

The syndication function 810 may syndicate elements of the usage aspect 220 associated with syndicated structural subsets 280, thus enabling elements of the usage clusters and patterns, along with the corresponding structural subsets, to be combined with other structural subsets and associated usage clusters and patterns.

As explained above, the structural aspect 210 of the adaptive system 100 may employ a network structure, and is not restricted to a particular type of network. In some embodiments, the adaptive recombinant system 800 operates in conjunction with an adaptive system in which the structural aspect 210 is a fuzzy network. The structural subsets 280 generated by the adaptive recombinant system 800 during syndication or recombination are likewise fuzzy networks in these embodiments, and are also called adaptive recombinant fuzzy networks. Recall that a structural subset is a portion or subset of the structural aspect 210 of the adaptive system 100. The structural subset 280 may include a single object, or multiple objects, and, optionally, their associated relationships.

The adaptive recombinant system 800 of FIG. 16 is able to syndicate and combine structural subsets 280 of the structural aspect 210 (where a structural subset 280 may contain the entire structural aspect 210). The structural subsets 280, which are fuzzy networks, in some embodiments, may be syndicated in whole or in part to other computer networks, physical computing devices, or in a virtual manner on the same computing platform or computing network. Although the adaptive recombinant system 800 is not limited to generating structural subsets which are fuzzy networks, some of the following figures and descriptions, used to illustrate the concepts of syndication and recombination, feature fuzzy networks. Designers of ordinary skill in the art will recognize that the concepts of syndication and recombination may be generalized to other types of networks.

Figure 17:
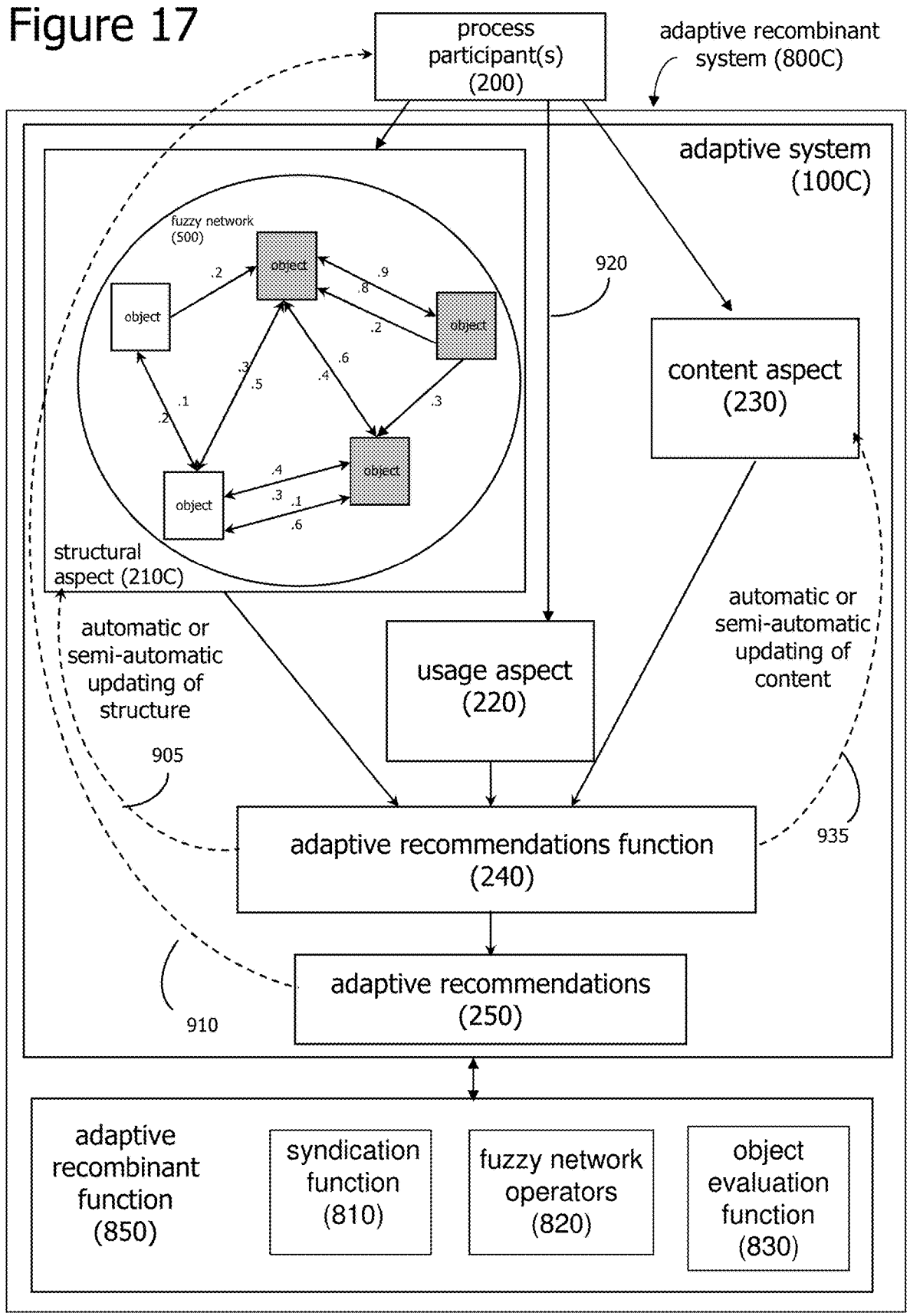
FIG. 17 is a block diagram of the adaptive recombinant system of FIG. 16 in which the structural aspect is a fuzzy network, according to some embodiments.

Thus, the adaptive recombinant system 800 of FIG. 16 may utilize fuzzy network structures. In FIG. 17, an adaptive recombinant system 800C includes the adaptive system 100C of FIG. 14, in which the structural aspect 210C is a fuzzy network. Thus, the adaptive recombinant system 800C may perform syndication and recombination operations, as described above, to generate structural subsets that are fuzzy networks.

Fuzzy Network Subsets and Adaptive Operators

The adaptive recombinant system 800 of FIG. 16 includes fuzzy network operators 820. The fuzzy network operators 820 may manipulate one or more fuzzy or non-fuzzy networks. Some of the operators 820 may incorporate usage behavioral inferences associated with the fuzzy networks that the operators act on, and therefore these operators may be termed "adaptive fuzzy network operators." The fuzzy network operators 820 may apply to any fuzzy network-based system structure, including fuzzy content network system structures, described further below.

Figure 18:
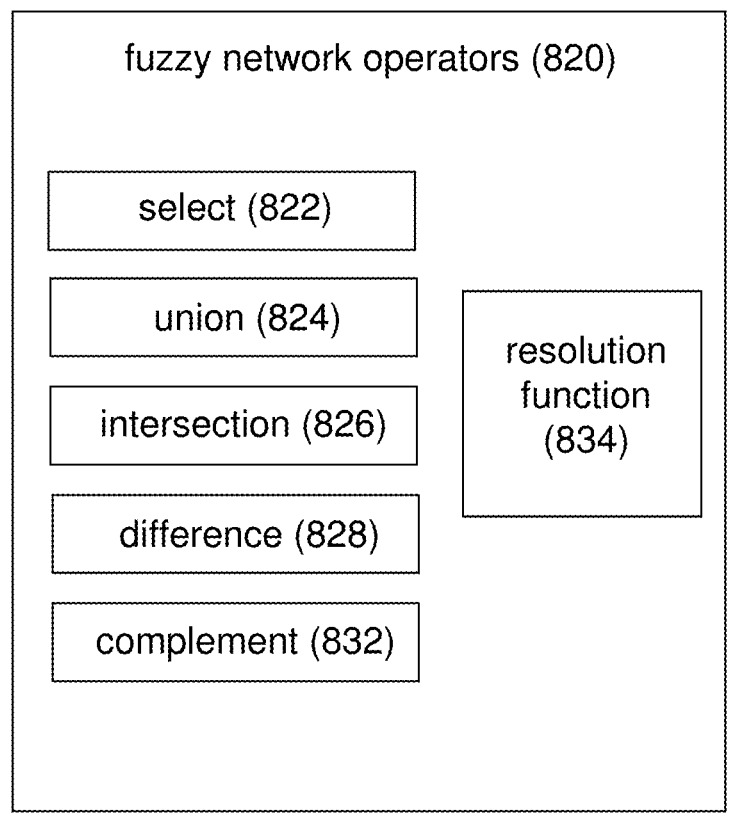
FIG. 18 is a block diagram of the fuzzy network operators used by the adaptive recombinant system of FIG. 16, according to some embodiments.

FIG. 18 is a block diagram depicting some fuzzy network operators 820, also called functions or algorithms, used by the adaptive recombinant system 800. A selection operator 822, a union operator 824, an intersection operator 826, a difference operator 828, and a complement operator 832 are included, although additional logical operations may be used by the adaptive recombinant system 800. Additionally, the fuzzy network operators 820 include a resolution function 834, which is used in conjunction with one or more of the operators in the fuzzy network operators 820.

A selection operator 822, which selects subsets of networks, may designate the selected network subsets based on degrees of separation. For example, subsets of a fuzzy network may be selected from the neighborhood, around a given node, say Node X. The selection may take the form of selecting all nodes within the designated network neighborhood, or all the nodes and all the associated links as well within the designated network neighborhood, where the network neighborhood is defined as being within a certain degree of separation from Node X. A non-null fuzzy network subset will therefore contain at least one node, and possibly multiple nodes and relationships.

Two or more fuzzy network subsets may then be operated on by network operations such as union, intersection, difference, and complement, as well as any other network operators that are analogous to Boolean set operators. An example is an operation that outputs the intersection (intersection operator 826) of the network subset defined by the first degree or less of separation from Node X and the network subset defined by the second or less degree of separation from Node Y. The operation would result in the set of nodes and relationships common to these two network subsets, with special auxiliary rules optionally applied to resolve duplicative relationships as explained below.

The fuzzy network operators 820 may have special capabilities to resolve the situation in which union 824 and intersection 826 operators define common nodes, but with differing relationships or values of the relationships among the common nodes. The fuzzy network intersection operator 826, Fuzzy_Network_Intersection, may be defined as follows:

$$Z=\text{Fuzzy\_Network\_Intersection}(X,Y,W)$$

where X, Y, and Z are network subsets and W is the resolution function 834. The resolution function 834 designates how duplicative relationships among nodes common to fuzzy network subsets X and Y are resolved.

Specifically, the fuzzy network intersection operator 826 first determines the common nodes of network subsets X and Y, applying the object evaluation function 830 to determine the degree to which nodes are identical, to form a set of nodes, network subset Z. The fuzzy network intersection operator 826 then determines the relationships and associated relationship value and indicators uniquely deriving from X among the nodes in Z (that is, relationships that do not also exist in Y), and adds them into Z (attaching them to the associated nodes in Z). The operator then determines the relationships and relationship indicators and associated values uniquely deriving from Y (that is, relationships that do not also exist in X) and applies them to Z (attaching them to the associated nodes in Z).

For relationships that are common to X and Y, the resolution function 834 is applied. The resolution function 834 may be any mathematical function or algorithm that takes the relationship values of X and Y as arguments, and determines a new relationship value and associated relationship indicator.

The resolution function 834, Resolution_Function, may be a linear combination of the corresponding relationship value of X and the corresponding relationship value of Y, scaled accordingly. For example:

$$\text{Resolution\_Function}(X_{RV},Y_{RV})=(c_1{}^*X_{RV}+c_2{}^*Y_{RV})/(c_1+c_2)$$

where $X_{RV}$ and $Y_{RV}$ are relationship values of X and Y, respectively, and $c_1$ and $c_2$ are coefficients. If $c_1=1$, and $c_2=0$, then $X_{RV}$ completely overrides $Y_{RV}$. If $c_1=0$ and $c_2=1$, then $Y_{RV}$ completely overrides $X_{RV}$. If $c_1=1$ and $c_2=1$, then the derived relationship is a simple average of $X_{RV}$ and $Y_{RV}$. Other values of $c_1$ and $c_2$ may be selected to create weighted averages of $X_{RV}$ and $Y_{RV}$. Nonlinear combinations of the associated relationships values, scaled appropriately, may also be employed.

The Fuzzy_Network_Union operator 824 may be derived from the Fuzzy_Network_Intersection operator 826, as follows:

$$Z=\text{Fuzzy\_Network\_Union}(X,Y,W)$$

where X, Y, and Z are network subsets and W is the resolution function 834. Accordingly, $$Z=\text{Fuzzy\_Network\_Intersection}(X,Y,W)+(X-Y)+(Y-X)$$

That is, fuzzy network unions of two network subsets may be defined as the sum of the differences of the two network subsets (the nodes and relationships that are uniquely in X and Y, respectively) and the fuzzy network intersection of the two network subsets. The resulting network subset of the difference operator contains any unique relationships between nodes uniquely in an originating network subset and the fuzzy network intersection of the two subsets. These relationships are then added to the fuzzy network intersection along with all the unique nodes of each originating network subset, and all the relationships among the unique nodes, to complete the resulting fuzzy network subset.

For the adaptive recombinant system 800, the resolution function 834 that applies to operations that combine multiple networks may incorporate usage behavioral inferences related to one or all of the networks. The resolution function 834 may be instantiated directly by the adaptive recommendations function 240 (FIG. 16), or the resolution function 834 may be a separate function that invokes the adaptive recommendations function. The resulting relationships in the combined network will therefore be those that are inferred by the system to reflect the collective usage histories and preference inferences of the predecessor networks.

For example, where one of the predecessor networks was used by larger numbers of individuals, or by individuals that members of communities or affinity groups that are inferred to be best informed on the subject of the associated content, then the resolution function 834 may choose to preferentially weight the relationships of that predecessor network higher versus the other predecessor networks. The resolution function 834 may use any or all of the usage behaviors 270, along with associated user segmentations and affinities obtained during usage behavior pre-processing 204 (see FIG. 9C), as illustrated in FIG. 6 and Table 1, and combinations thereof, to determine the appropriate resolution of common relationships and relationship values among two or more networks that are combined into a new network.

The object evaluation function 830 may applied when the adaptive recombinant system 800 of FIG. 16 is used to combine networks. Combining networks requires a determination of which objects 212 in two or more networks are identical, or near enough to being identical to be considered identical, for the purposes of combining the networks. In some embodiments, the object evaluation function 830 may enable a global identification management process in which each object 212 has a unique system designator, which enables direct determination of identity of the objects. This approach may be augmented by the tracking versions or generations of objects 212, such that the adaptive recombinant system 800 has options for using more recent versions of an object 212 when networks are combined. In other embodiments, the object evaluation function 830 may compare the intrinsic information associated with two objects 212 to determine whether they are identical or nearly identical enough to be considered identical for the purposes of combining the networks. For example, for text-based objects 212, associated meta-information 234 or information 232 may be compared between two objects using text-based pattern matching or statistical algorithms. For audio or video-based objects 212, other appropriate pattern matching algorithms may be applied by the object evaluation function 830 to the associated meta-information 234 or information 232

Fuzzy Process Networks

Figure 19A:
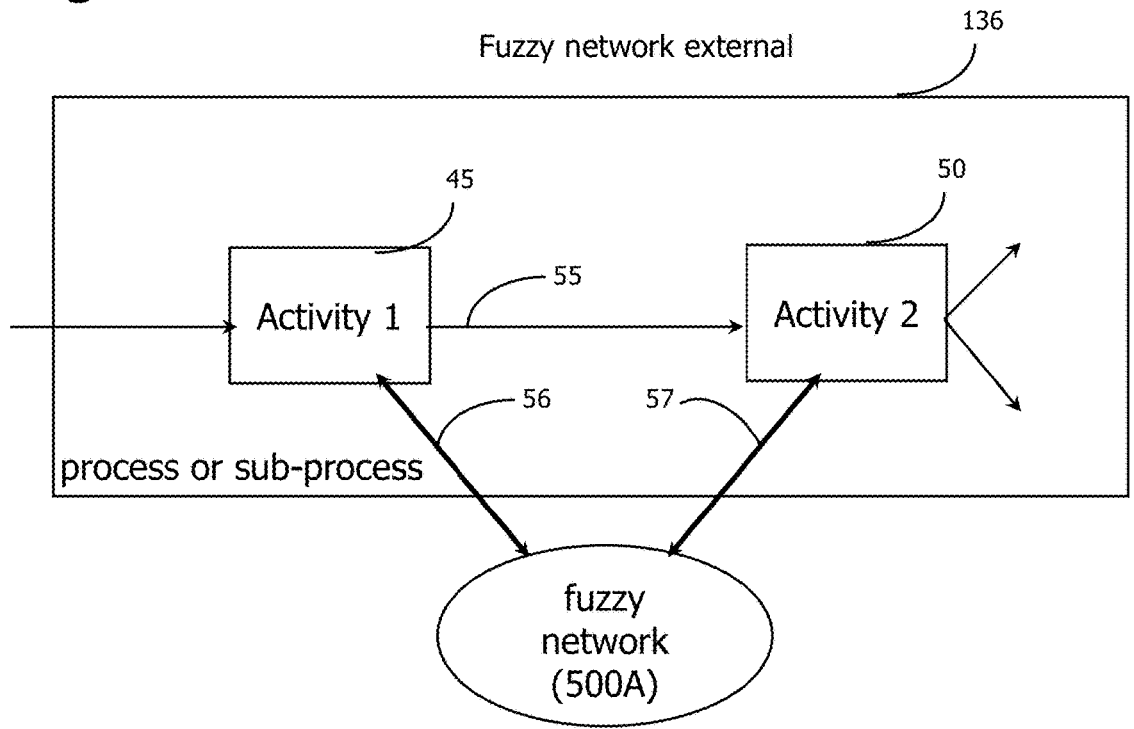
FIGS. 19A and 19B are block diagrams of alternative topologies between fuzzy networks and adaptive processes, according to some embodiments.

In some embodiments, implementation of a fuzzy network-based process may be through connecting an existing or new process with a fuzzy network 500A, as is shown in FIG. 19A. For example, an activity 45 within a process or sub-process 136 may precede another activity 50 in the sub-process, with an explicit workflow 55 between the activities. It should be understood that there may be a greater number of activities in the process or sub-process 136 than the minimal number illustrated in FIG. 19A. The fuzzy content network 500A, managed by the adaptive computer-based application 925, which is "external" to the activities 45, 50 in the sub-process 136, may be accessible 56, 57 by one or more of the activities 45, 50.

Figure 19B:
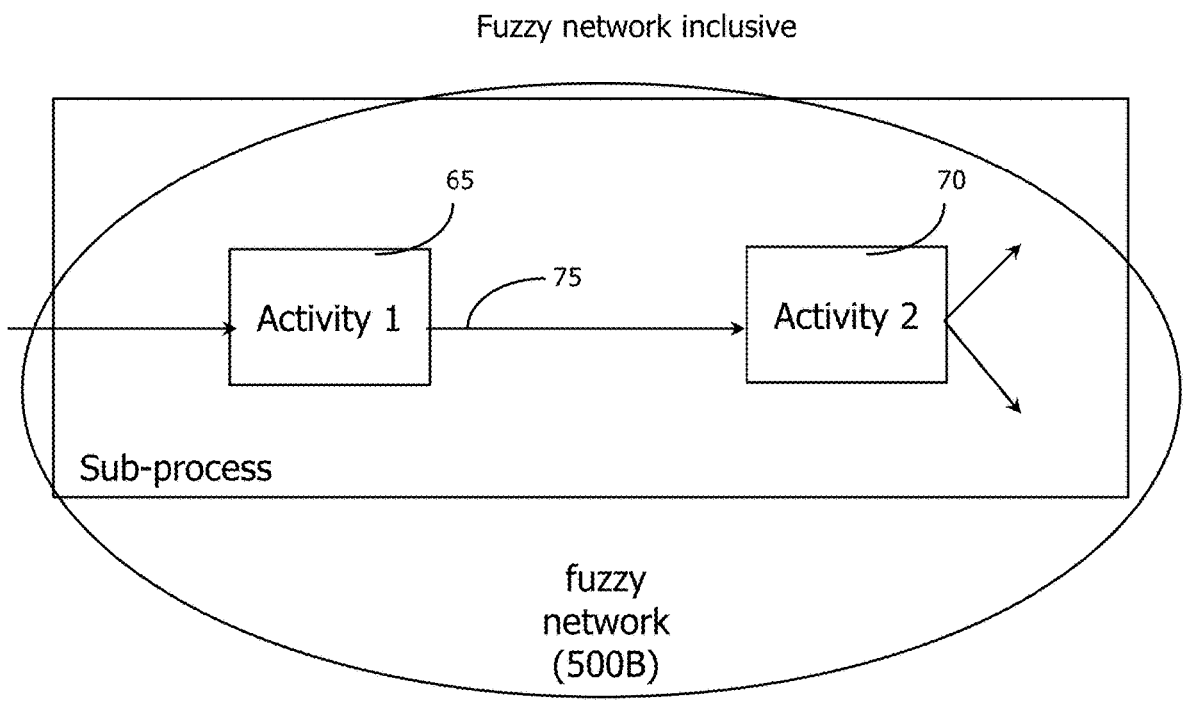

In other embodiments, implementation of a fuzzy network-based process may be through including an existing or new process within a fuzzy network 500B managed by the adaptive computer-based application 925, as is shown in FIG. 19B. For example, an activity 65 within a process or sub-process 137 may precede another activity 70 in the sub-process, with an explicit workflow 75 between the activities 75. These activities and their relationships are represented directly within the fuzzy network 500B in this case. It should be understood that there may be a greater number of activities in the process/sub-process 137 than the minimal number illustrated in FIG. 19B.

In some embodiments, adaptive recombinant processes may employ structures based on fuzzy content networks, as defined in U.S. Pat. No. 6,795,826, entitled "Fuzzy Content Network Management and Access." These structures may include the use or adaptation of fuzzy content networks and associated topic objects and content objects, as defined therein.

Figure 20A:
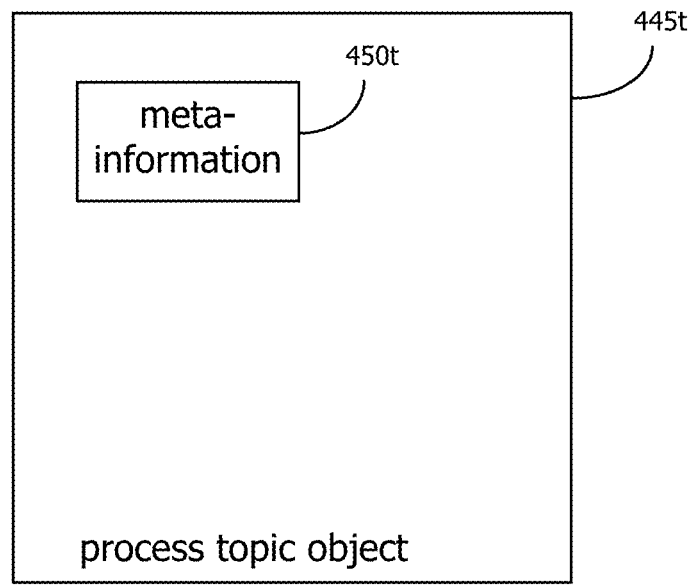
FIGS. 20A and 20B are block diagrams of a process topic object and a process content object, respectively, according to some embodiments.
Figure 20B:
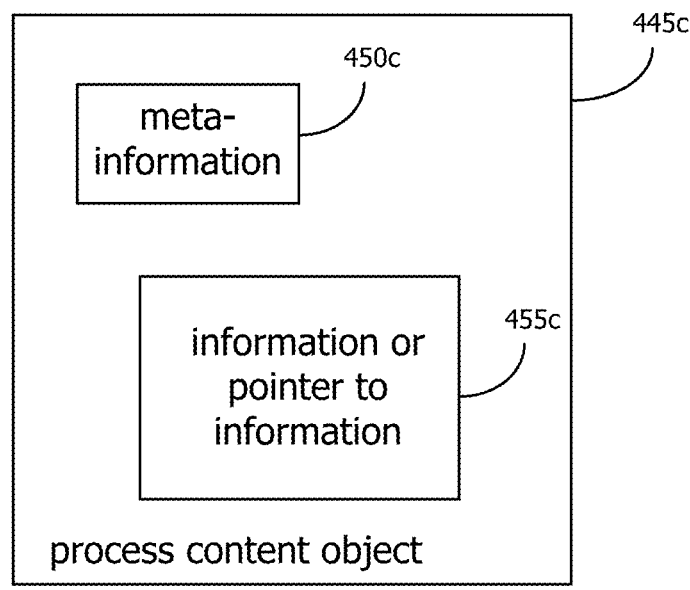
Figure 21A:
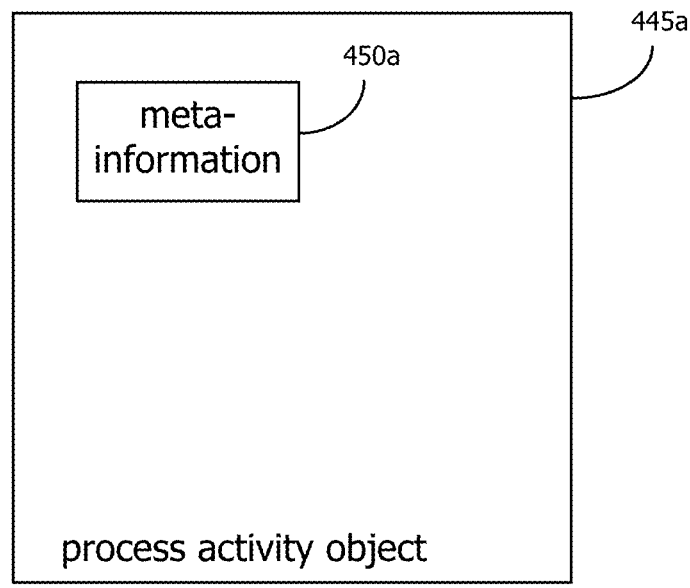
FIGS. 21A and 21B are block diagrams of alternative structures of process activity objects, according to some embodiments.
Figure 21B:
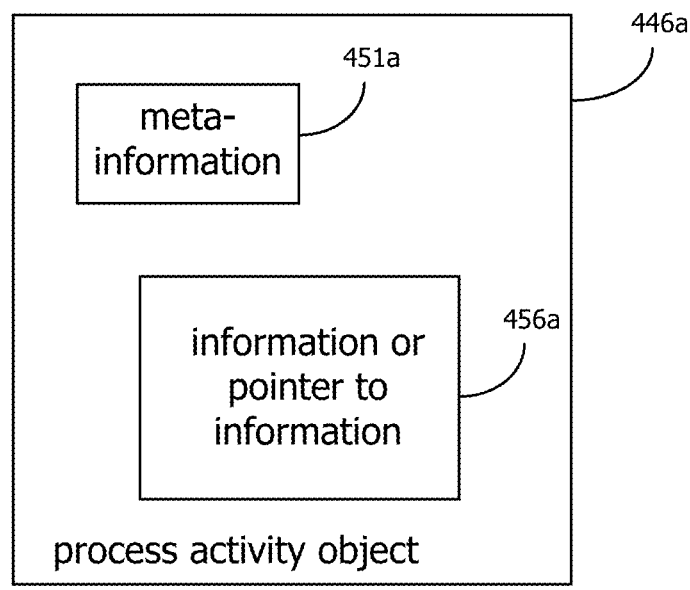

For "inclusive" fuzzy network embodiments, such as the fuzzy content network 500B of FIG. 19B, according to some embodiments, FIG. 20A depicts the structure of a process topic object 445*t*, which consists of meta-information 450*t* only, and is analogous to a fuzzy content network topic object. Likewise, FIG. 20B depicts a process content object 445*c*, which consist of embedded information, or references (for example, pointers or URLs) to information 455*c*, and the associated meta-information 450*c*. Fuzzy process content objects 455*c* are analogous to fuzzy content network content objects. According to some embodiments, process activities may be included within the fuzzy content network, and as shown in FIG. 21A, and a process activity object 445*a* contains meta-information 450*a*, analogous to the process topic object 455*t* of FIG. 20A. In other embodiments, as shown in FIG. 21B, process activities may be included within the fuzzy content network, and a process activity object 446*a* will contain meta-information 451*a*, as well as information or a pointer to information 456*a*, analogous to the process content object 445*c* of FIG. 20B. For all of these fuzzy network object structures, relationships and associated relationship indicators may be established between any two process objects in the process network, and there may be plurality of types of relationships and associated relationship indicators between any two process objects. In some embodiments, at least one relationship type denotes process sequence or workflow, and is typically applied among process activity objects, but may apply among other process objects as well.

As reviewed previously, FIGS. 20A, 20B, 21A and 21B depict in some embodiments how fuzzy network objects may be converted to process network objects, and how special process objects, process activity objects 445*a* and 446*a* may be defined.

Figure 22A:
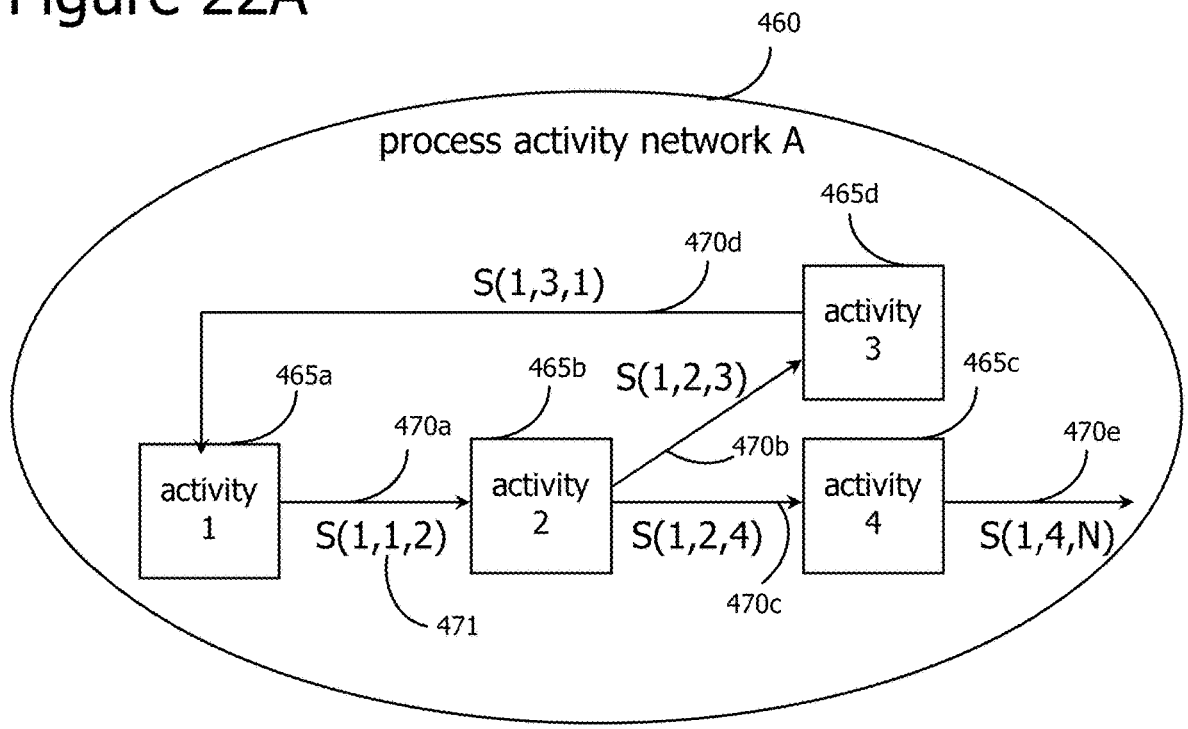
FIGS. 22A and 22B are block diagrams of process activity networks, according to some embodiments.

FIG. 22A illustrates a process activity "network A" 460, including four activities (465*a*, 465*b*, 465*c*, and 465*d*) and work flow relationships among the activities (470*a*, 470*b*, 470*c*, and 470*d*), as well as relationships to activities external to process activity "network A" 470*e*. Each relationship has an associated relationship indicator 471. In some embodiments, the relationship indicator is represented in the form:

Sequence (Relationship Type, First Activity, Second Activity) The relationship indicator "S(1,1,2)" 470 of relationship 470*a* thus implies a relationship of type 1 between activity 1 and activity 2, in that sequence.

Figure 22B:
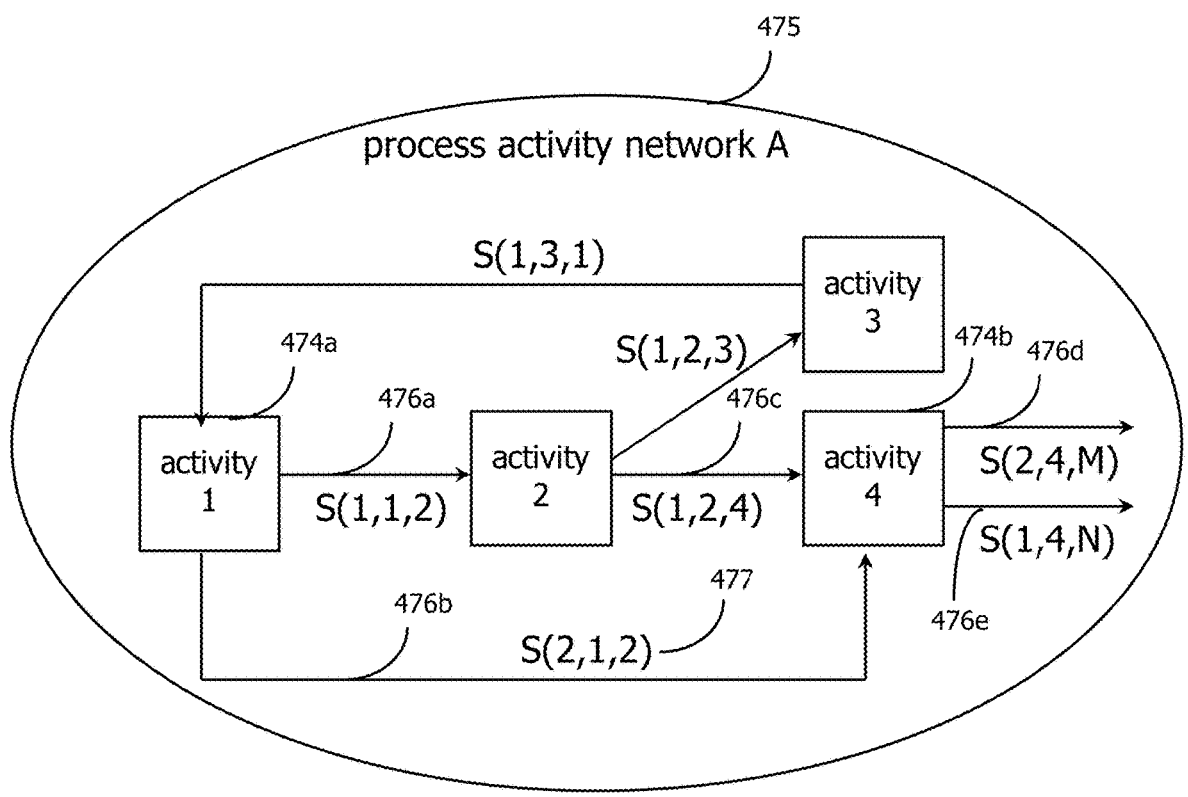

FIG. 22B illustrates a process activity network 475, which may have multiple relationship types 476*a* and 476*b* outbound from an activity (activity 1 474*a*), and may also have multiple relationship types inbound 476*b* and 476*c* to an activity (activity 4 474*b*). Furthermore, multiple relations of different relationship types may be outbound from one or more activities in the process activity network to destinations outside the process activity network. For example, in FIG. 22B, relationship 476*d* of relationship type 2 (S(2,4,M)) is outbound from activity 4 474*b*; likewise, relationship 476*e* having relationship type 1 (S(1,4,N)) is also outbound from activity 4 474*b*.

Figure 23A:
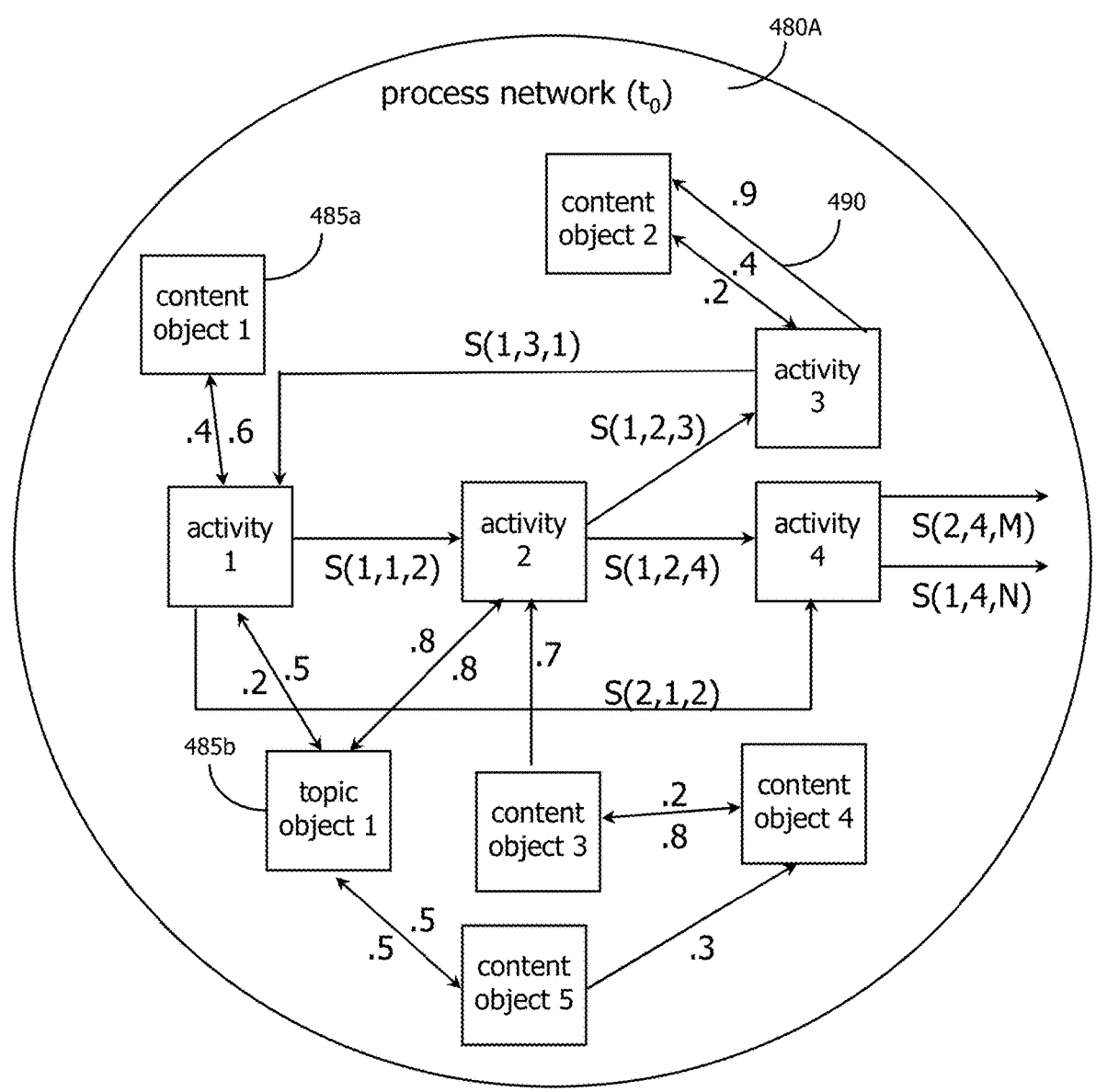
FIGS. 23A and 23B are block diagrams of a process network, according to some embodiments.
Figure 23B:
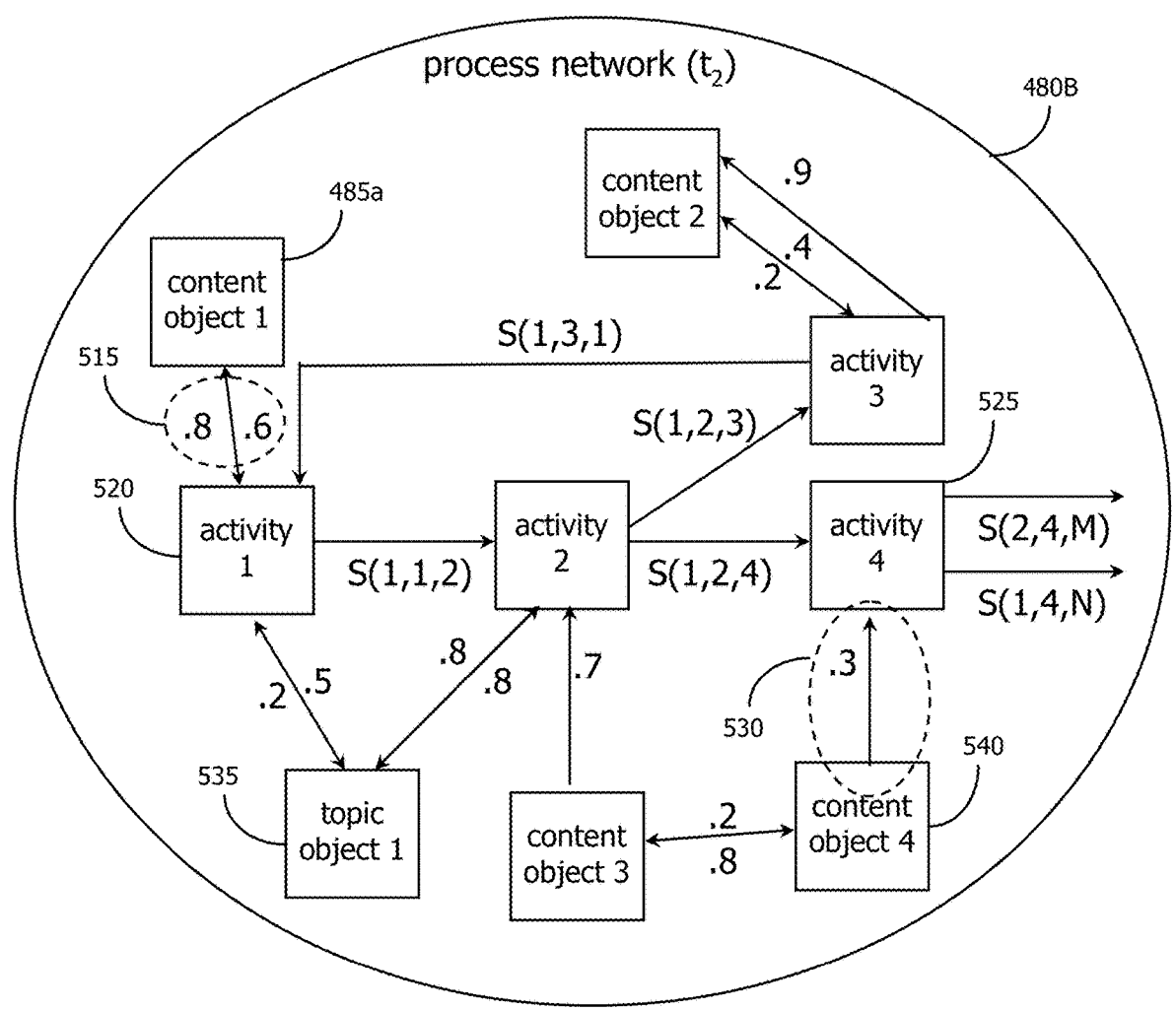

According to some embodiments, FIGS. 23A and 23B depict process networks 480A and 480B (collectively, process network 480). The process networks 480A and 480B are depicted for a particular relationship and associated relationship indicators, at particular times ($t_0$ and $t_2$), in some embodiments. The process networks 480A and 480B are process activity networks (see FIGS. 22A and 22B). The process networks 480A and 480B are integrated with process content objects, for example, "content object 1" 485*a* and process topic objects, for example, "topic object 1" 485*b*. Relationships and associated relationship indicators may exist between process activity objects and process content or topic objects, for example, 490.

Figure 24:
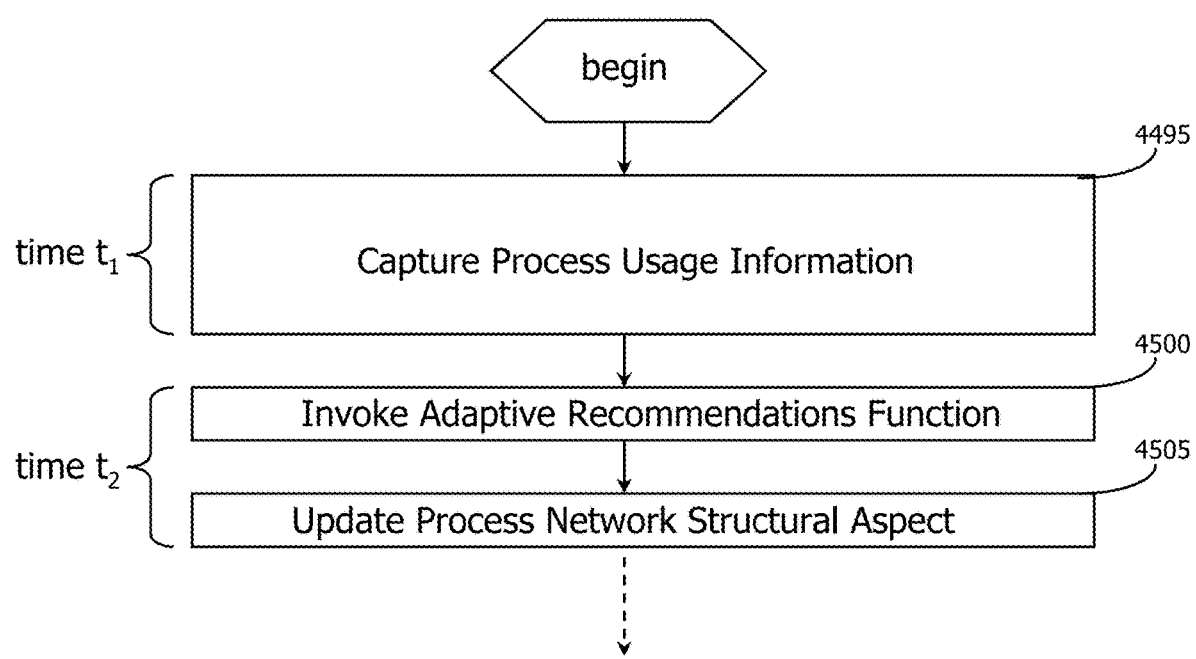
FIG. 24 is a flow diagram describing structural modification of the process network of FIGS. 23A and 23B, according to some embodiments.

FIG. 24 is a flow diagram illustrating how process usage information associated with the process networks 480A and 480B are processed, according to some embodiments, over a period of time. During time $t_1$, usage behavior information 920 is tracked and processed (block 4495). The adaptive recommendations function 240 of the adaptive system 100 is invoked (block 4500), and the process structure of the process network 480A is automatically or semi-automatically updated (block 4505), resulting in process network 480B at time $t_2$. Thus, process network 480A at time $t_0$ (FIG. 23A) automatically or semi-automatically becomes process network 480B at time $t_2$ (FIG. 23B), using the procedure in FIG. 24. Structures that may be updated within the process network 480 include relationship indicators; for example, relationship indicators 515 between content object 1 485*a* and activity 1 520 had values of 0.4 and 0.6 at time $t_0$ (FIG. 23A); at time $t_2$, the relationship indicators 515 have values of 0.8 and 0.6 (FIG. 23B). Relationships may be deleted, as for example between process activity 1 520, and process activity 4 525 (formerly S(2,1,2) in FIG. 23A). Relationships and associated relationship indicators may be added, as for example 530 between activity 4 525 and content object 4 540. And process objects, and associated relationships may be deleted. For example the former content object 5 of FIG. 23A and its associated relationships and relationship indicators, is not part of process network 480B.

Figure 25:
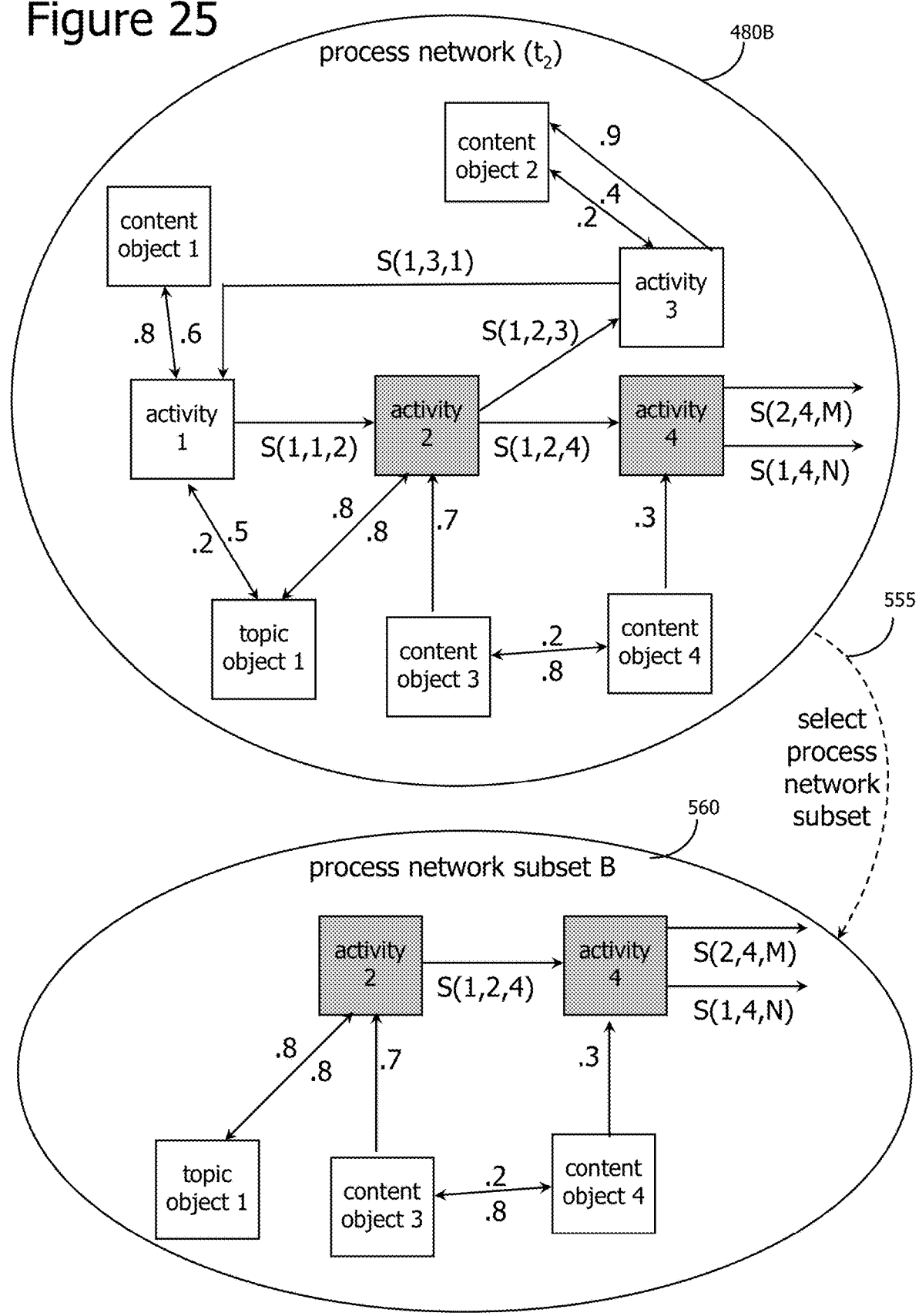
FIG. 25 is a block diagram of a process network selection operation, according to some embodiments.

FIG. 25 depicts process network 480B (FIG. 24B) at time $t_2$. Process activity objects (shaded) are selected, along with the associated relationships between these process activity objects, as well as other selected process objects that have a relationship to the selected process activity objects, and the associated relationships. In some embodiments, the selection of the process network subset may be through application of network neighborhood metrics, such as degrees of separation metrics, or fuzzy degrees of separation network neighborhood metrics. In other embodiments, other selection methods may be used, including individually specifying process objects and associated relationships. In this example, the result of the selection/sub-setting 555 of process network 480B is process network 560.

Adaptive Recombinant Processes

Figure 26:
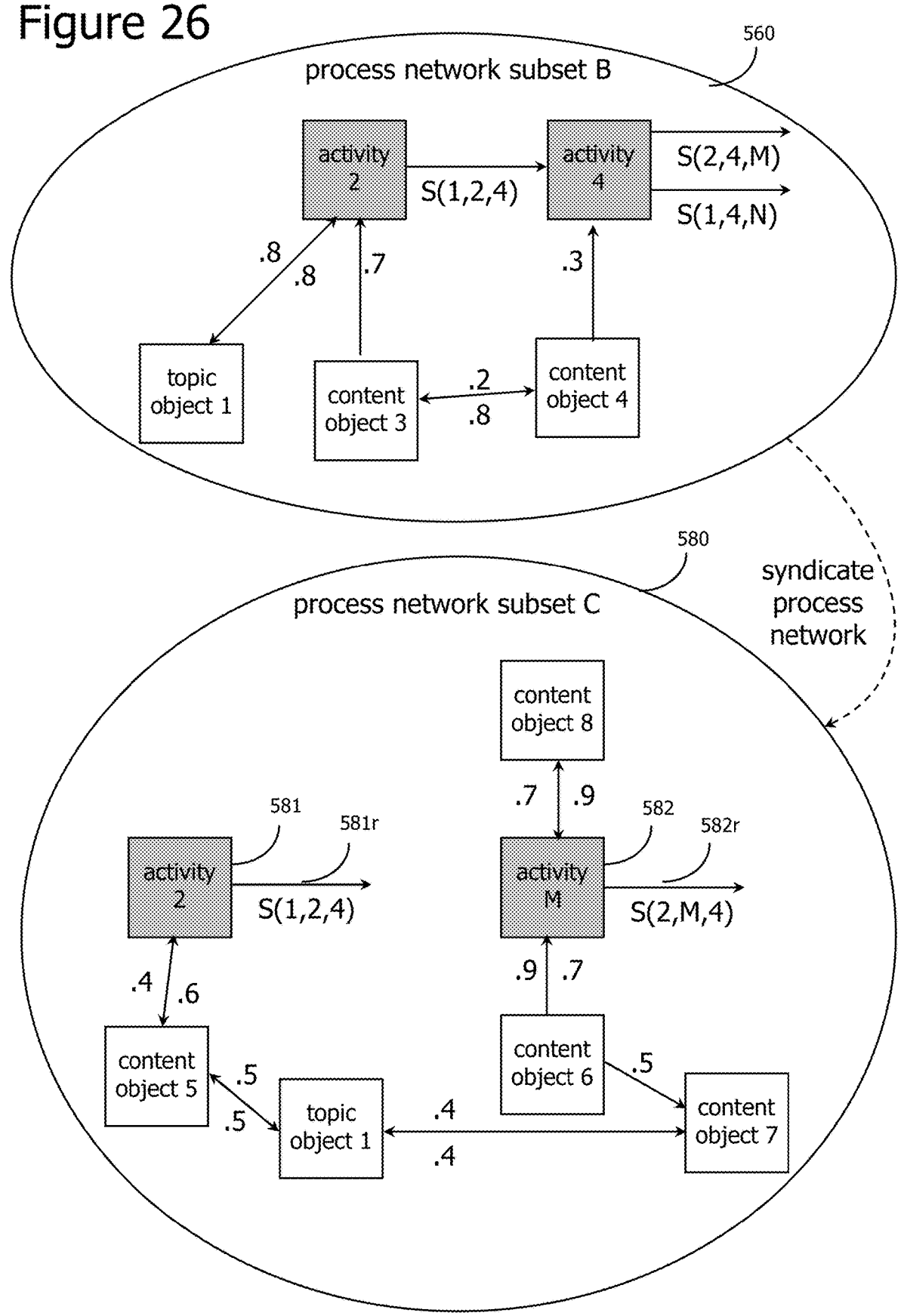
FIG. 26 is a block diagram of a process network syndication operation, according to some embodiments.
Figure 27:
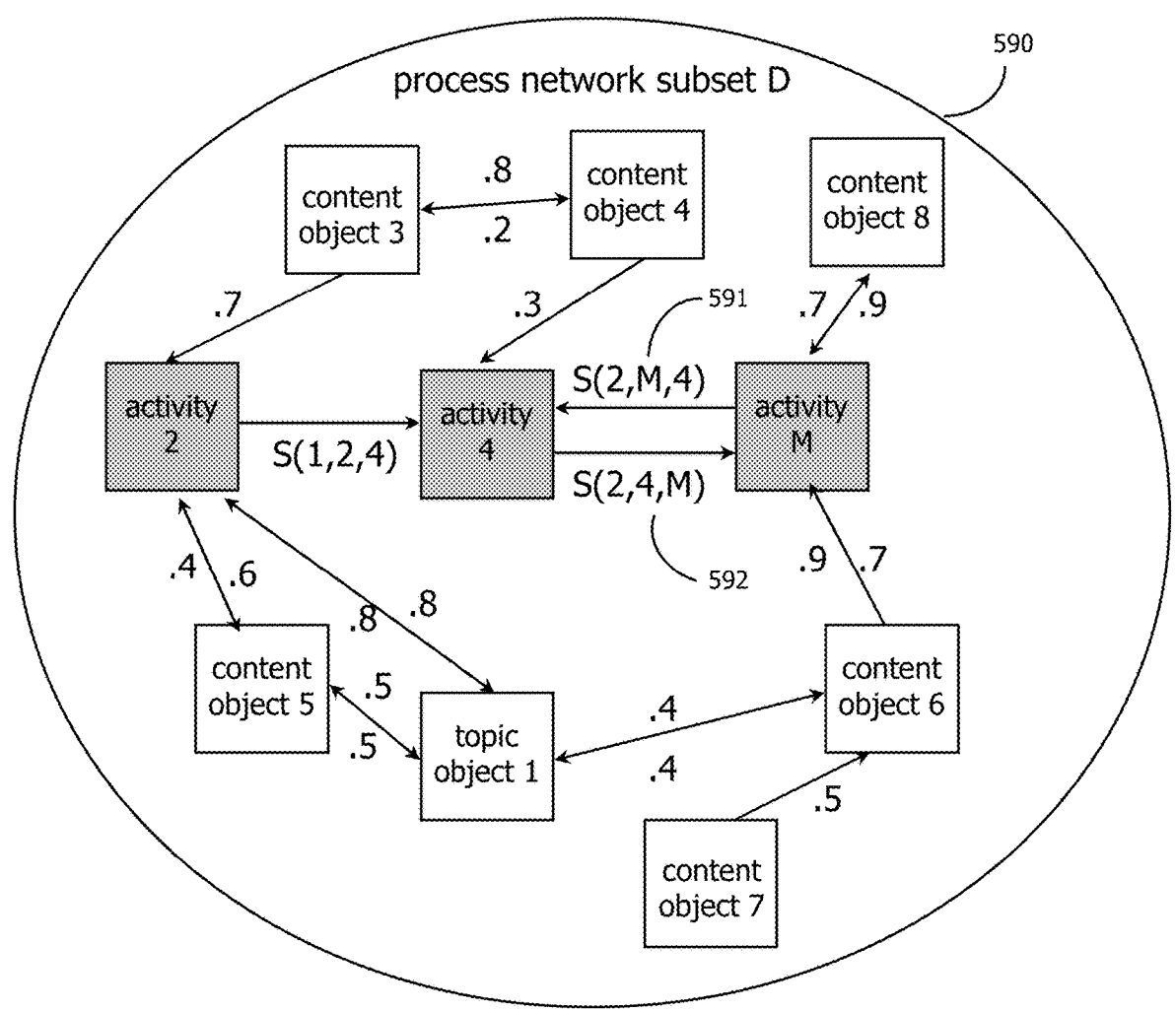
FIG. 27 is a block diagram of a process network resulting from a combination of process networks, according to some embodiments.

FIGS. 26 and 27 illustrate the syndication and combination of process networks by the adaptive recombinant system 800C. (The process network activity objects are shaded, to distinguish from the content and topic objects.) In FIG. 26, process network subset B 560 (FIG. 25) is syndicated to an existing process network C 580 that may exist on the same computer system or a different computer system. It should be noted that a process network need not represent a "complete" or "functional" process. For example, process network C 580 contains two process activity objects 581, 582 that do not have a direct relationship to one another. In addition, associated relationships 581*r* and 582*r* have no corresponding forward sequence process activity object within the process network 580. In general, a process network may be fragmentary, without completeness of process objects and relationships.

FIG. 27 illustrates the results of the combination of process network B 560 and process network C 580 by the adaptive recombinant system 800C, and the application of the fuzzy network operators function 820, the adaptive recommendations function 240 and the object evaluation function 830 (FIG. 17). The result is process network D 590. Note that all distinct process activity objects from 560 and 580 reside in 590, and the associated relationships among the process activity objects are resolved and established. Note also that these relationships may be reflexive, as in the case of 591 and 592. In the process network subset C 580 (FIG. 26), a relationship indicator "S(2,M,4)" is indicated, although no "activity 4" is present in the sub-network 580. Once syndication with process network subset B 560, which includes "Activity 4," occurs, the adaptive recombinant system 800C automatically relates the two activities 4 and M, as shown in FIG. 27. Other process objects and corresponding relationships may be resolved as previously described.

Figure 28:
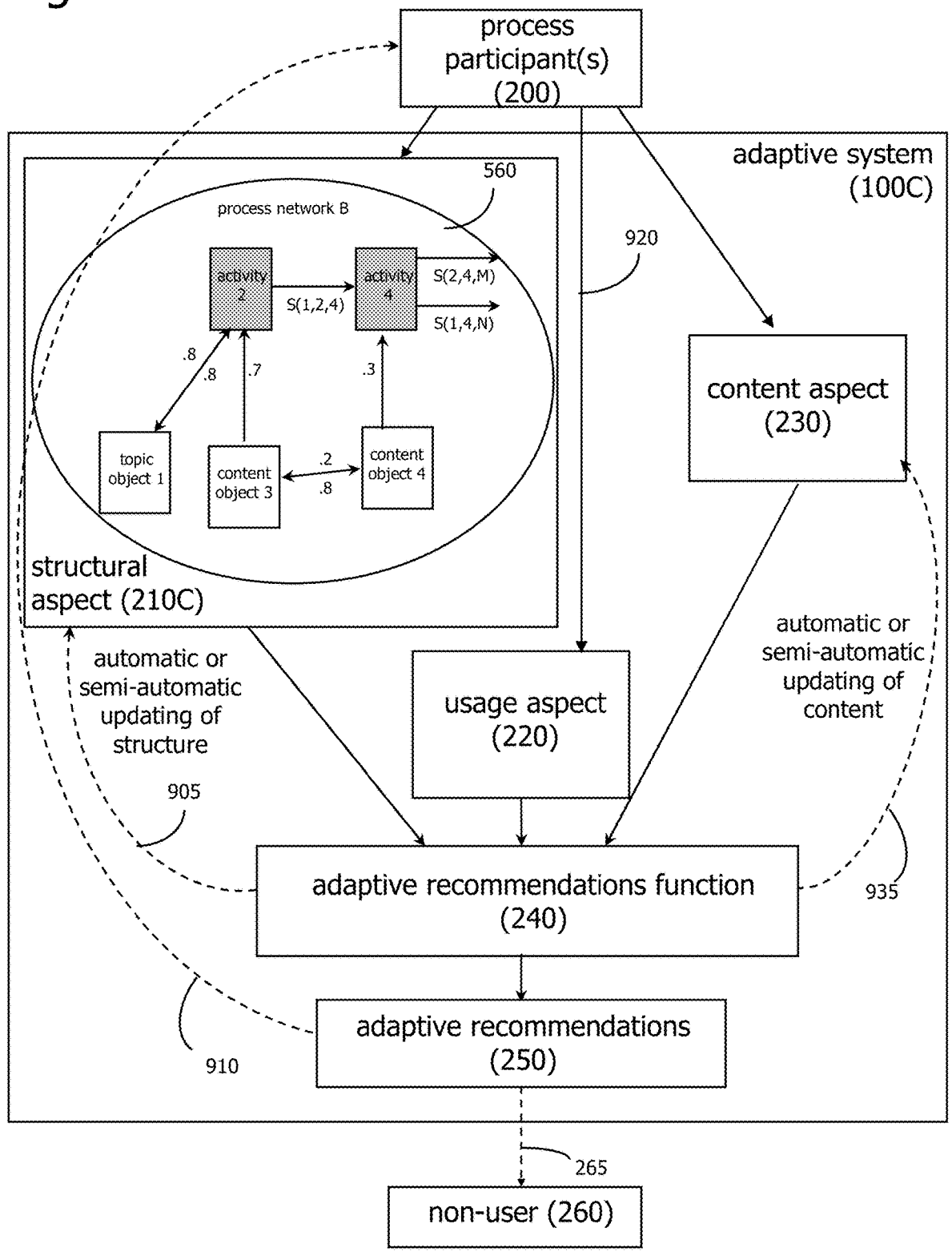
FIG. 28 is a block diagram of the adaptive system of FIG. 7 in which the structural aspect is a process network, according to some embodiments.

FIG. 28 illustrates that the process network 560 may be encompassed by the structural aspect 210C of adaptive system 100C (FIG. 7). The process network 560 may be the sole content network within structural aspect 210C, or may be one of multiple network or non-network structures within 210C, as is more generally depicted in FIG. 15, above.

Figure 29:
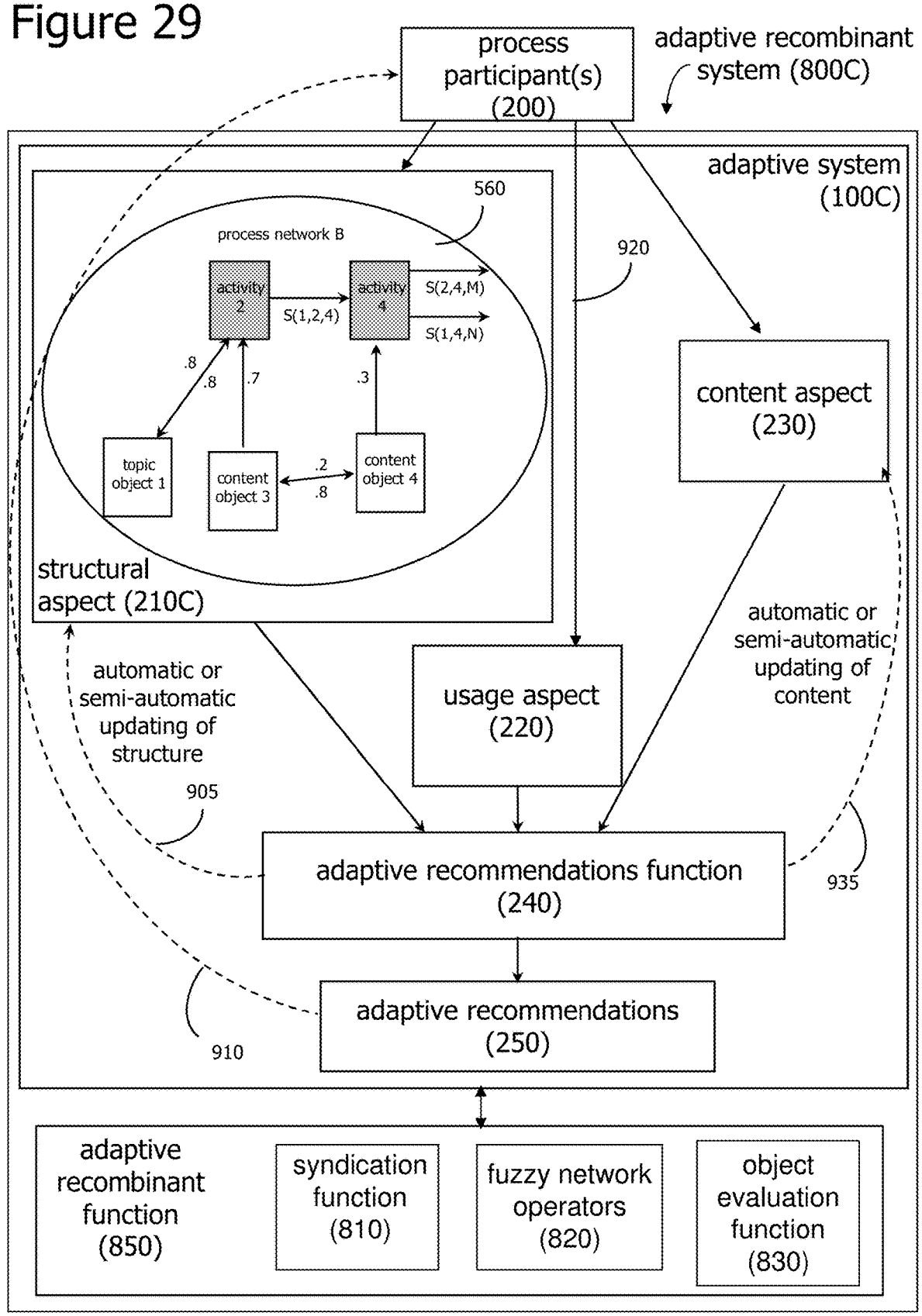
FIG. 29 is a block diagram of the adaptive recombinant system of FIG. 16 in which the structural aspect is a process network, according to some embodiments.

Likewise, FIG. 29 illustrates that the process network 560 may be encompassed by the structural aspect 210C of the adaptive system 100C, which may form part of the adaptive recombinant system 800C. Again, the process network 560 may be the sole content network within structural aspect 210C, or may be one of multiple networks within 210C, and may be syndicated, modified, and combined with other content or process networks, as is more generally depicted in FIGS. 47 and 48, below. The process network 560 or another process network structure within the structural aspect 210C may correspond to the adaptive process instance 930 of FIGS. 4A and 4B, and hence FIGS. 15, 29, 47 and 48 illustrate the ability to syndicate and combine representations of adaptive process instances 930, thereby enabling the adaptive recombinant process 901.

Figure 30A:
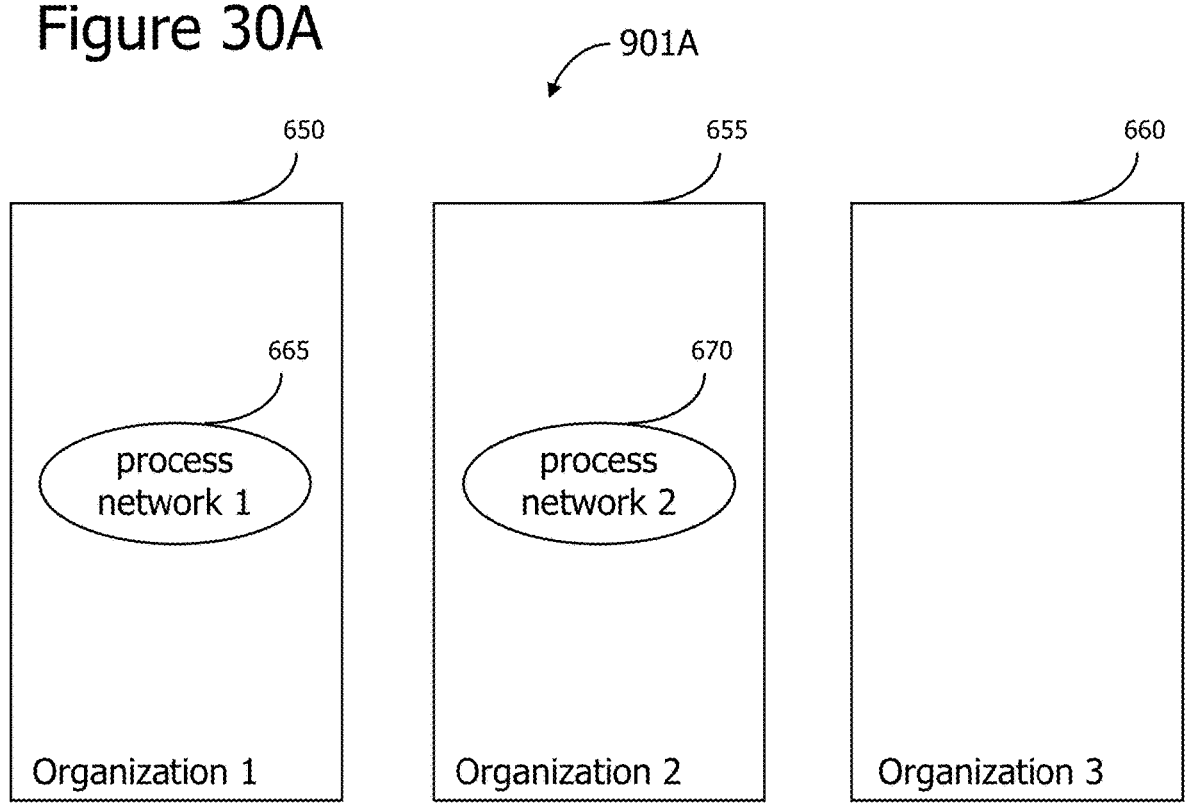
FIGS. 30A and 30B are block diagrams illustrating syndication and recombination of process networks and process network subsets, according to some embodiments.

FIGS. 30A, 30B, 31A, and 31B illustrate the general approaches associated with process network syndication and combinations, as managed by the adaptive recombinant system 800C, and applied as part of a particular type of application of the adaptive recombinant process 901, designated in FIGS. 30A, 30B, 31A and 31B as process application type 901A. FIG. 30A illustrates a hypothetical starting condition, and depicts three organizations, 650, 655, 660. These may be organizations (which may be individuals) within the same business or institution, or one or more may be in businesses or institutions external to the others. A first process network, "process network 1" 665, is used solely by, or resides within, "organization 1" 650. A second process network, "process network 2" 670, is used solely by, or resides within, "organization 2" 655. "Organization 3" 660 does not have a process network initially, in this example.

Figure 30B:
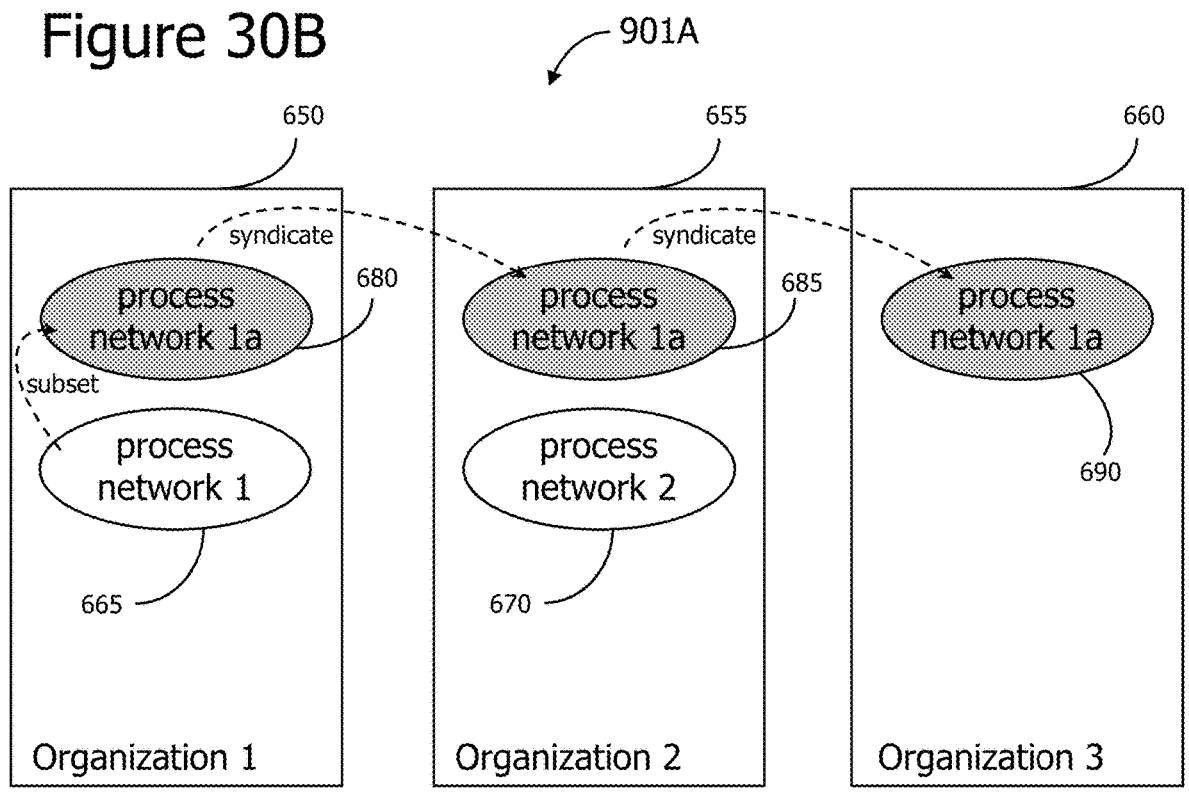

FIG. 30B illustrates that a subset of "process network 1" 665 is selected to form "process network 1A" 680. "Process network 1A" 680 is then syndicated as "process network 1A" 685 to "organization 2." "Organization 2" 655 then syndicates "process network 1A" 685 to "organization 3" 660 as "process network 1A" 690. Thus, FIG. 30B illustrates how process networks, or subsets of process networks, can be syndicated among organizations without limit.

Figure 31A:
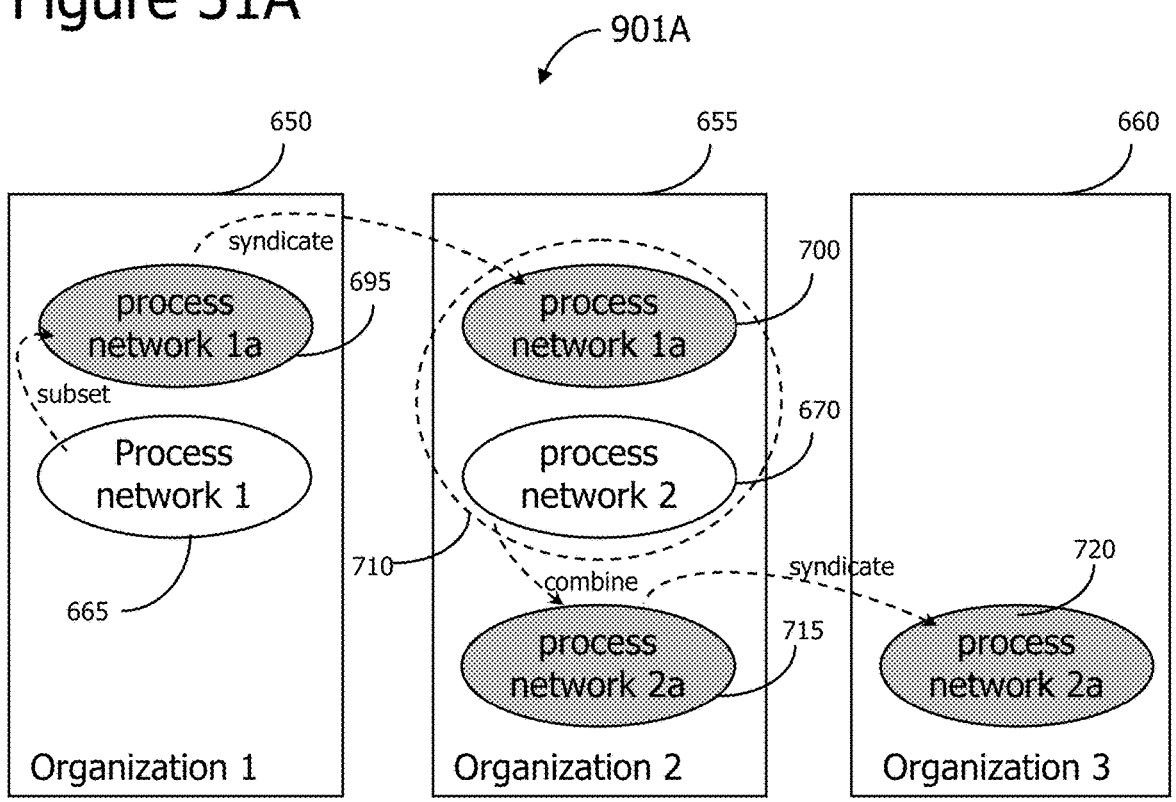
FIGS. 31A and 31B are block diagrams illustrating syndication and recursive recombination of process networks and process network subsets, according to some embodiments.

FIG. 31A depicts a subset of "process network 1" 665 and "process network 1A" 695 residing in "organization 1," in which "process network 1a" 695 is syndicated to "organization 2" 655 as "process network 1A" 700. "Process network 1A" 700 and the existing "process network 2" 670 in "organization 2" are combined 710 to form "process network 2a" 715 in organization 2 655. "Process network 2a" 715 is then syndicated to "organization 3" 660 as process network 2A 720.

Figure 31B:
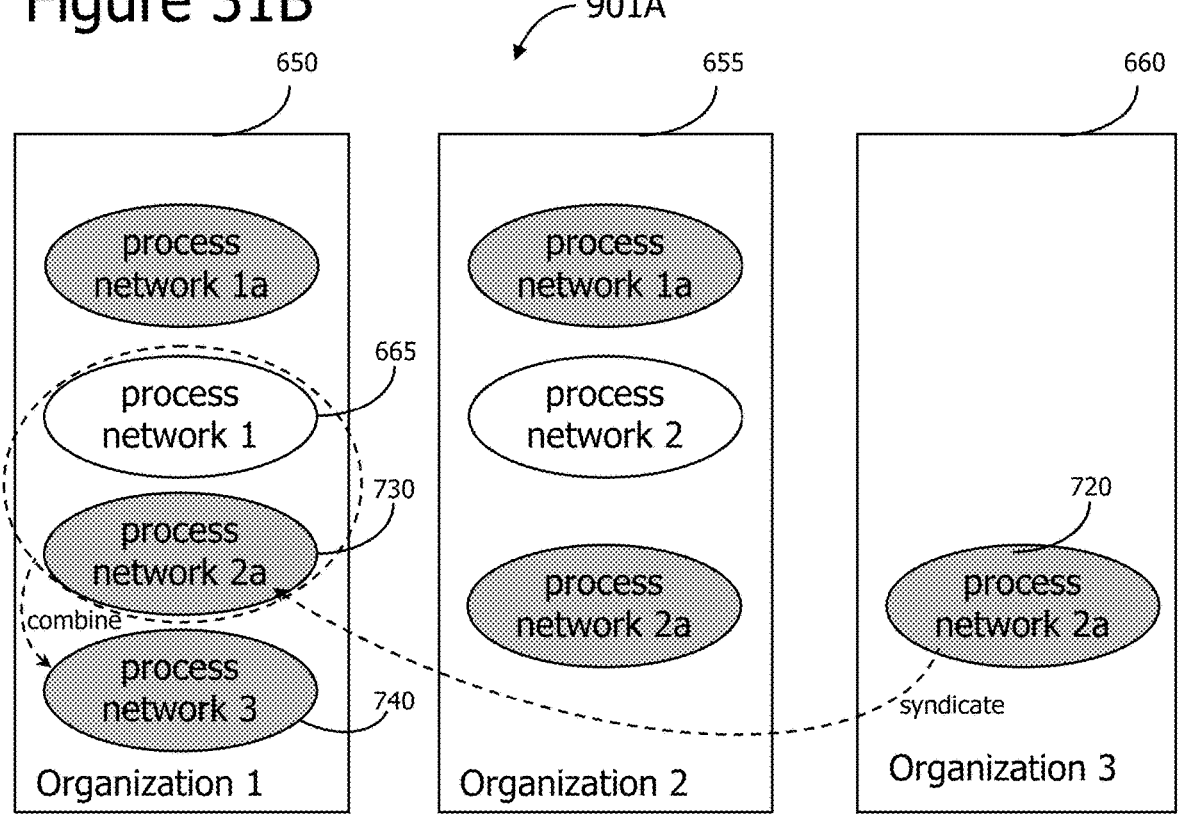

FIG. 31B represents a continuation of FIG. 31A, in which additional combination and syndication takes place. "Process network 2a" 720 in "organization 3" 660 is syndicated to "organization 1" 650 as process network 2A 730. Process network 2A 730 is then combined with the original "process network 1" 665 in "organization 1" 650 to generate "process network 3" 740 in "organization 1" 650.

FIGS. 30A, 30B, 31A, and 31B demonstrate that, in some embodiments, adaptive recombinant processes may indefinitely enable sub-setting of process networks, syndicating the subsets to one or more destinations, and enabling the syndicated process networks to be combined with one or more process networks at the destinations. At each combination step, the relationship resolution function 834 (of the fuzzy network operators 820—see FIG. 18) and the adaptive recommendations function 240 may be invoked to create and update process structure (and content) as appropriate.

Figure 32:
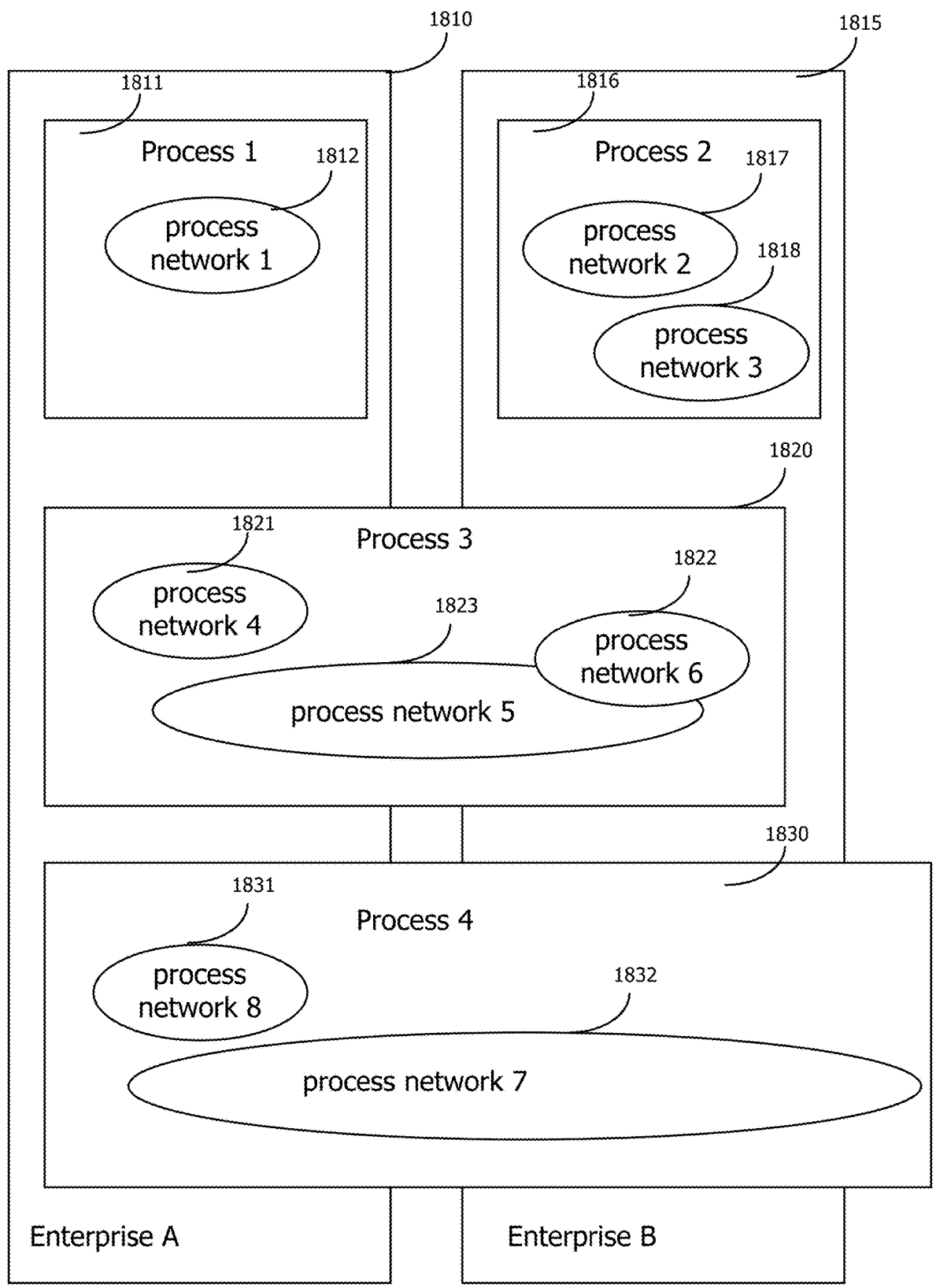
FIG. 32 is a block diagram of the process network topologies, according to some embodiments.

According to some embodiments, FIG. 32 depicts possible deployments of process networks within and across organizations or business enterprises. In FIG. 32, two enterprises 1810, 1815 are depicted, but it should be understood the following described process and process network topologies can apply to any plurality of organizations, individuals, or business enterprises. One topology is represented by "Process 1" 1811 containing one process network, 1812, within one enterprise, 1810. In another topology, a process 1816 contains a plurality of process networks 1817, 1818 within one business enterprise, 1815. In another topology, a process 1820 may extend across more than one enterprise 1810 and 1815, and may contain a plurality of process networks 1821, 1822, and 1823. A process network 1823 may extend across business enterprises 1810 and 1815. Process networks may have common subsets, as exemplified by 1822 and 1823. Processes and process networks may extend across an unlimited number of organizations or business enterprises as depicted by process 1830 and process network 1832.

Figure 33:
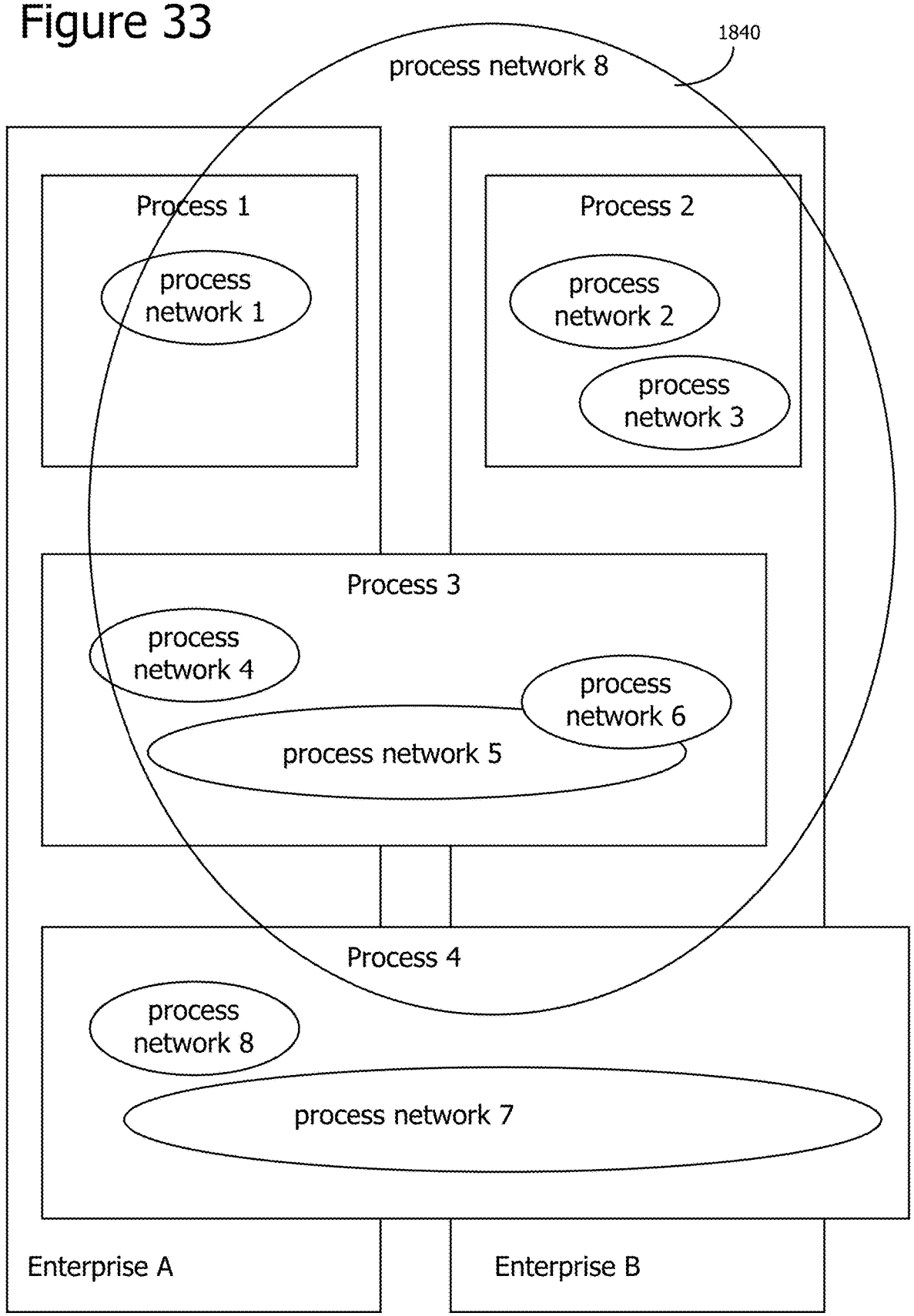
FIG. 33 is a block diagram of extensions to the process network topologies of FIG. 32, according to some embodiments.

According to some embodiments, FIG. 33 depicts a process network topology in which a process network 1840 includes multiple processes, each process contained partially or as a whole within the process network 1840, and include a multiplicity of other process networks, each process contained partially or as a whole, where each contained process or process network may span a plurality of organizations or business enterprises.

Process Lifecycle Framework

Figure 34:
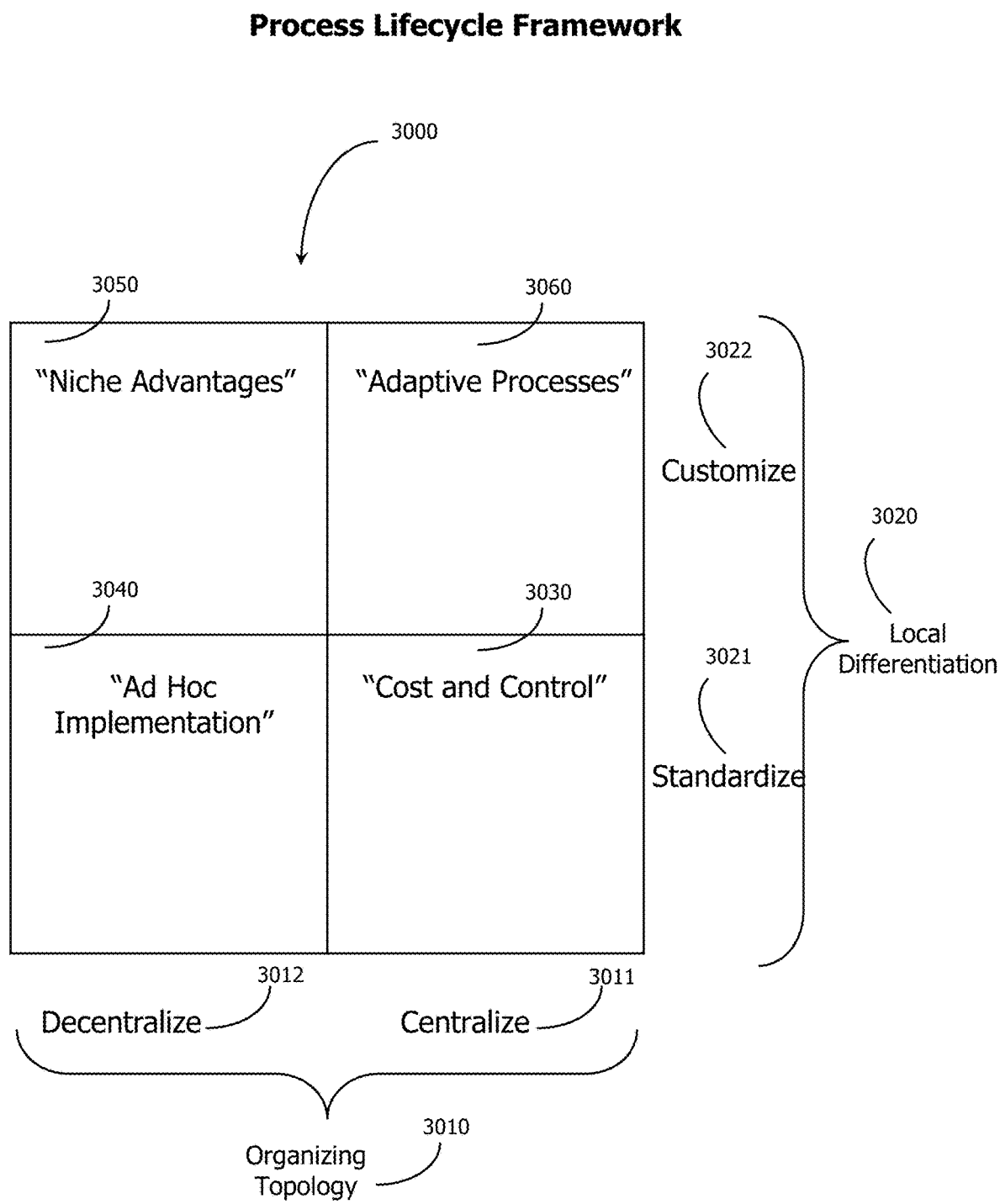
FIG. 34 is a diagram of a process lifecycle framework, according to some embodiments.

In some embodiments, as shown in FIG. 34, a process lifecycle framework 3000 may be used as an implementation framework for migrating to adaptive processes, based on the implementation of adaptive recombinant processes, or other methods and technologies.

The process lifecycle framework 3000 has two primary dimensions. The horizontal dimension denotes how the organizing topology 3010 of a process is managed—either in a centralized 3011 or decentralized 3012 manner. The vertical dimension relates to the local differentiation 3020 of a process—how differentiated 3021 or customized 3022 the process is for local applications or implementations. The process may be standardized across all local applications 3021, or customizable to local applications 3022. The intersections of these dimensions denote fundamental process lifecycle positions. For example, a centralized organizing topology, coupled with standardization of processes across local applications, may be called a "cost and control" quadrant 3030. The focus in this quadrant is typically to ensure low cost processes that enforce broad standards across organization and application areas. This is the typical architecture of prior art processes supported by Enterprise Resource Planning (ERP) software that are implemented on a truly enterprise basis.

A decentralized organizing topology, coupled with standardization of processes across local applications, may be called the "ad hoc" quadrant 3040. The focus in this quadrant is to enforce broad standards across organization and application areas, but through a decentralized process management and infrastructure approach. This quadrant often represents an inconsistency of objectives, and may be the result of organizational combinations, such as through a merger or acquisition. It is often desirable to not remain in this quadrant in the long-term, as ad hoc implementation typically generates more costs to deliver the same results as the "cost and control" quadrant 3030.

A decentralized organizing topology, coupled with customization of processes across local applications, may be called the "Niche Advantages" quadrant 3050. The emphasis of this quadrant is to maximize the value of the process in specific application areas through a decentralized process management and infrastructure approach that enables maximum flexibility and tailoring to local needs. This quadrant represents a potentially high value, but also high cost approach. It is often consistent with the development of new processes that provide competitive advantages, where the generation of value from the processes overrides inefficiencies stemming from decentralized process management and heterogeneous enabling infrastructure. Over time, however, as competitive advantages potentially dissipate, the cost penalty associated with this quadrant may be too high compared to the derived benefits.

A centralized organizing topology, coupled with customization of processes across local applications, may be called the "Adaptive Processes" quadrant 3060. The emphasis of this quadrant is to maximize the value of the process in specific application areas, but through an efficient, centralized process management and infrastructure approach that enables maximum flexibility and tailoring to local needs. This quadrant represents a potentially high value and low cost approach, and provides advantages versus the other three quadrants. An adaptive process approach has been very difficult to achieve with prior art process and supporting process infrastructure and systems. The adaptive processes quadrant 3060 is the quadrant, in particular, that adaptive recombinant processes advantageously addresses.

Figure 35:
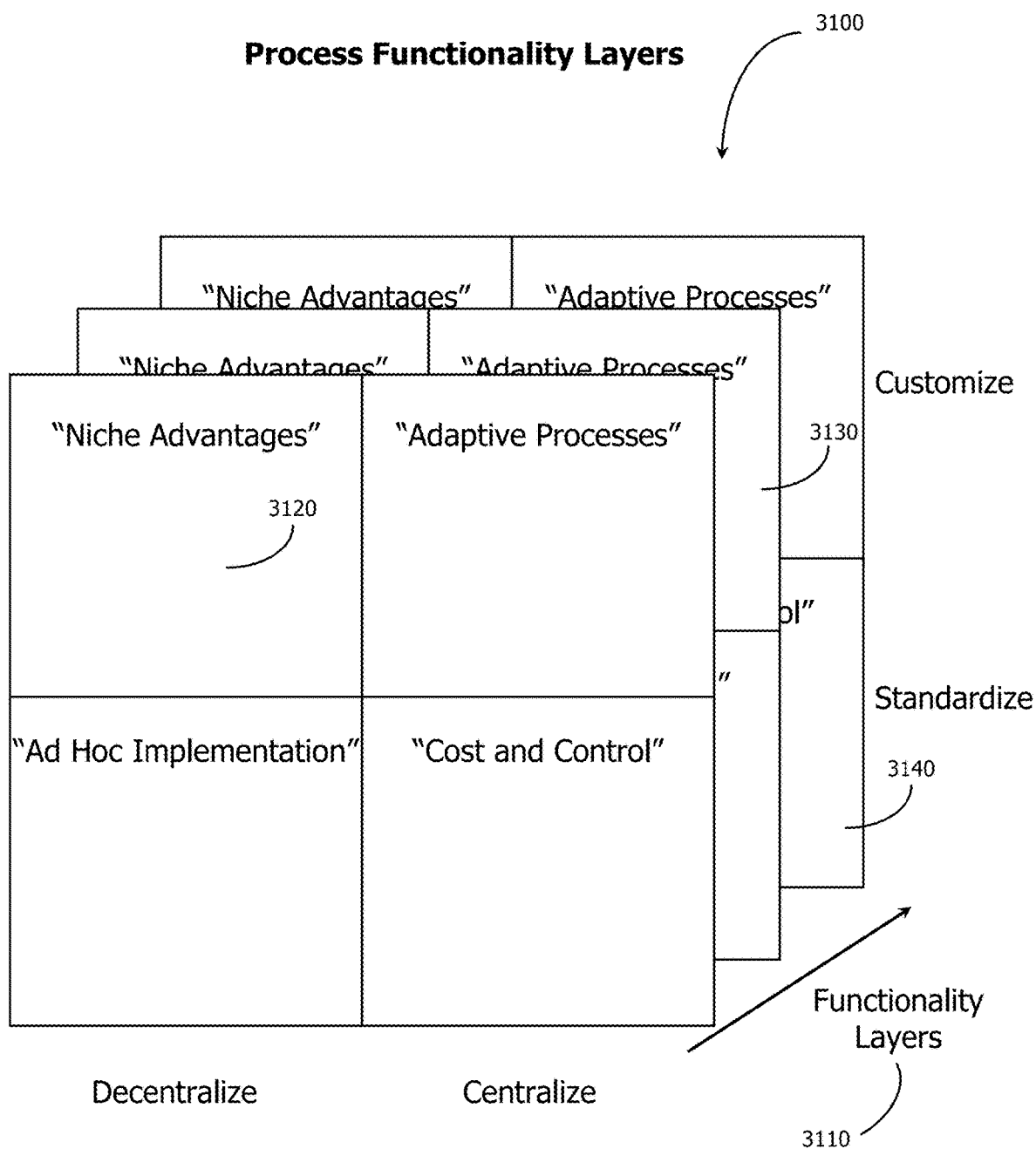
FIG. 35 is a diagram of process functionality layers, according to some embodiments.

According to some embodiments, FIG. 35 is a framework 3100 that describes how processes typically include multiple functionality layers 3110. For example, these layers may comprise information technology layers, with the highest level corresponding to process work flow and business logic, and lower layers corresponding to more generalized information technology, such as content management, database management systems, and communications networks.

In a process implementation, then, different layers may have different process lifecycle quadrants. For example, the top-most layer may be a niche advantage quadrant 3120, the directly supporting layer may be an adaptive processes quadrant 3130, and the directly supporting layer of that layer may be a cost and control quadrant 3140. In general, it is good practice that the lower process layers should be at least as standardized as the layers above.

Figure 36:
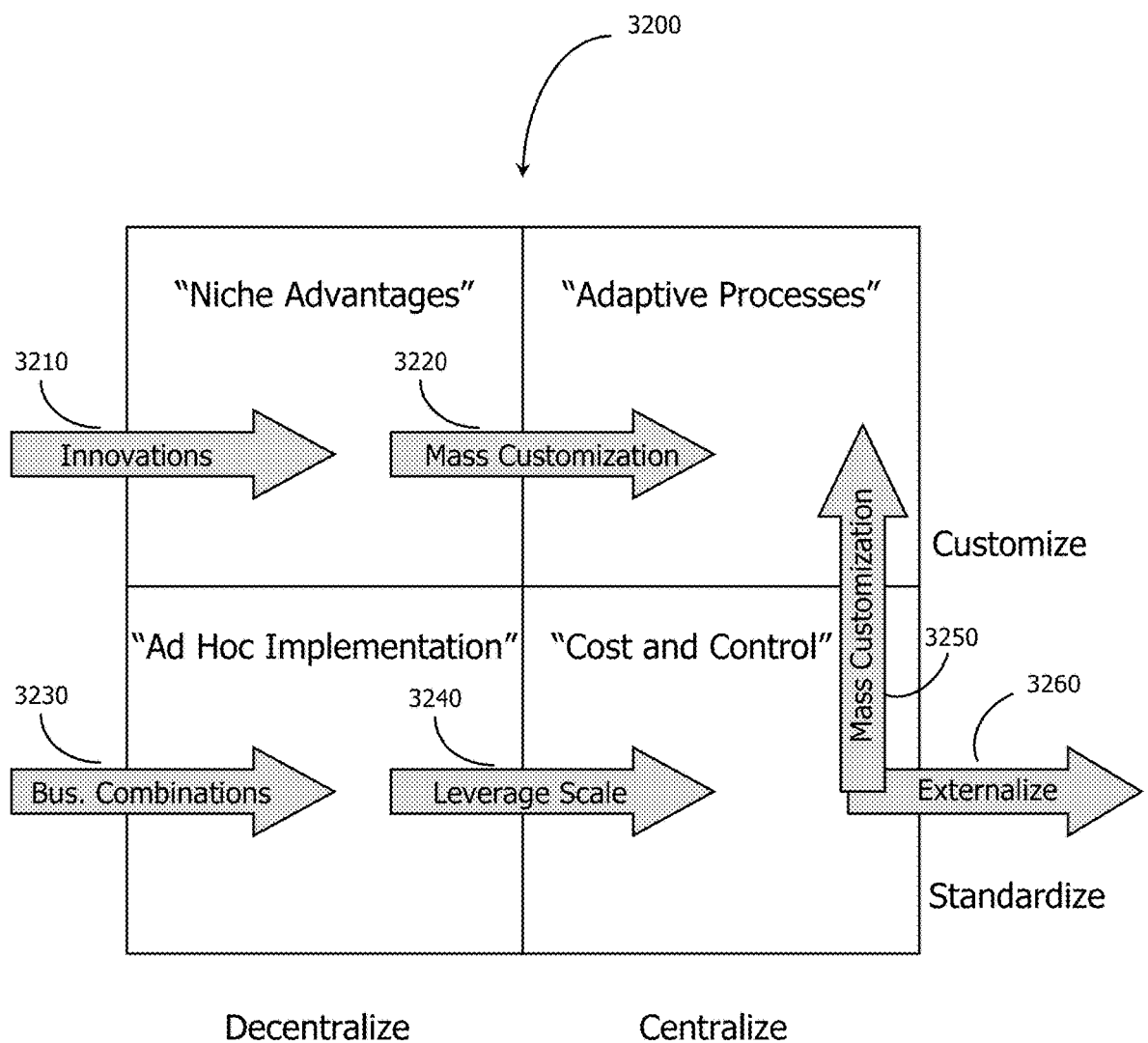
FIG. 36 is a diagram of a process lifecycle management framework, according to some embodiments.

According to some embodiments, FIG. 36 represents a process lifecycle management framework 3200 that may be advantageously used by businesses and institutions to ensure the highest possible value from their processes over time. The framework 3200 may be understood to represent one specific process lifecycle functionality layer.

Business innovations 3210 may be the source of processes (or process functionality layers) in the Niche Advantages quadrant. Business combinations 3230 may be the source of processes in the Ad Hoc Implementation quadrants. It is usually advantageous to migrate from the Ad Hoc Implementation quadrant to the Cost and Control quadrant through more effective leverage of scale 3240. It may be advantageous to migrate from the Niche Advantages quadrant to the Adaptive Processes quadrant through leverage of mass customization techniques 3220. It may also be advantageous to migrate from the Cost and Control quadrant to the Adaptive Processes quadrant through leverage of mass customization techniques 3250. Alternatively, it may also be advantageous to externalize the process 3260 from the Cost and Control quadrant, where external sources can provide process advantages, typically either through cost effectiveness, or through more effective customization or adaptation to local applications and the same cost.

Adaptive Process Application Areas

Recall from FIGS. 3, 4A, 4B, and 4C that adaptive recombinant processes may be applied to improve the functionality of any process 168 by integrating adaptive recommendations functions into the process 168 and applying the adaptive recommendations to facilitate the more effective use of the process instance 930. The application of the adaptive recommendations may be through delivery of adaptive recommendations 910 to process participants 200 or by applying the adaptive recommendations to modify the structure 905 and/or content 935 of computer-based applications 175 supporting the process, or both.

The following pages include descriptions of several adaptive processes 900 and adaptive recombinant processes 901. Table 3 lists embodiments of the adaptive process 900, including an associated figure and claim.

TABLE 3

Adaptive Process Embodiments

Figure 37:
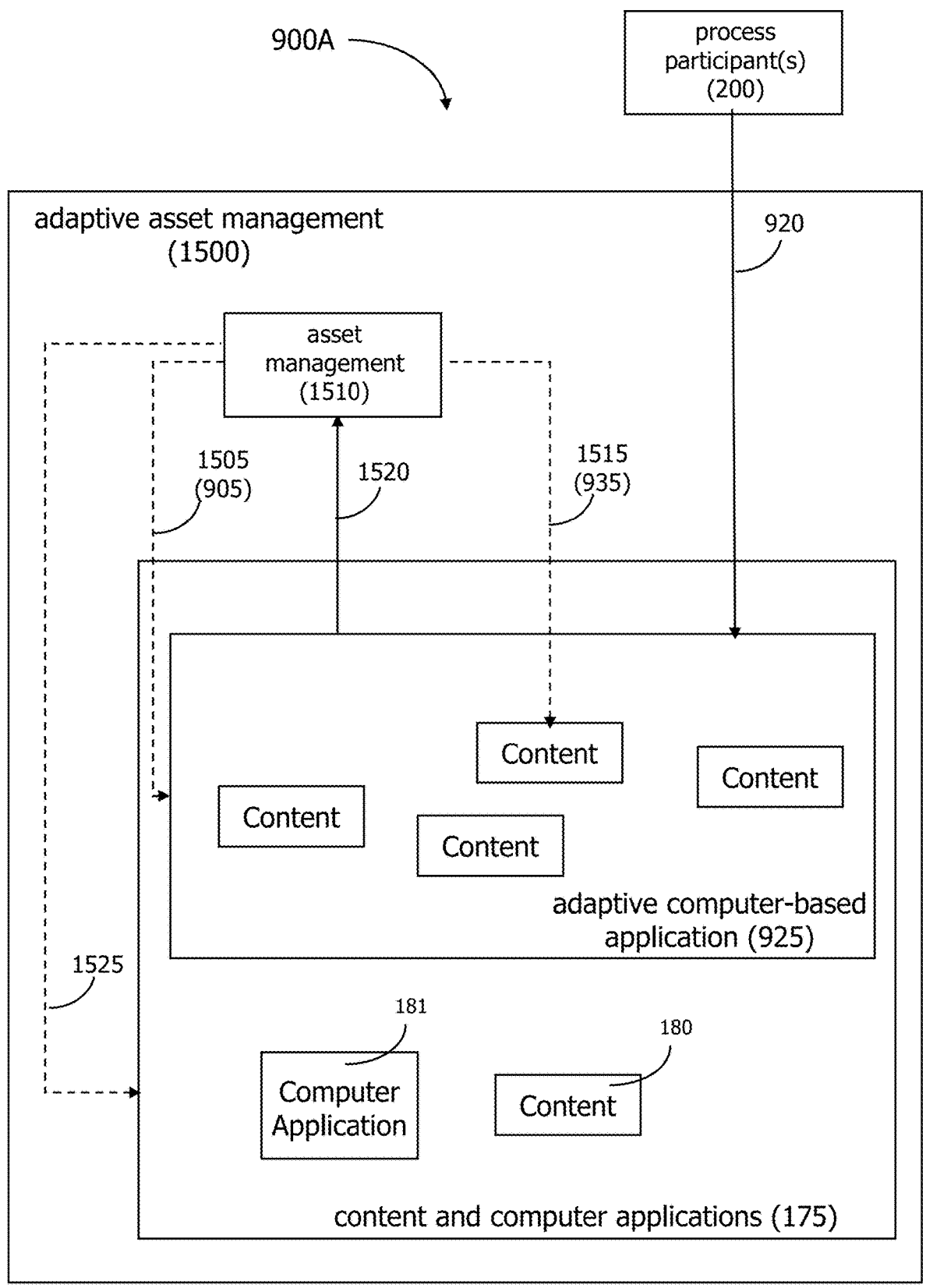
FIG. 37 is a block diagram of an adaptive asset management system and process, according to some embodiments.
Figure 38:
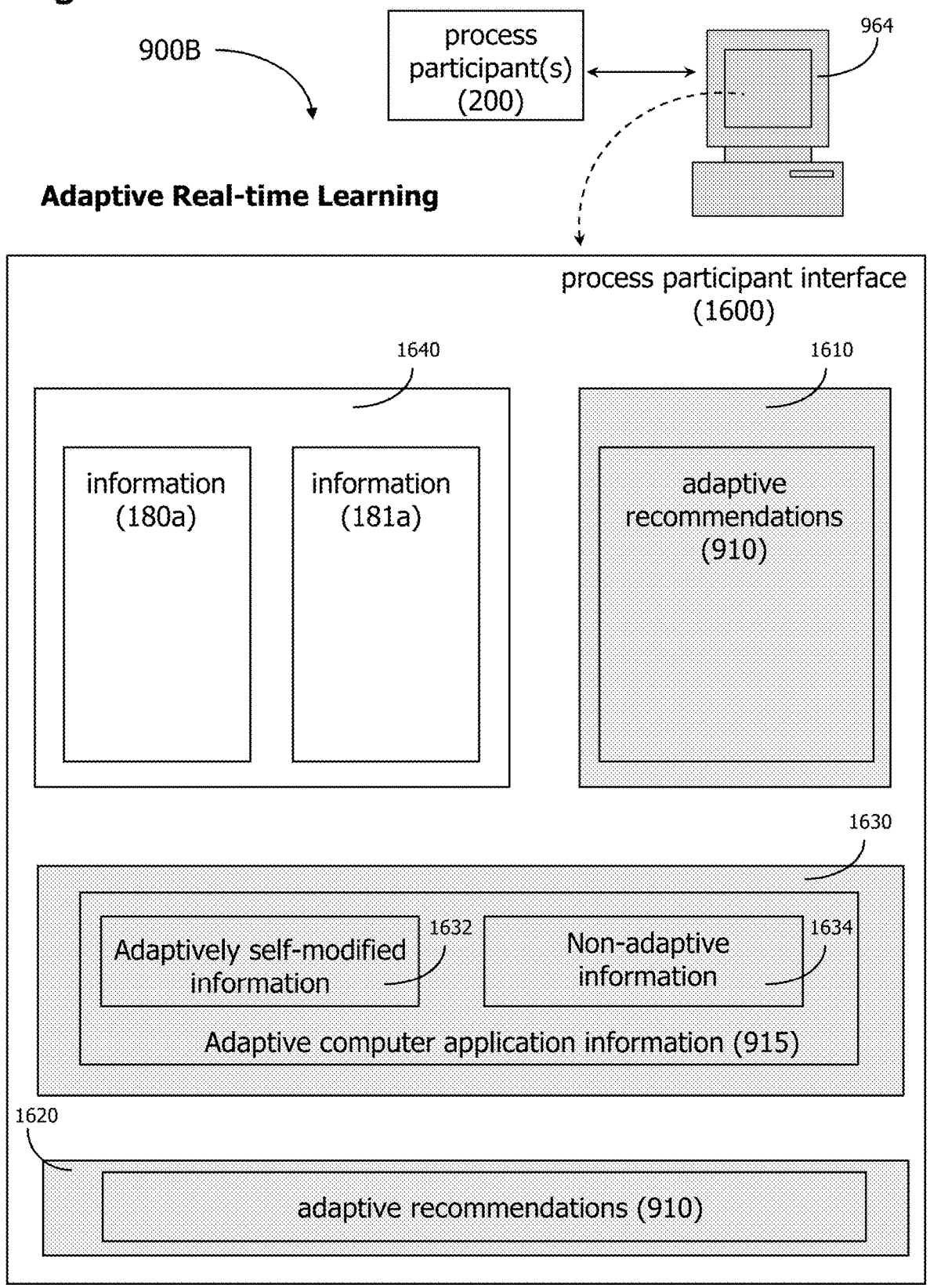
FIG. 38 is a block diagram of a real-time learning system interface, according to some embodiments.
Figure 39:
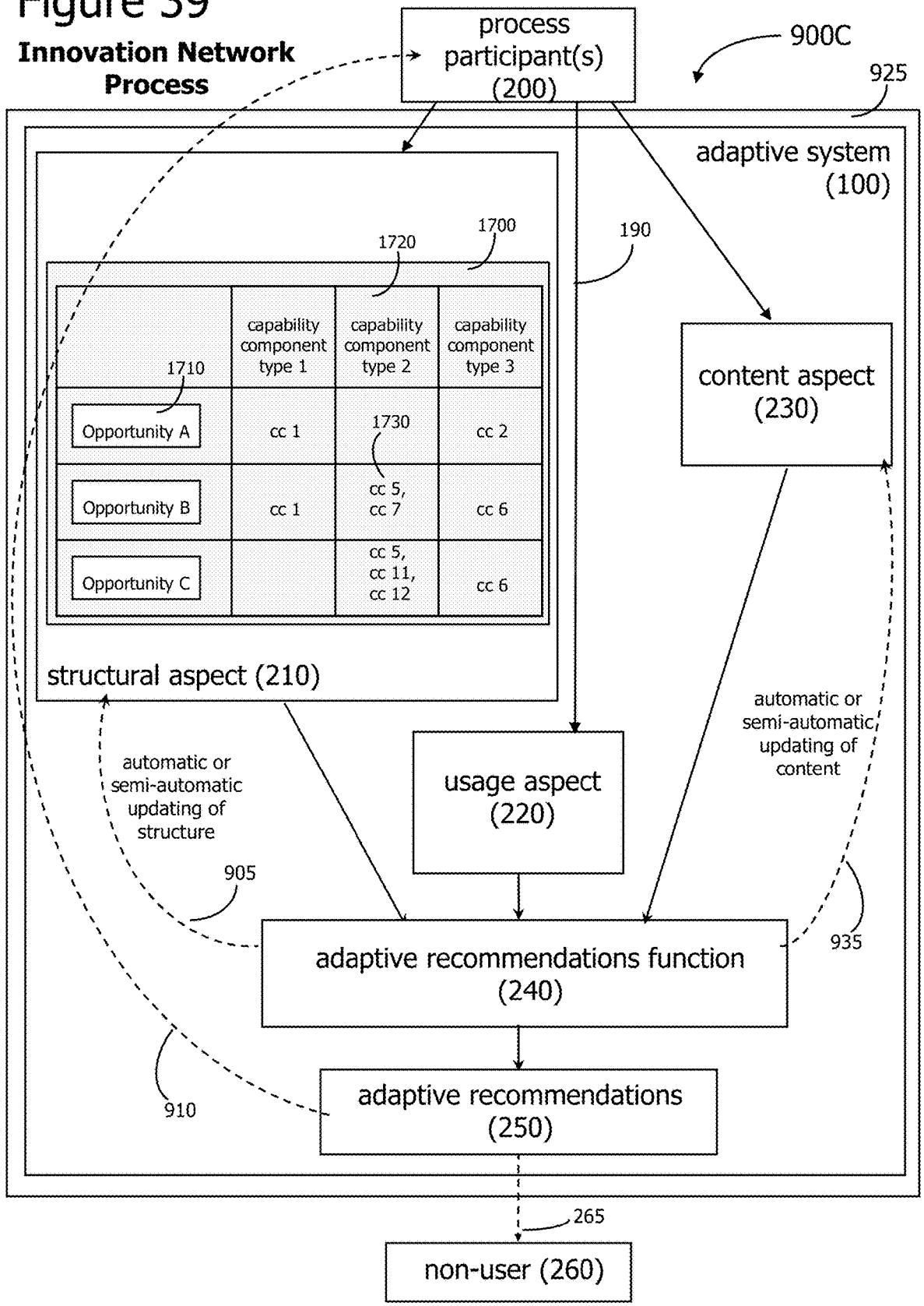
FIG. 39 is a block diagram of an adaptive system to support an innovation process, according to some embodiments.
Figure 40:
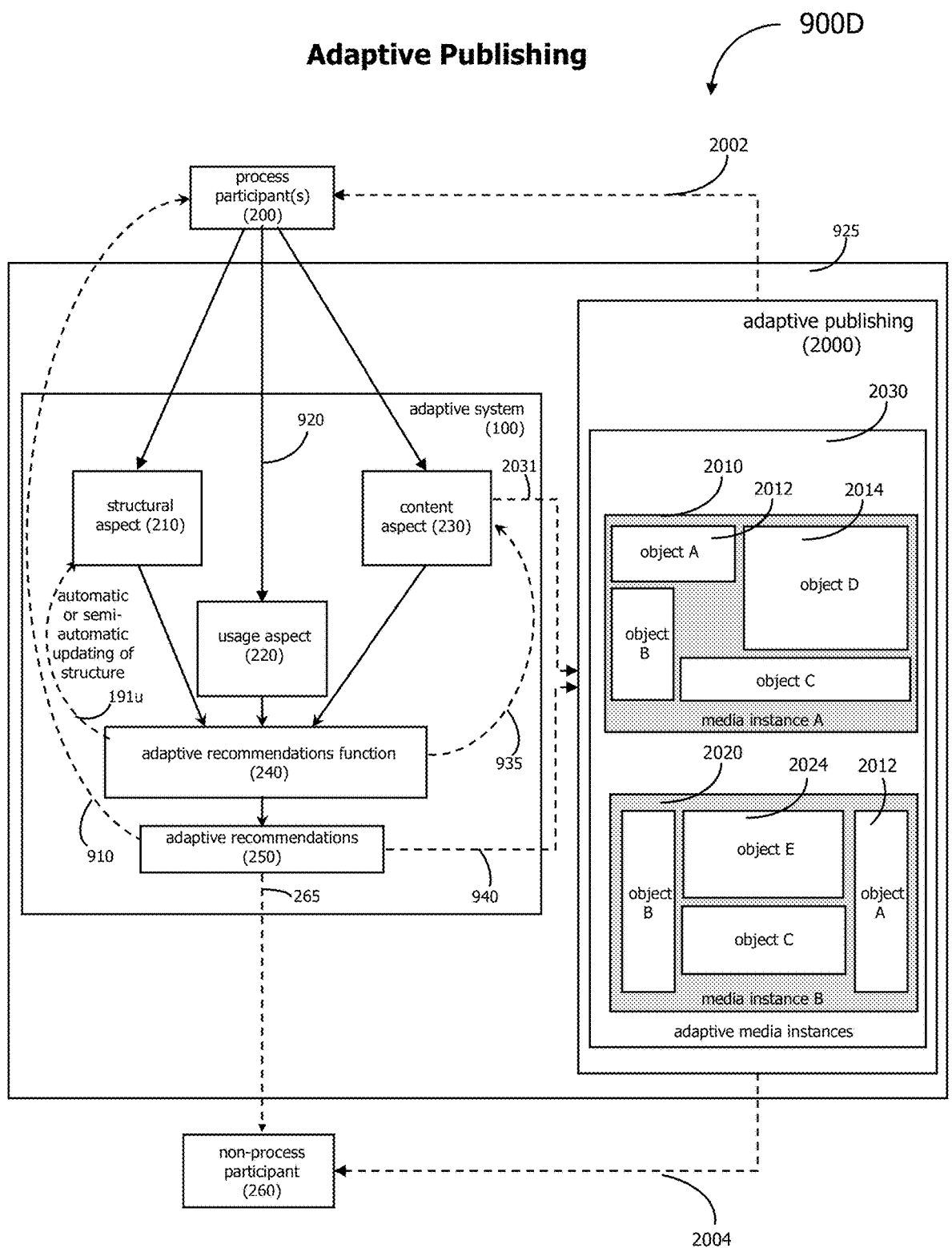
FIG. 40 is a block diagram of a system and process for adaptive publishing, according to some embodiments.

| Embodiment | Figure | Claim |
| --- | --- | --- |
| Adaptive process 900 | FIG. 4A | Claim 1 |
| Adaptive asset management process 900A | FIG. 37 | Claim 8 |
| Adaptive real-time learning process 900B | FIG. 38 | Claim 25 |
| Innovation network process 900C | FIG. 39 | Claim 34 |
| Adaptive publishing process 900D | FIG. 40 | Claim 35 |

TABLE 3-continued

Adaptive Process Embodiments

Figure 41:
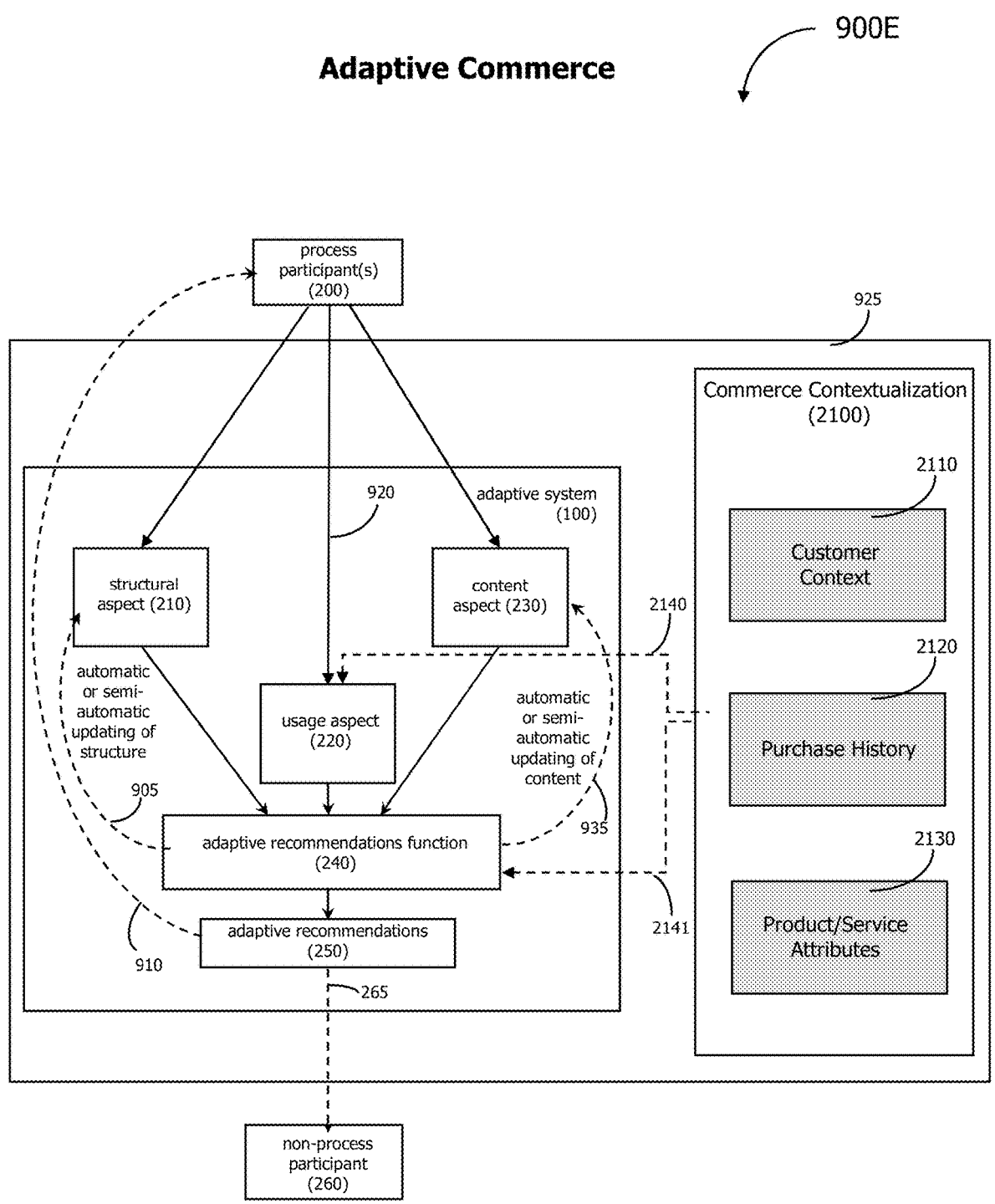
FIG. 41 is a block diagram of a system and process for adaptive commerce, according to some embodiments.
Figure 42:
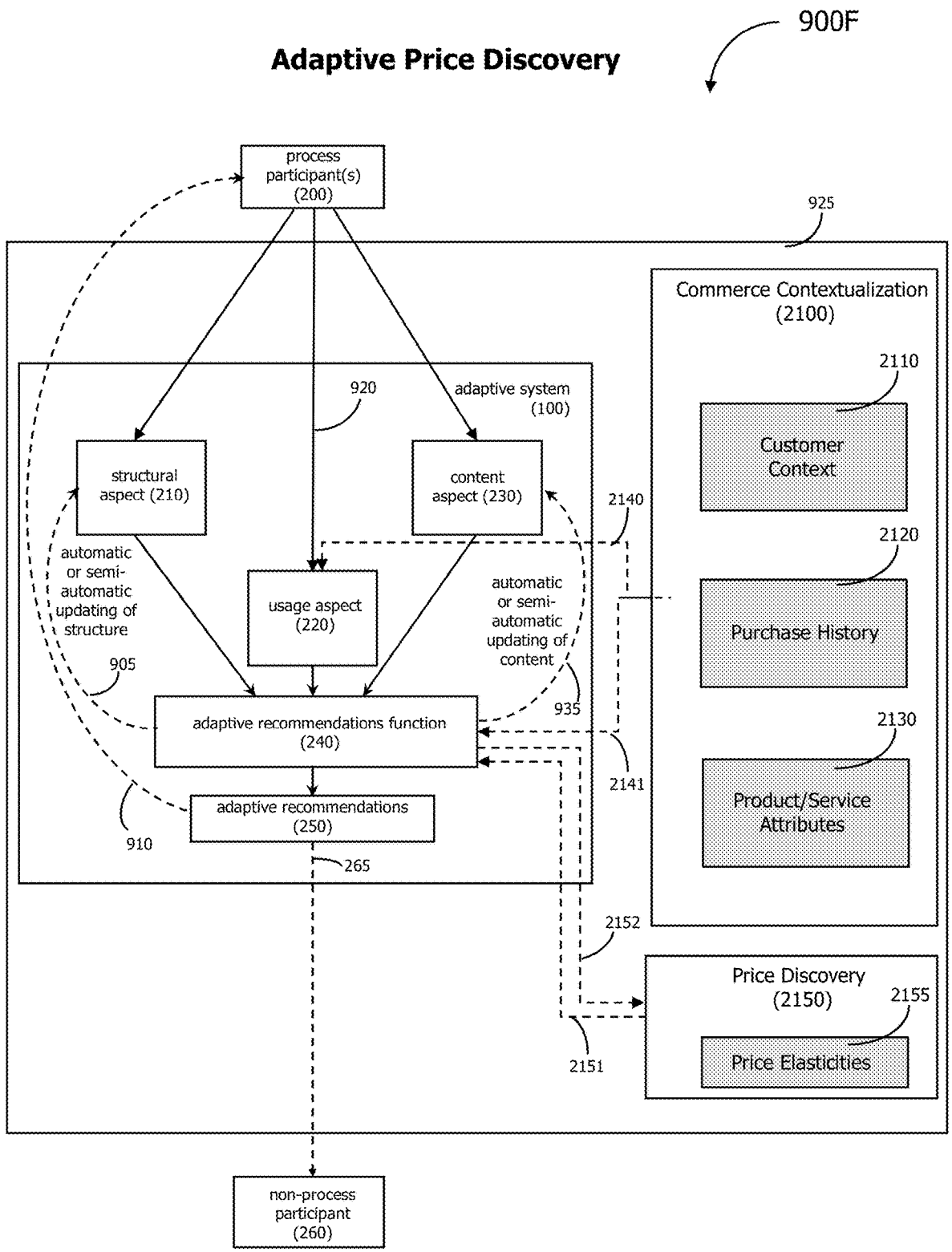
FIG. 42 is a block diagram of a system and process for adaptive price discovery, according to some embodiments.
Figure 43:
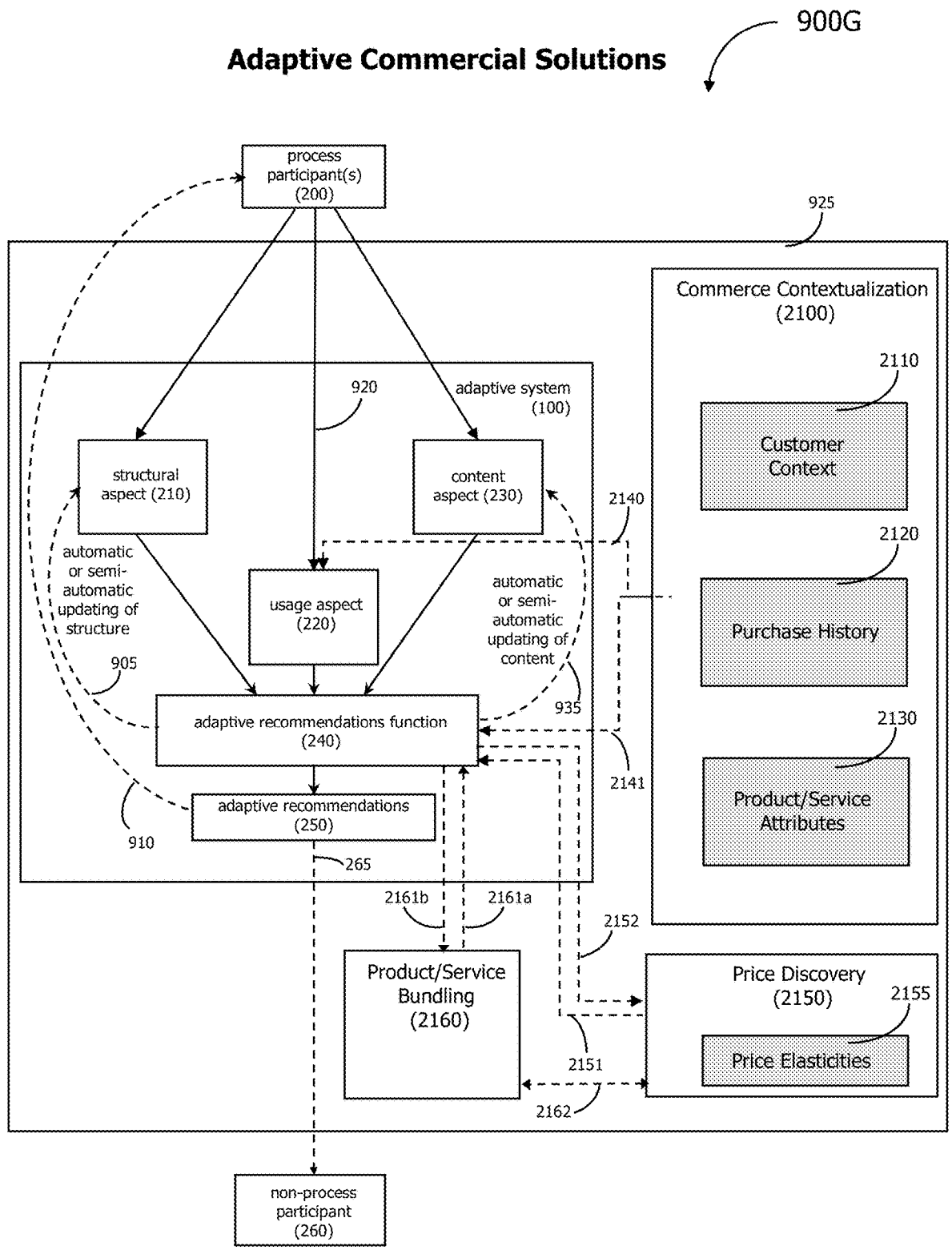
FIG. 43 is a block diagram of a system and process for adaptive commercial solutions, according to some embodiments.
Figure 44:
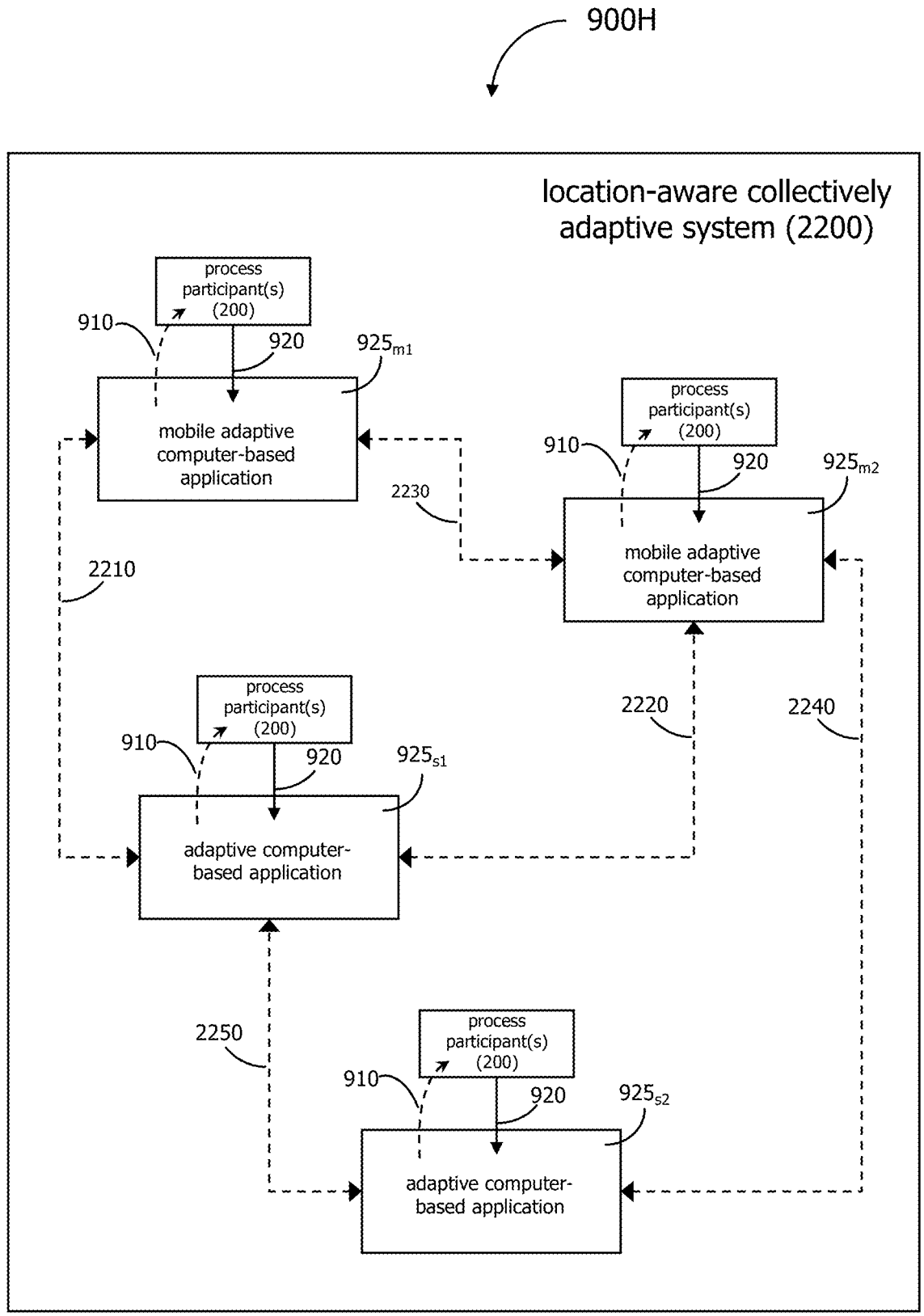
FIG. 44 is a block diagram of location aware collectively adaptive systems, according to some embodiments.

| Embodiment | Figure | Claim |
| --- | --- | --- |
| Adaptive commerce process 900E | FIG. 41 | Claim 27 |
| Adaptive price discovery process 900F | FIG. 42 | Claim 28 |
| Adaptive commercial solutions process 900G | FIG. 43 | Claim 29 |
| Location-aware collectively adaptive process 900H | FIG. 44 | Claim 37 |

Likewise, Table 4 lists embodiments of the adaptive recombinant process, including an associated figure and claim.

TABLE 4

Adaptive Recombinant Process Embodiments

Figure 49A:
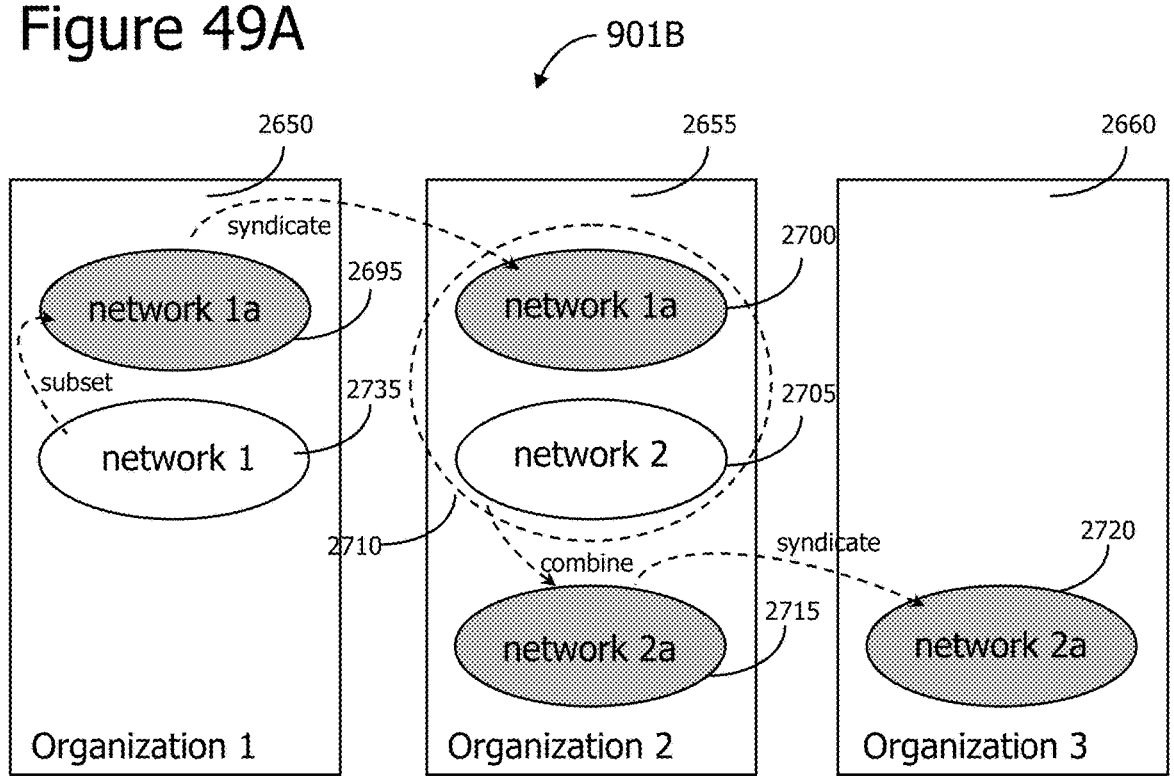
FIGS. 49A and 49B are block diagrams of recursive syndication and combination of networks of the structural aspects of the adaptive recombinant systems of FIG. 47 or 48 across organizations, according to some embodiments.
Figure 49B:
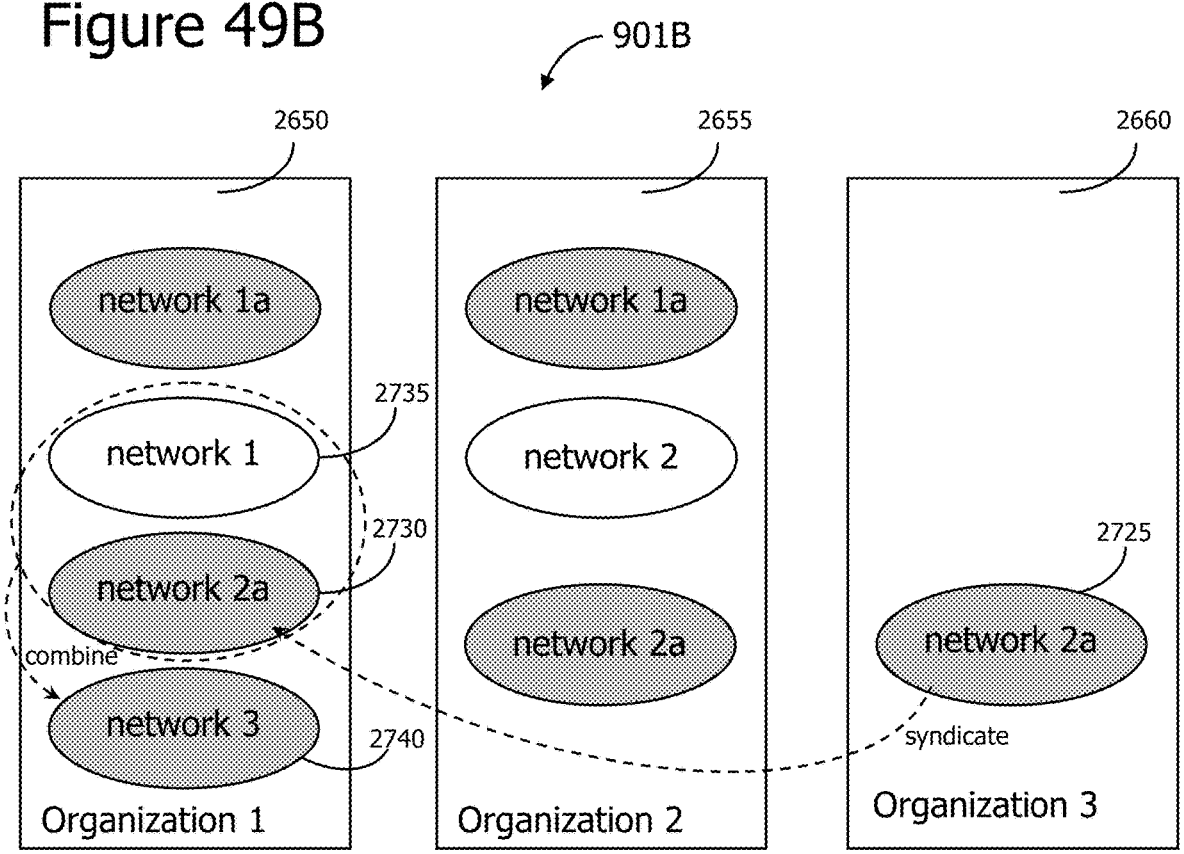
Figure 50:
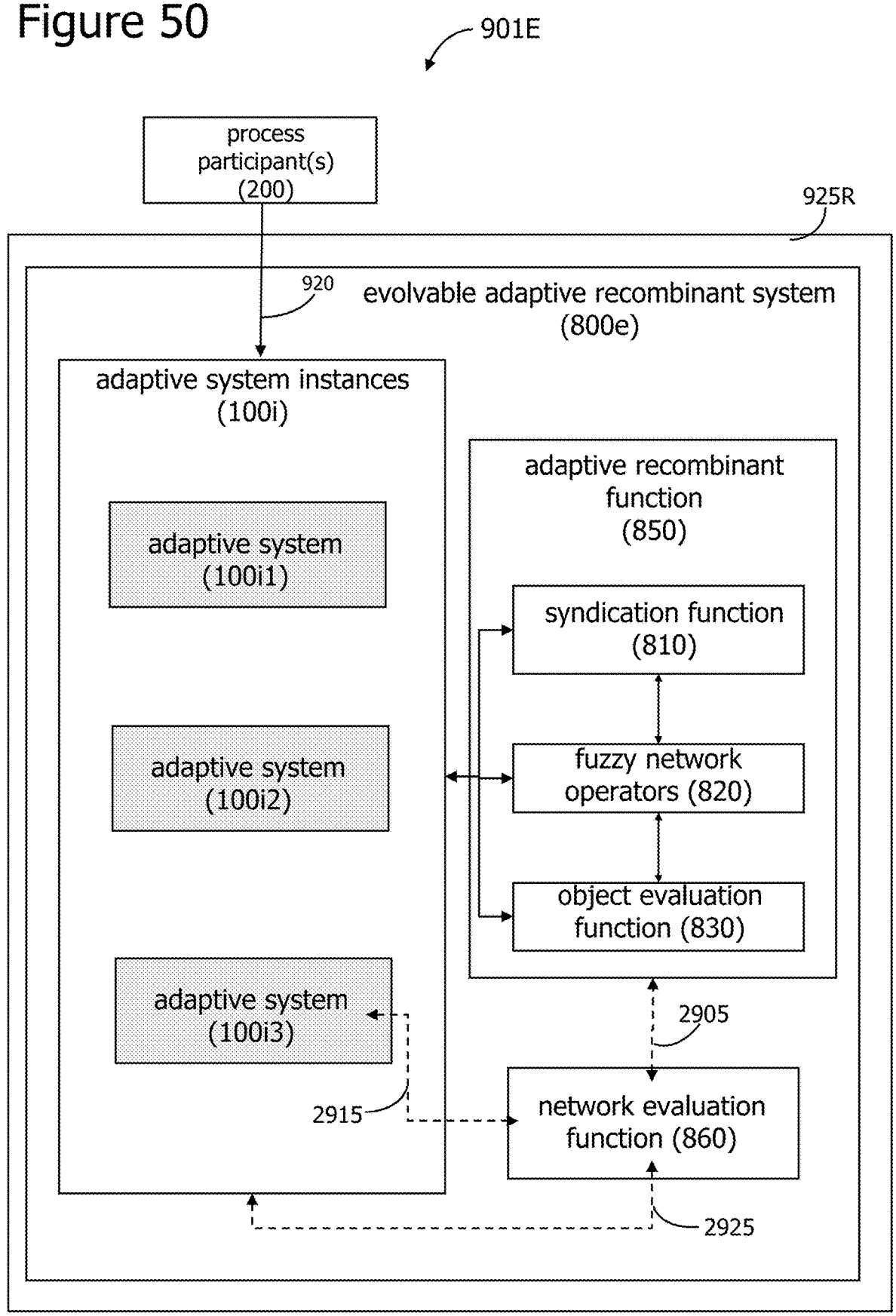
FIG. 50 is a block diagram of an evolvable adaptive recombinant system and process, according to some embodiments.

| Embodiment | Figure | Claim |
| --- | --- | --- |
| Adaptive recombinant process 901 | FIG. 4C | Claim 22 |
| Recombinant process network process 901A | FIGS. 30A-B | Claim 23 |
| Adaptive viral marketing process 901B | FIGS. 49A-B | Claim 31 |
| Evolvable process 901E | FIG. 50 | Claim 24 |

Tables 3 and 4 are provided for convenience in understanding the following passages, and are not meant as an exhaustive presentation of the possible applications of the adaptive process 900 or the adaptive recombinant process 901. Further, the cited figures and claims are not exhaustive, but are meant as a guide to assist in understanding the following exemplary embodiments.

FIGS. 37-43 depict specific applications of the adaptive process 900 (processes 900A-900H) or adaptive recombinant process 901 (processes 901A, 901B, 901E). In some of these applications, the adaptive process 900 will include an adaptive system 100 (FIG. 7), in which the adaptive system may include some non-adaptive elements (FIG. 8), a fuzzy network structure (FIG. 14), a combination of network and non-network-based structure (FIG. 15), or a process network structure (FIG. 28). Further, the adaptive recombinant process 901 in some of these applications may include an adaptive recombinant system 800 (FIG. 16), which may include a fuzzy network structure (FIG. 17), or a process network structure (FIG. 29).

The following illustrations are specific process application areas for which the adaptive process 900 or adaptive recombinant process 901 may be advantageously applied, although it should be understood that these application areas do not constitute all the possible applications of the adaptive process 900 or adaptive recombinant process 901.

Adaptive Asset Management

According to some embodiments, the adaptive process 900 may be used to establish online asset management systems and processes. An on-line asset is defined as any item of software or content, or any tangible or intangible asset that the software or on-line content represents. In other words, the asset to be managed may also be derivative from the representations of the software or content of adaptive process 900.

Recall from FIGS. 4A and 4B that the adaptive computer-based application 925 may integrate with existing and/or new online computer applications 175 to enable capture and analysis of usage behavior information 920. This information may then be used to determine the value of the online computer and software assets. This determination of value of online assets can then be applied beneficially to facilitate asset management processes associated with the on-line assets, optionally including applying a function to automatically or semi-automatically modify the one or more computer applications 175 in alignment with the inferred value of the online assets of computer applications 175 to process participants 200.

FIG. 37 depicts an adaptive process 900A, including an adaptive asset management system 1500. The asset management system 1500 includes the adaptive computer-based application 925 and an asset management function 1510. Although in FIG. 37, the asset management function 1510 is shown to be external to the adaptive computer-based application 925, it should be understood that the asset management function 1510 may be configured to be internal to the adaptive computer-based application 925. Further, although not shown in FIG. 37, the adaptive computer-based application 925 may contain the adaptive system 100.

The asset management function 1510 receives information 1520 associated with data regarding the usage behaviors 920 of process participants 200, or inferences of the preferences and interests of online assets associated with the process participant usage behaviors 920. The asset management function 1510 uses the information 1520 to derive the value of online assets. The derived value may be of different magnitudes for different individuals or communities of process participants 200. The asset valuation information determined by the asset management function 1510 may be applied to decide near-term or long-term online asset changes and directions. For example, a high-value on-line asset might be made more prominently available for process participants 200, while less valuable assets might be made less prominent, or eliminated from the content and computer applications 175. New development projects to deliver on-line assets that are expected to be of high value based on the valuations of the asset management function 1510 may be conducted. Further, in addition to on-line assets, features associated with the assets may be evaluated by the asset management function 1510, and appropriate asset modifications or development projects initiated. For some modifications, the asset management function 1510 may be used to support making the appropriate changes.

The asset management function 1510 may automatically or semi-automatically modify 1505 the adaptive computer-based application 925. For alternative embodiments in which the asset management function 1510 is internal to the adaptive computer-based application 925, the adaptive self-modification operation 1505 is analogous to the structural modifications 905 of the adaptive system 100, the adaptive recombinant system 800, and the generalized adaptive computer-based application 925, described above. Likewise, the asset management function 1510 may automatically or semi-automatically modify 1515 content within adaptive computer-based application 925. For embodiments in which the asset management function 1510 is internal to the adaptive computer-based application 925, the adaptive self-modification of content 1515 is analogous to the content-based modifications 935, 905 of the aforementioned systems 100, 800, 925 (represented in parentheses). Further, other computer applications and content 175 may be automatically or semi-automatically modified 1525 by the asset management function 1510 in accordance with valuations derived by asset management function 1510. In such cases, even if direct usage behavioral information 920 are not available for non-adaptive computer application 181 and content 180, the asset management function 1510 may make inferences based on analogy from interactions of the process participants 200 with the adaptive computer-based application 925 to generate appropriate valuations.

Note that adaptive recommendations 910 delivered to process participants 200 is not an essential feature for enabling process application 900A.

Adaptive Real-Time Learning

The adaptive process 900 may be used to establish an adaptive process environment 930 (FIGS. 4A and 4B) to promote enhanced learning by process participants 200, including real-time learning, for existing or new processes through the implementation of adaptive recommendations 910 that are delivered directly to the process participant or user 200, or indirectly through adaptive modification of the process network structure 905 or content 935. In some embodiments, the resulting environment may be metaphorically termed an adaptive online "cockpit" of process knowledge and activities that effectively "surrounds" the process user. This approach facilitates the real-time learning of process participants 200, rather than relying solely or primarily on classroom or other episodic forms of education or training.

FIG. 38 illustrates an adaptive process 900B, or adaptive real-time learning process, including an exemplary process participant interface 1600 associated with a computing device 964 that is interacted with by process participants 200. It should be understood that although FIG. 38 illustrates a visual, display-oriented process participant interface, the interface could be audio-based, tactile or kinesthetically-based, or the interface could be comprised of combinations of visual, audio, or kinesthetic elements. The process participant interface 1600 of the adaptive process 900B may include one or more instances of displayed adaptive recommendations 910 associated with the adaptive computer-based application 925, in which the adaptive recommendations 910 are formatted for viewing in a specified manner. In FIG. 38, a first formatted instance 1610 and a second formatted instance 1620 of adaptive recommendations 910 are shown. The process participant interface 1600 may contain other information 915 derived from the adaptive computer-based application 925, formatted as appropriate for display. A formatted instance 1630 of information 915 from the adaptive computer-based application 925 is shown. A formatted instance 1630 may contain one or more instances of adaptive information 1632 and/or non-adaptive information 1634. Recall from FIG. 4A that adaptive information 1632 is content, structural elements, objects, information, or computer software that has been adaptively self-modified 905, 935 by the adaptive computer-based application 925 based, at least in part, on usage behaviors 920 of process participants 200. Non-adaptive information 1634 denotes any other information, content, objects, or computer software encompassed by the adaptive computer-based application 925 that has not been adaptively self-modified 905, 935.

The process participant interface 1600 may also contain formatted instances 1640 of other information such as information derived from other content 180a and other computer applications 181a that are relevant to process participants 200.

Formatted instances 1610, 1620 of adaptive recommendations 910 and formatted instances of adaptive computer application information 915 may contain explicit educational or training information or content, or relevant references or "help" information, in addition to more general information or content relevant to the associated process. In some embodiments, the adaptive computer-based application 925 may include or interact with a learning management system that may provide guidance on the appropriate educational or training information to include in the adaptive recommendations 910.

Innovation Networks

According to some embodiments, the adaptive process 900 may be used to create adaptive "innovation networks" that may be applied to facilitate collaborative research and development processes. These processes may be applied within an organization, or span an unlimited number of organizations or individuals. In some embodiments, adaptive recombinant processes may utilize the systems and methods of PCT Patent Application No. PCT/US05/001348, entitled "Generative Investment Process," filed on Jan. 18, 2005, which is hereby incorporated by reference as if set forth in its entirety, to enable innovation networks and processes.

FIG. 39 illustrates an adaptive process 900C, or innovation network process, including the adaptive computer-based application 925, which includes the adaptive system 100. The structural aspect 210 of the adaptive system 100 encompasses an innovation map 1700, which associates opportunities 1710 to capability components 1730, shown in FIG. 39 organized within capability component categories or types 1720. Opportunities, capability component types, and capability components may be collectively termed the "elements" of innovation map 1700. It should be understood that although the innovation map 1700 is depicted in FIG. 39 in a table format, the innovation map 1700 may be organized in network structure, including a fuzzy network structure. Further, the innovation map 1700 may be incorporated within a process network, such as in FIG. 25 (not explicitly shown in FIG. 39) within the structural aspect 210.

"Opportunities," as defined herein are ideas that can potentially generate value and that involve investments of time, resources, or financial commitments. These opportunities may be within defined processes, such as business development and growth processes, commercial venture capital, corporate venturing processes, business incubation processes, marketing processes, research and development processes, and innovation processes, or the investment processes and associated activities may be more ad hoc in nature.

Typically, opportunities 1710 consist of a bundle of two or more capability components, such as "cc 5" and "cc 7" 1730. For example, even if a business idea (opportunity) is based on a technological break-through, the overall business venture idea is likely to also include other differentiating components, such as processes (e.g., marketing processes). It is the uniqueness of the bundle of components that typically provides the economic value-creating potential of the idea.

Capability components 1730 may include both tangible and intangible aspects of an opportunity 1710. The capability components 1730 may constitute a mutually exclusive, collectively exhaustive set for each opportunity 1710. (The term collectively exhaustive, as used herein, means that the elements of a set comprise the totality of the set.) Or, the capability components 1730 may represent just a subset of the opportunity 1710 defined and may simultaneously be represented in multiple opportunities 1710. A myriad of possibilities exist for representing opportunities 1710 using capability components 1730.

The capability components 1730 of the innovation map 1700 are individual instances of capability component categories or types 1720. Capability types 1720 may include, but are not limited to, products (including prototypes), technologies, services, skills, relationships, brands, mindshare, methods, processes, financial capital and assets, intellectual capital, intellectual property, physical assets, compositions of matter, life forms, physical locations, and individual or collections of people.

The objective of any innovation process is to maximize the volume of high value opportunities 1710 generated at the lowest possible cost. Meeting this objective is a function of multiple variables. One variable is the volume, breadth and quality of the capability components 1730. Another variable is the ability to combine capability components in a large variety and novel ways. A third variable is the degree to which the greatest diversity of human attention to be applied, and applied in the right places. The adaptive process 900C can be used to enable processes that beneficially affect these key variables of innovation process success.

The adaptive computer-based application 925, together with the innovation map 1700, enables more effective innovation-based processes in several ways. First, elements of the innovation map 1700 may include adaptive recommendations 250 that are delivered to process participants 200. This approach can help make process participants 200 aware of particularly relevant elements of the innovation map 170. Second, the adaptive recommendations function 240 may be applied to modify 905 the innovation map 1700 based on, at least in part, inferences on process participant 200 preferences or interests. This can facilitate the efficient development and maintenance of a collective innovation map that can most beneficially serve the interests of the process participants 200, including maximizing the number of high value opportunities generated within innovation map 1700. Third, elements of the innovation map 1700 may be syndicated, modified, and recombined among process participants 200 through the application of the adaptive recombinant system 800, enabling multiple, distributed innovation map instances. This structure can facilitate both shared and private innovation maps, effectively balancing the advantages of economies of scale and local interests. The adaptive recombinant system approaches of FIGS. 47, 48, 49A, and 49B may be applied to the syndication, modification, and recombination of elements of innovation map 1700.

The adaptive computer-based application 925 may contain, or interact with, auxiliary functions (not shown in FIG. 39) that may additionally facilitate innovation processes. For example, the adaptive computer-based application 925 may contain functions to enable automatic or semi-automatic evaluation of opportunities 1710, to automatically or semi-automatically generate additional opportunities 1710 through combinatorial operations on capability components 1730, and/or to facilitate effective information gathering or experimental design associated with uncertainties with regard to capability components 1730 or other elements of innovation map 1700. These additional functions may all be managed within an adaptive process network, such as the adaptive process network of FIG. 25 within the structural aspect 210 of the adaptive system 100.

Adaptive Publishing

The adaptive process 900 may be applied to enable adaptive publishing systems and processes. The adaptive process 900, when applied to enable adaptive publishing systems and processes, may generate adaptive analogs to non-adaptive "broadcasted" media such as print publications, radio programs, music albums or soundtracks, television programs, films, or interactive games; as well as generating adaptive media that may not have specific broadcast analogs. In some embodiments, the methods and systems defined by U.S. patent application Ser. No. 10/715,174, entitled "A Method and System for Customized Print Publication and Management," may be integrated with adaptive recombinant processes to enable an adaptive publishing process.

FIG. 40 depicts an adaptive process 900D, or adaptive publishing process, according to some embodiments. An adaptive publishing function 2000 that is included within the adaptive computer-based application 925 (although in other embodiments, the adaptive publishing function 2000 may be external to the adaptive computer-based application 925) receives input from the adaptive system 100. The input may be in the form of adaptive recommendations 940 suitable for the adaptive publishing purposes, generated from adaptive recommendations 250, or the input may be in the form of informational content 2031 contained in the content aspect 230 of the adaptive system 100. The content originating from the content aspect 230 may have been modified 935 by the adaptive recommendations function 240. In either case, the adaptive publishing function 2000 uses the inputs from the adaptive system 100 to generate media that is appropriately customized for the recipients of the media 200, 260. This customization of an adaptive publication, or media instance, may include the specific elements of content that will be contained in a media instance, and also the arrangement of the elements of content in the media instance. Thus, a media instance, as used herein, is a distinct set of objects or information in combination with a unique arrangement of the objects or information. The customization of media into specific media instances is performed on the basis of inferred media recipient 200, 260 preferences and interests, which are in turn based on recipient interactions with the adaptive system 100, or through inferred affinities between the media instance recipient and other individuals that have interacted with adaptive system 100.

As shown in FIG. 40, the adaptive publishing function 2000 generates one or more instances of media 2030, adapted appropriately to the preferences or interests of the media recipients 200, 260. Each media instance contains one or more elements of content, some or all of which may be objects 212 or information 232 (FIG. 9A) contained in the adaptive system 100. Although not shown explicitly in FIG. 40, a media instance may also explicitly or implicitly include relationships among objects 214 associated with the structural aspect 210 of the adaptive system 100.

As shown in the example of FIG. 40, media instance 2010 contains multiple objects in a particular configuration, including "Object A" 2012 and "Object D" 2014. Recall that the objects 212 of the adaptive system 100 may contain any form of digital information, including text, graphics, audio, video, and executable software. These objects may be transformed to alternative media forms by the adaptive publishing function 2000. An individual media instance can therefore be defined as a set of information objects 212 or information items 232 and a particular arrangement of the objects of information items. So, as one example, on-line textual objects 212 may be transformed into printed media by the adaptive publishing function 2000. In the case of printed media, a specific media instance is determined by not only the objects to be included in a media instance, but also the arrangement or print layout of the objects 212 and any other content included within the media instance. The information objects 212 within a media instance may be substantive in nature, or non-substantive (e.g., promotional or advertising information).

In accordance with inferred preferences and interests of the intended recipients, media instance 2020 contains a different set of objects and a different arrangement of objects than media instance 2010. For example, "Object A" 2012 exists in both media instance 2010 and 2020, but for example, "Object D" 2014 is unique to media instance 2010 and "Object E" 2024 is unique to media instance 2020.

Although the adaptive media instances 2030 of FIG. 40 depict differing arrangements of objects and other items of content in accordance with a spatial orientation, consistent with, for example, physical spatially-oriented media such as printed media, including newsletters, newspapers, magazines, and books, it should be understood that the customized object selection and arrangement of the adaptive publishing function 2000 may apply to other media types as well. In such cases, the arrangement of elements of the media instance may be other than spatial in nature; for example, the arrangement may be temporal-based for media containing information than is typically "consumed" sequentially. For example, for audio objects 212 or information 232 such as songs, the specific songs selected, and arrangement of the songs in a sound track may be different across media instances. For video or multi-media objects 212 or information 232, customized media instances may include applying the adaptive publishing function 2000 to choose different musical sound tracks for corresponding elements of video, or even generating different media instances containing different elements of, or a different sequence of, the plot or story line of the video. For interactive media, such as computer-based games, the game instance may be customized by the adaptive publishing function 2000 through the selection of different software modules of the game, or by arranging the software modules of the game in different ways in different media instances.

For audio and/or video-based objects 212 or information 232, the adaptive publishing function 2000 may generate media instances that constitute "programs," which are adaptive analogues of radio programs, television programs or other broadcasted forms.

Media instances may be delivered or otherwise made available 2002 to process participants 200, or made available 2004 to non-process participants 260. Media instances may take a purely digital form that can be embodied in a variety of physical forms. They may be available to recipients in the purely digital form, or they may be available to process participants 200, or to non-process participants 260 through other physical embodiments. A media instance may be printed, for example. A media instance may be stored on portable storage media such as CD-ROMs or DVD's.

The adaptive publishing function 2000 of the adaptive process 900D may apply additional logic or information in generating adaptive media instances 2030 that may not be available from the usage aspect 220 of the adaptive system 100. For example, a record of what objects 212 or information 232 have been contained in media instances received by particular recipients may be used to ensure that a recipient does not receive another media instance that contains information the recipient is likely to have already seen or heard. (This rule might be relaxed or adjusted, for example, for non-substantive content that is included for advertising or promotional purposes.) The adaptive publishing function 2000 may also include special capabilities for managing advertising or promotional information within each media instance. These capabilities seek to optimize or to control advertising or promotional content such that the content will be of the most value to consumers or producers of the media instances 2030, while aligning the frequency and prominence of the advertising or promotional information with the terms and conditions agreed to by suppliers of the advertising or promotional content. The advertising or promotional content may exist within the adaptive system 100, or may be managed within the adaptive publishing function 2000.

The adaptive publishing function 2000 may apply other global considerations or rules in generating adaptive media instances. For example, limits on the amount of information within a media instance may influence the composition of the media instances. The informational limits may be measured, for example, in terms of the number of words or number of pages for text-based media, or, for example, by duration for audio or video-based media. Furthermore, there may be limits on the number of unique media instances generated, and in this case the adaptive publishing function 2000 may apply optimization algorithms to determine media instance composition and arrangement so as to collectively benefit media recipients 200, 260 while conforming to the limits on the number of unique media instances.

The adaptive publishing function 2000 may also apply specific formatting features to media instances. For example, for text-based media instances, specific fonts, font-size, colors, line spacing, and other format variations may be applied in accordance with inferred preferences of media recipients 200, 260. The adaptive publishing function 2000 may also apply alternative languages to media instances in accordance with inferred preferences of media recipients 200, 260.

Although not explicitly shown in FIG. 40, information regarding media instances and the corresponding recipients within the adaptive publishing function 2000 may be made available to the adaptive system 100, and constitute another behavioral aspect incorporated by the usage aspect 220, that can be used by the adaptive recommendations function 240 in generating subsequent recommendations.

Adaptive Commerce

Adaptive processes may be employed to recommend products or services 910 based not only on customer 200 buying behaviors and patterns, but also within the context of auxiliary information or rules that may be specific to the customer or potential customer 200, the customer's organization, and/or the products and services purchased.

According to some embodiments, FIG. 41 depicts an adaptive process 900E, or adaptive commerce process, which includes the functions of an adaptive commerce application. A commerce contextualization function 2100 within the adaptive computer-based application 925 provides additional contextualization to the adaptive system 100 for use by the adaptive recommendations function 240. The commerce contextualization function 2100 may deliver information to the adaptive system 100 directly 2141 to the adaptive recommendations function 240, or through information transfer 2140 to the usage aspect 220. It should be understood that the commerce contextualization function 2100 may be external to the adaptive computer-based application 925, in some embodiments, and transfer information to the adaptive computer-based application 925; which may, in turn, transfer the information to the adaptive system 100. It should also be understood that although the commerce contextualization function 2100 is shown in FIG. 41 to be external to the adaptive system 100, some or all of the functions of commerce contextualization function 2100 could alternatively be internal to the adaptive system 100. For example, some or all of the information associated with the commerce contextualization function 2100 could be directly derived from process participant behaviors 920 and stored and processed in usage aspect 220.

The commerce contextualization function 2100 of the adaptive process 900E includes one or more functional elements, each of which may include relevant information and procedures or algorithms. As shown in FIG. 41, the commerce contextualization function 2100 may include a customer context function 2110, a purchase history function 2120, and a product/service attributes function 2130. The customer context function 2110 includes contextualization information associated with the commercial process participants 200, or customers, that are not available through inferences from customer behaviors 920. For example, for business customers, the customer context function 2110 may include information regarding office site and layout or other business environment-related information. Such information may prove useful in providing recommendations 910 that are most relevant given the business environment of the customer. As another example, pertaining to recommendations to consumers, the customer contextualization function 2110 may contain information on family members of a particular customer, including gender, age, etc., thereby enabling tuning of recommendations 910 (as one example, in the case of gift recommendations) appropriately.

The commerce contextualization function 2100 may also, or alternatively, include a purchase history function 2120. This function includes a mapping of customers to purchases of products or services over time. This information can be used by the adaptive recommendations function 240 to deliver more effective recommendations 910. For example, purchase patterns that are embedded in the information associated with the purchase history function 2120, combined with usage behaviors 920, may enable the recommendation function 240 to generate improved recommendations 910 through incorporation of insights associated with purchase timing patterns. For example, it may be determined by application of the purchase history function 2120 that a certain business customer buys certain products only twice a year, and always in conjunction with another product type. The recommendations 910 may then be appropriately aligned with this pattern.

The commerce contextualization function 2100 may also, or alternatively, include a product or service attributes function 2130. This function includes additional information or context for product or services. As an example, for durable products or goods, a schedule of depreciation may be included in the product/service attributes function 2130. Such information may enable the adaptive recommendations function 240 to tune recommendations to be consistent with the expected lifespan of previously purchased products.

The customer context function 2110, the purchase history function 2120, and the product/service attributes function 2130 may be applied independently, or collectively, in providing additional information to adaptive system 100 to be used by the adaptive recommendations function 240.

Adaptive commerce applications may be applied to adaptive price discovery processes, so as to more advantageously determine prices for products or services. Thus, an adaptive process 900F, or adaptive price discovery process, is depicted in FIG. 42, according to some embodiments. In addition to the commerce contextualization function 2100, the adaptive computer-based application 925 may include, or have access to, a price discovery function 2150 that provides input to the adaptive recommendations function 240 of the adaptive system 100.

Process participant behaviors 920 may be used to infer conscious or unconscious intensity of desire for a product or service, or a collection of products or services. Based on these inferences, as well as information or rules 2151 from the price discovery function 2150, and optionally, information from the commerce contextualization function 2100, the adaptive recommendations function 240 generates adaptive recommendations 910 that include prices for products or services that, in some embodiments, are optimized to yield the highest price that is expected to achieve a sale of the associated product or service to the process participant 200. In other words, the price may be set at a level that is expected to maximize the seller's capture of the buyer's economic rent. The process participant behaviors and associated inferences may be transferred 2152 from the adaptive recommendations function 240 to the price discovery function 2150. Other contextual information may be applied by the combination of the price discovery function 2150 and the adaptive recommendations function 240 to price appropriately. For example, the price optimization may be adjusted as appropriate based on whether the sales transaction is expected to constitute a one-time relationship, or whether future transactions may take place. The results from the recommended prices 910 may be used to determine inferred price sensitivities and elasticities 2155 for one or more process participants 200. Thus, the price discovery function 2150 may supply useful information 2151 to the adaptive recommendations function 240, enabling optimal product pricing; likewise, the adaptive recommendations function 240 may supply useful information 2152 to the price discovery function 2150 for determining prices, price elasticities, or other pricing functions.

The price discovery function 2150 may include a price discovery experimental design function that is applied to optimize the testing of prices through the adaptive system 100. Hence, the combination of the price discovery function 2150 and the adaptive system 100 can constitute a "closed" loop adaptive pricing function that applies insights on process participant 200 behaviors 920 to adjust pricing. In some embodiments, the price discovery function 2150 may apply the methods and systems described in U.S. Provisional Patent Application Ser. No. 60/652,578, entitled "Adaptive Decision Process."

The adaptive price discovery function 2150 may employ price discovery and pricing methods other than setting a fixed price for a product or service. For example, the function 2150 may apply a bidding processes in which multiple process participants 200 bid on the product or service, or other collective price formation that utilize direct or indirect interactions among process participants 200.

The adaptive price discovery function 2150 may utilize other supplier contextual information to establish prices. This information may be accessed directly from the commerce contextualization function (not shown), or from 2152 the adaptive recommendations function 240. This information may include the associated inventory level, production cost, production plan, and/or other supply chain considerations that may be relevant in establishing price levels for a product or service.

This adaptive pricing approach of the adaptive process 900F may be particularly applicable in setting prices for collections, combinations or "bundles" of products and services that may be specific or even unique to a given customer or set of customers 200. The uniqueness of the bundle enables the provision of a maximum value-add to the customer by fine-tuning a recommended "solution" to a perceived customer need that is comprised of multiple products or services. Such a customized solution can increase the value, or economic rent, to the customer. But, the uniqueness of the bundle also decreases the ability of the customer to "comparison shop," and this reduced transparency enables the supplier to potentially capture a greater portion of the value-add of the customer. Hence, there is an opportunity for the supplier to create more value for customers and to prominently share in the increased value.

FIG. 43 depicts an adaptive process 900G, or adaptive commercial solutions process. In addition to featuring the adaptive system 100, commerce contextualization function 2100, and price discovery function 2150, the adaptive process 900G includes a product and/or service bundling function 2160 within the adaptive computer-based application 925. (A specific product/service bundle or combination may be termed a "solution.") The product/service bundling function 2160 provides information 2161*a* to the adaptive recommendations function 240 to enable adaptive recommendations 910 to include product/service bundles or solutions to process participants 200 that are expected to be relevant or compelling to the process participants 200. Likewise, the adaptive recommendations function 240 provides information 2161*b* associated with inferences on the preferences or interests of process participants or customers 200. The product/service bundling function 2160 may be applied in concert, or interact with 2162, the price discovery function 2150; together comprising a solution development and pricing process. The adaptive recommendations function 240 may combine inputs from the product/service bundling function 2160, the price discovery function 2150, and the commerce contextualization function 2100, along with information from the usage aspect 220 in generating recommendations that may include solutions and associated pricing.

The product/service bundling function 2160 may provide suggested product or service configurations 2161*a*, in addition to, or instead of, product and service bundle suggestions or options 2161*a*. The term "configurations" as used herein in conjunction with the product/service bundling function 2160 denotes a set of product or service features. For example, various product components or features may be combined on a customized basis for a specific customer or customers 200. One example is the customization of the configuration of a personal computer—a specific CPU, with specific storage devices, peripherals, monitor type, etc., may be suggested by the product/service bundling function 2160 based on information 2161*b* on inferred preferences from the adaptive recommendations function 240.

Continuing the example, the suggested customized personal computer may then be bundled by the product/service bundling function 2160 with a digital camera and a special warranty that encompasses both the personal computer and the camera. This bundle of products and services may then be specially priced by the price discovery function 2150, with the entire bundle of products and services, the configurations of the products and services, and bundle pricing being informed by the inferred preferences and interests of process participants (customers) 200.

The product/service bundling function 2160 and adaptive price discovery function 2150 may be applied together to create a bidding process for product/service bundles. The product/service bundling function 2160 may generate bundles or solutions applicable to multiple process participants 200, and the adaptive price discovery function 2150 is used to organize and manage the bids. The adaptive computer-based application 925 may use the adaptive system 100 and the product/service bundling function 2160 to determine the best mix of bundles and process participants to maximize the value of the auction.

The product/service bundling function 2160 and adaptive price discovery function 2150 may utilize other supplier contextual information to establish solutions and associated prices. This information may be accessed directly from the commerce contextualization function (not explicitly shown in FIG. 43), or indirectly from 2152, 2161b the adaptive recommendations function 240. This supplier contextual information may include the associated inventory level, production cost, production plan, and/or other supply chain considerations that may be relevant in establishing price levels for one or more products or services, and/or configurations thereof.

Location-Aware Adaptive Sales and Marketing

Recall from Table 1 that process participant behaviors 920 may include behaviors associated with physical location, and the movement among physical locations, of process participants 200. According to some embodiments, the adaptive process 900 may be applied to enable sales or procurement-related processes in which the sales processes of a potential supplier monitor physical locations of potential customers 200 and deliver adaptive recommendations 910 that are appropriately contextualized for the customer's location, or location history. Further, the customers or potential customers 200 may themselves employ systems that interact at varying levels of interaction and cooperation with the supplier's sales processes. Where both the supplier and the potential customers employ adaptive recombinant processes and the potential customer and/or the potential supplier is mobile, a location-aware collectively adaptive system and associated location-aware collectively adaptive commercial process 900H is enabled FIG. 44 depicts a location-aware collectively adaptive process 900H, including a location-aware collectively adaptive system 2200. Four separate instances of adaptive computer applications within system 2200 are shown; each instance corresponds to an instance of the adaptive computer-based application 925 of FIGS. 4A and 4B. Two of the instances are mobile adaptive computer applications; a first mobile adaptive computer-based application 925m1, and a second mobile adaptive computer-based application 925m2. Two of the instances are stationary adaptive computer applications, a first stationary adaptive computer-based application 925s1, and a second stationary adaptive computer-based application 925s2. Each of the adaptive computer-based application instances may interact with any of the other instances, as depicted by the flow of information 2210 between the first stationary adaptive computer-based application instance 925s1 and the first mobile adaptive computer-based application instance 925m1.

The information flow 2210 between any two adaptive computer-based application instances of the location-aware collectively adaptive system 2200 may include the following:

1) Polling and detection of a second adaptive computer-based application instance by a first adaptive computer-based application instance.
2) Identifying the detected second adaptive computer-based application instance by the first adaptive computer-based application instance.
3) Determining a mutual contextual basis for further interaction—that is, either a) from the potentially supplier-side adaptive computer-based application instance, determining whether the potential receiving or customer-side adaptive computer-based application instance encompasses a customer context or set of inferred preferences or interests that would enable one or more relevant recommendations 910 to be generated for the process participants 200 of the customer-side adaptive computer-based application instance; or b) from the potentially receiving or customer-side adaptive computer-based application instance, determining whether the supplier-side adaptive computer-based application instance encompasses a supplier context and product or service attributes that would enable an expected one or more relevant recommendations 910 to be generated for the process participants 200 of the customer-side adaptive computer-based application instance. This determination of a mutual contextual basis for further interaction may be made by one or the other, or both instances.

4) Receiving from, or supplying to, the second adaptive computer-based application instance contextualized information that enables either a) the adaptive recommendations 910 of the first adaptive computer-based application instance to selectively utilize the contextualized information of the second adaptive computer-based application instance; or b) enables the adaptive recommendations 910 of the second adaptive computer-based application instance to selectively utilize the contextualized information of the first adaptive computer-based application instance.

It should be noted that the interactions 2210 may occur between any two adaptive computer-based applications 925. For example, the interactions 2210 may be between two stationary adaptive computer-based application instances, such as the information flow 2250 between instance 925s1 and instance 925s2. Or the information flow 2230 may be between two mobile adaptive computer application instances, such as instance 925m1 and instance 925m2. Finally, the interactions 2220 may be between a stationary adaptive computer-based application instance 925s1 and a mobile adaptive computer-based application instance 925m2.

Figure 45:
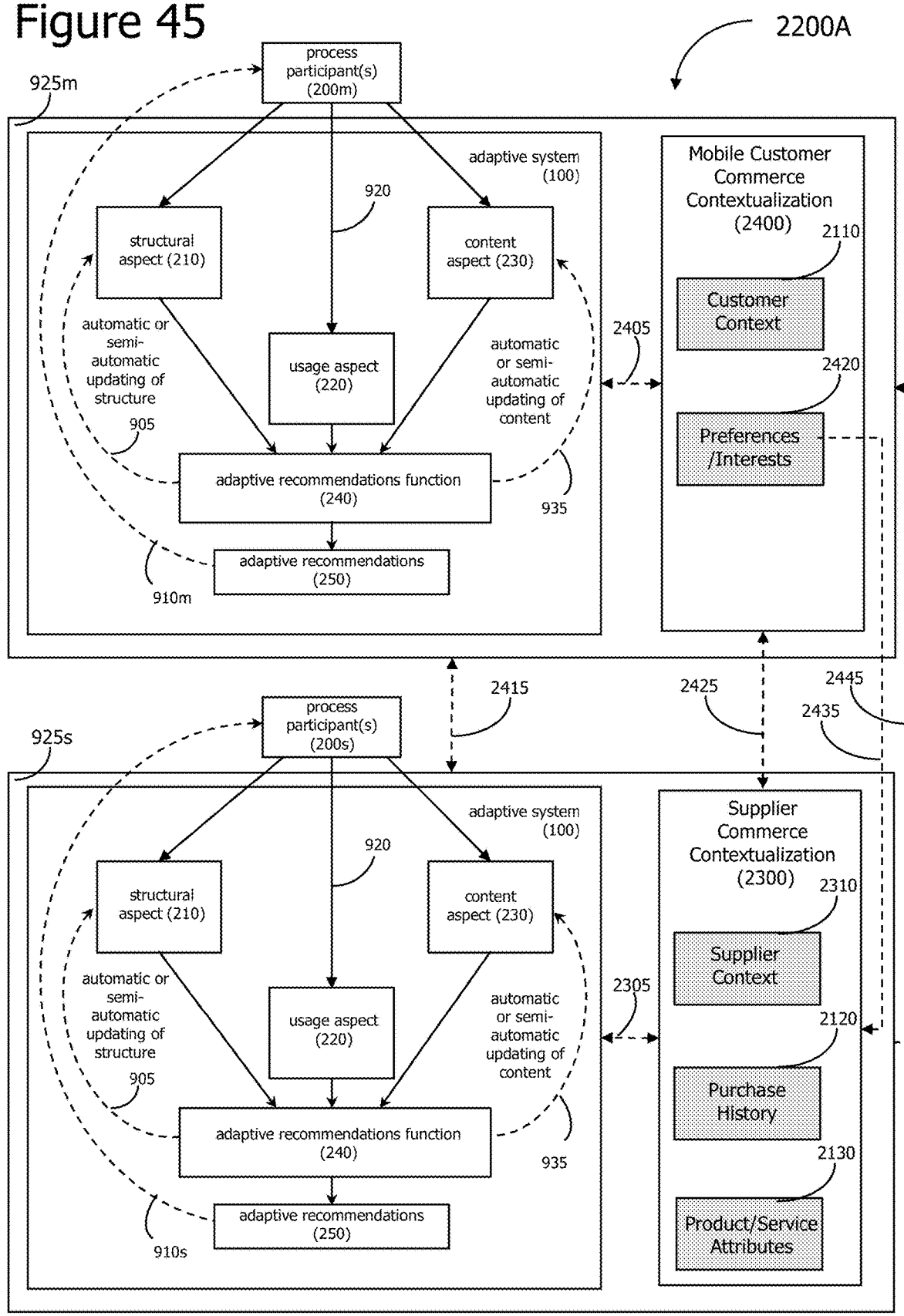
FIG. 45 is a block diagram of a possible configuration of the location aware collectively adaptive systems of FIG. 44, according to some embodiments.
Figure 46:
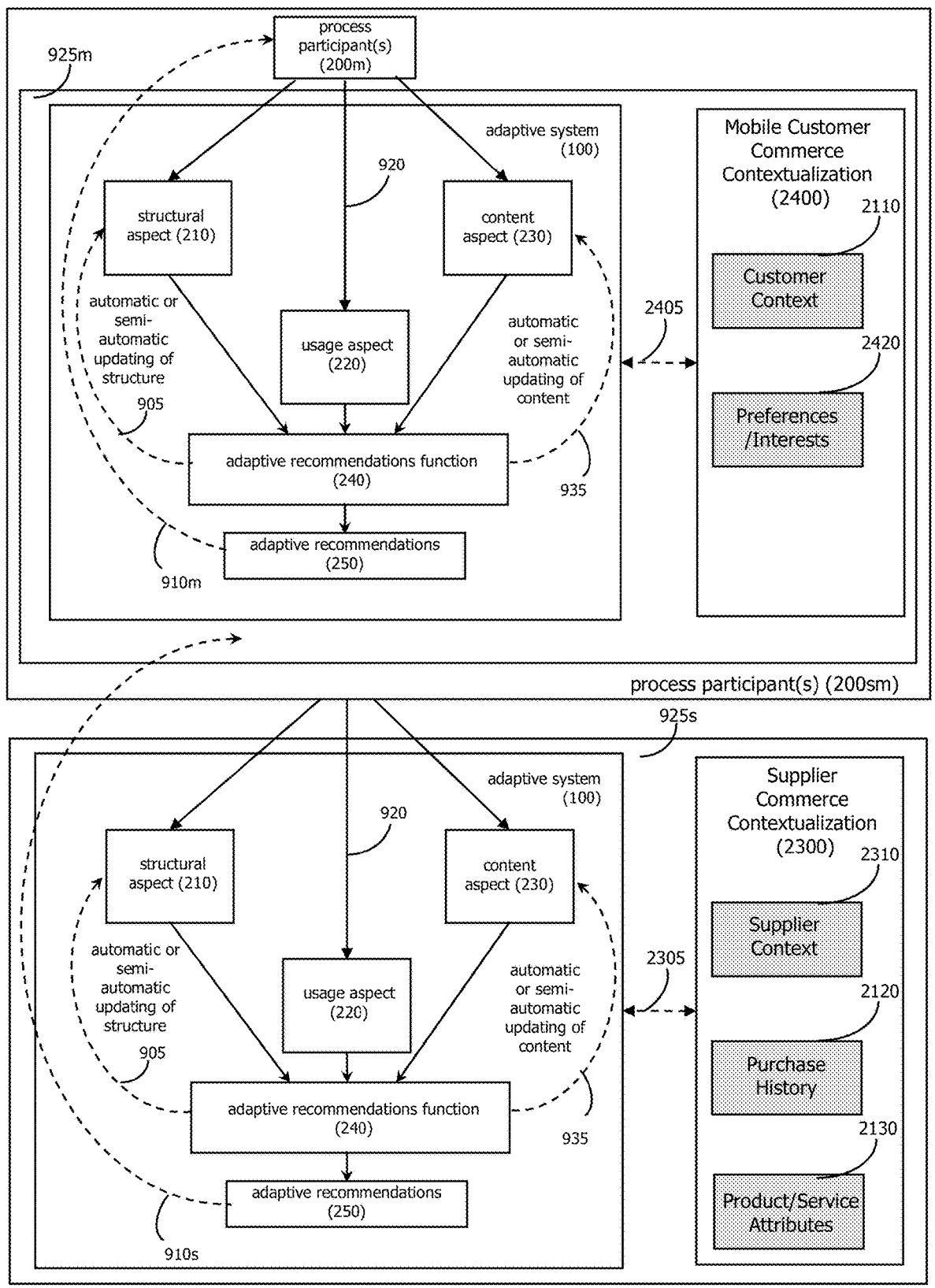
FIG. 46 is a block diagram of an alternative configuration of the location aware collectively adaptive systems of FIG. 45, according to some embodiments.

According to some embodiments, FIGS. 45 and 46 depict two examples of location-aware collectively adaptive systems 2200. FIG. 45 (2200A) provides additional details regarding the constituent adaptive computer application instances, and the interactions among the instances, of the location-aware collectively adaptive system 2200 of FIG. 44. A stationary adaptive computer application instance 925s includes an adaptive system 100 and a supplier commerce contextualization function 2300 (see FIG. 43). The supplier commerce contextualization function 2300 is comprised of one or more of 1) a supplier context function 2310, 2) a purchase history function 2120, and 3) a product and service attribute function 2130. Although not shown in FIG. 45, the supplier commerce contextualization function 2300 may also include a customer context function 2110. The supplier context function 2310 includes contextual information about the potential supplier that is utilizing or applying the adaptive computer-based application instance 925s, that is not contained in product and service attributes function 2130. For example, supplier context function 2310 may include the physical location of the supplier, the hours of business, the history of the business, and any other information that may be relevant to a customer or prospective customer. The adaptive system 100 of the adaptive computer-based application 925s interacts 2305 with the supplier commerce contextualization function 2300, as desired, to deliver effective adaptive recommendations 910s to process participants 200s.

The stationary adaptive computer-based application instance 925s interacts 2415 with the mobile adaptive computer-based application instance 925m. The mobile adaptive computer-based application instance 925m includes an adaptive system 100 and a mobile customer commerce contextualization function 2400. The mobile customer commerce contextualization function 2400 includes one or both of a 1)

customer context function 2110 and 2) a preferences and interests function 2420. The preferences and interests function 2420 contains inferred preferences and interests of process participants 200*m* based on their interactions with adaptive system 100.

The stationary adaptive computer-based application instance 925*s* initially interacts 2415 with the mobile adaptive computer-based application instance 925*m* through an initial detection by one or the other of the instances, or through mutual detection. Next, an interaction 2425 is invoked that seeks to establish a basis for commercial interaction between the two instances. Information from mobile customer commerce contextualization function 2400 is compared to information in the supplier commerce contextualization function 2300. So for example, a service station employing instance 925*s* detecting a mobile process participant 200*m* that is a child riding a bicycle is unlikely to have a basis for initiating a commercial interaction, and therefore interactions would cease, whereas if the mobile process participant 200*m* was a truck driver driving a truck that was due for service, then a basis for commercial interaction may exist.

The adaptive computer-based application instances 925*s*, 925*m* may apply location information, or inferences derived from location and time, in establishing a context for commercial interaction or for generation of adaptive recommendations within the location-aware collectively adaptive system 2200. The adaptive computer-based application instances 925*s*, 925*m* may utilize geographic-related context or information such as through access to digitized maps in making inferences from location and time information associated with process participants 200.

For example, the respective physical locations of two or more instances may be a determinant of a basis for commercial interaction or for generating adaptive recommendations. The prospective customer or prospective supplier may have thresholds of distance that may be applied to determine a basis for commercial interaction. This threshold distance may be in absolute terms, or in terms of expected transit time between a mobile adaptive computer-based instance and a stationary instance or another mobile instance. Inferred direction and speed of a mobile instance may be calculated and used as input to establishing context for commercial interaction or for generating adaptive recommendations. Further, the inferred mode of transportation of the mobile process participant 200 may be a determinant for commercial interaction or generation of recommendations, as such information may affect the expected transit time or ease of access to the supplier.

Assuming that a basis for commercial interaction is established, a next level of interaction 2435 may be established between the two instances 925*m*, 925*s*. The preferences and interests 2420 of the mobile adaptive computer-based instance 925*m* are accessed by the stationary adaptive computer-based instance 925*s* to determine if there is a basis for providing suggested products or services to the mobile adaptive computer instance 925*m*. If the supplier commerce contextualization function 2300 determines that there is a basis for suggesting or recommending products, then these are transmitted 2445 to mobile adaptive computer application instance 925*m*.

The suggested products or services 2445 are incorporated by the adaptive recommendations function 240 of the adaptive system 100 of mobile adaptive computer-based application 925*m* in generating recommendations 910*m* to process participants 200*m*.

FIG. 46 (2200B) illustrates that the mobile adaptive computer-based application instance 925*m*, along with the associated process participants 200*m*, may be considered the process participants 200*sm* of the stationary adaptive computer-based application instance 925*s*. The interactions described in FIG. 45 are conducted through the process participant behaviors 920 transmission to the instance 925*s*, and through the adaptive recommendations 910*s* generated by instance 925*s* and received by process participants 200*sm*. Although in FIG. 46, the respective adaptive application instances 925*s*, 925*m* are stationary and mobile, respectively, it should be understood that the example may be reversed, or two stationary or two mobile instances may utilize the same topology for interactions, as depicted in FIG. 46.

The location-aware collectively adaptive system 2200 and process 900H (FIG. 44) may be applied to a variety of sales and procurement process areas. For example, restaurants can apply such processes by providing prospective diners that are in the vicinity of relevant recommended options, tuned to the prospective diner's particular preferences and tastes.

The location-aware collectively adaptive system 2200 and process 900H may further apply the adaptive price discovery systems and processes of FIG. 42 or the adaptive commercial solutions systems and process of FIG. 43.

A mobile adaptive computer application instance 82*bm*1 may be embodied within a portable computing device, such as a mobile phone or personal digital assistant (PDA). A mobile adaptive computer application instance 82*bm*1 may be contained in mobile apparatus, such as vehicles or other transportation devices. In some embodiments, a mobile adaptive computer application instance 82*bm*1 may reside within a self-propelled device or appliance.

Adaptive Viral Marketing

In the prior art, viral marketing techniques are known that promote the initial recipients of a sales or marketing-related message to re-send the message to others. For example, viral marketing through e-mail messages is a familiar technique. However, prior art viral marketing techniques exhibit two significant limitations: 1) there is little ability for a recipient to easily modify the received message for the benefit of others he or she will re-send the message to, and 2) the structure of the message is typically a single item of information embodied in a single computer file (such as a e-mail message, or a text document).

According to some embodiments, an application of adaptive recombinant process 901, adaptive recombinant process 901B, may be used to advantageously transform customer relationships, promote sales, facilitate business development, enhance public relations or generally increase "share of mind." In contrast to the prior art, through the application adaptive recombinant process 901B, content networks or process networks comprising multiple units of interconnected information may be syndicated to potential customers or individuals or institutions for whom influence is sought. The content or process networks may then be syndicated to the customer's customers or influence targets, and so on, potentially without limit. At each stage of syndication and receipt, one or more content or process networks may be modified or combined, optionally enabled by an adaptive recommendations function 240. The content within the syndicated content networks may be substantive or non-substantive (e.g., advertising or promotional content). This application of adaptive recombinant process 901B provides a much more powerful and comprehensive approach to viral marketing and public relations than is possible with prior art approaches.

Figure 47:
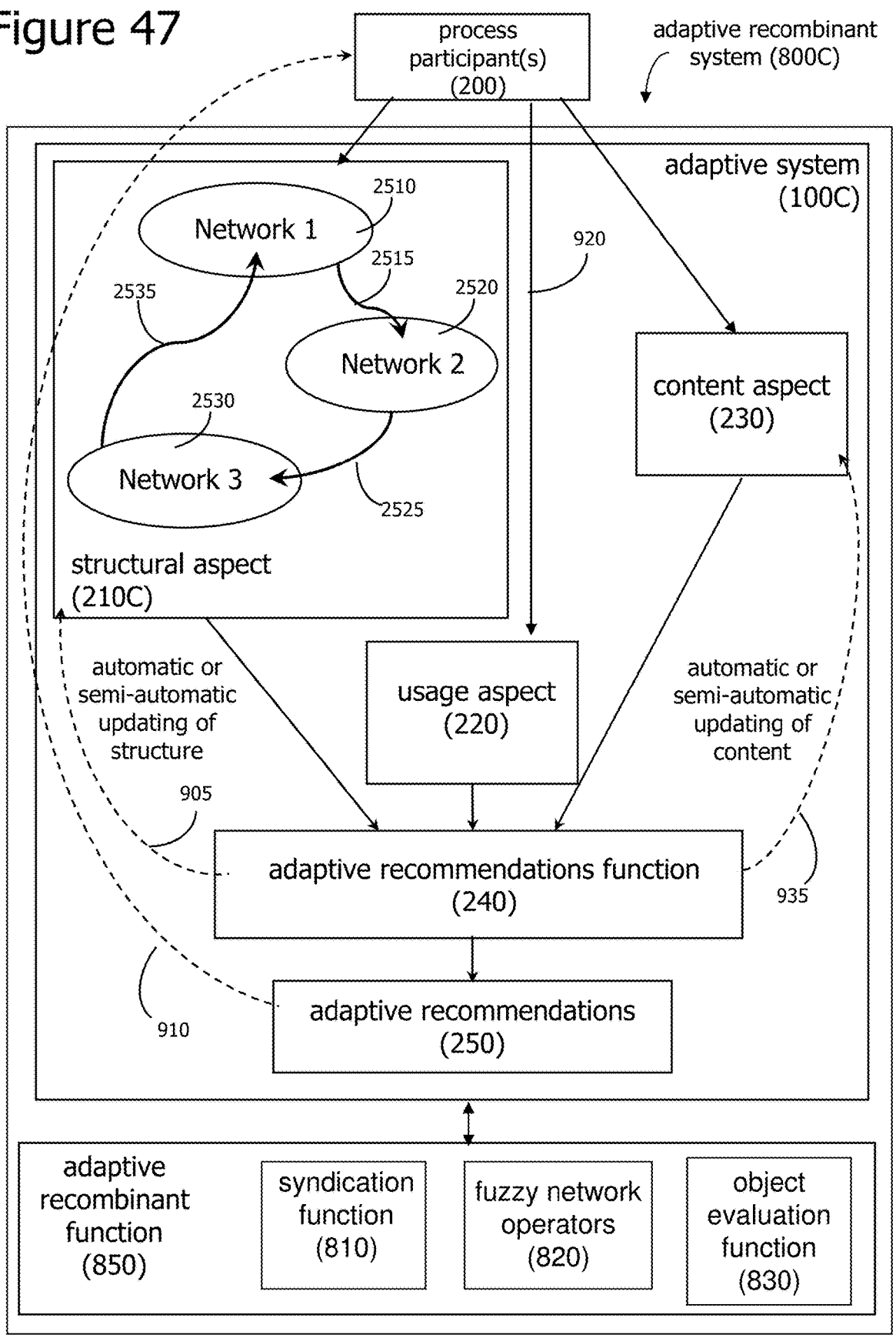
FIG. 47 is a block diagram of syndication and combination of content networks within the structural aspect of the adaptive recombinant system of FIG. 16, according to some embodiments.

FIG. 47 illustrates an adaptive recombinant systems construct to manage syndication and recombination of network structures for a variety of process purposes, including enabling adaptive viral marketing process 901B. Recall from FIGS. 16 and 17 that the adaptive recombinant computer-based application 925R may include the adaptive recombinant system 800C, which in turn, may encompass the adaptive system 100C (FIG. 14). In the embodiment of FIG. 47, the adaptive system 100C manages multiple networks within the structural aspect 210C. These networks may be content networks or process networks, and may be fuzzy networks. For example, some or all of "network 1" 2510 may be syndicated 2515 to "network 2" 2520 and combined, followed by some or all of the resulting network combination syndicated 2525 to "network 3" 2530 and combined with "network 3" 2520. A closed loop may be formed, as some or all of this last network combination may be syndicated 2535 back to the original "network 1" 2510 and combined with "network 1" 2510. This process may continue indefinitely. At each stage, it should be understood that a network may be syndicated to a recipient that does not possess a network. Such a recipient may nevertheless modify the network and re-syndicate. For each stage, the selection, syndication, modification, or combination is enabled by the functions of the adaptive recombinant system 800C, as described previously. Thus, the adaptive recommendations function 240 may be applied to facilitate these syndications, modifications, and combinations based, in part, on inferences of preferences and interests from the usage behaviors 920 of process participants 200.

Figure 48:
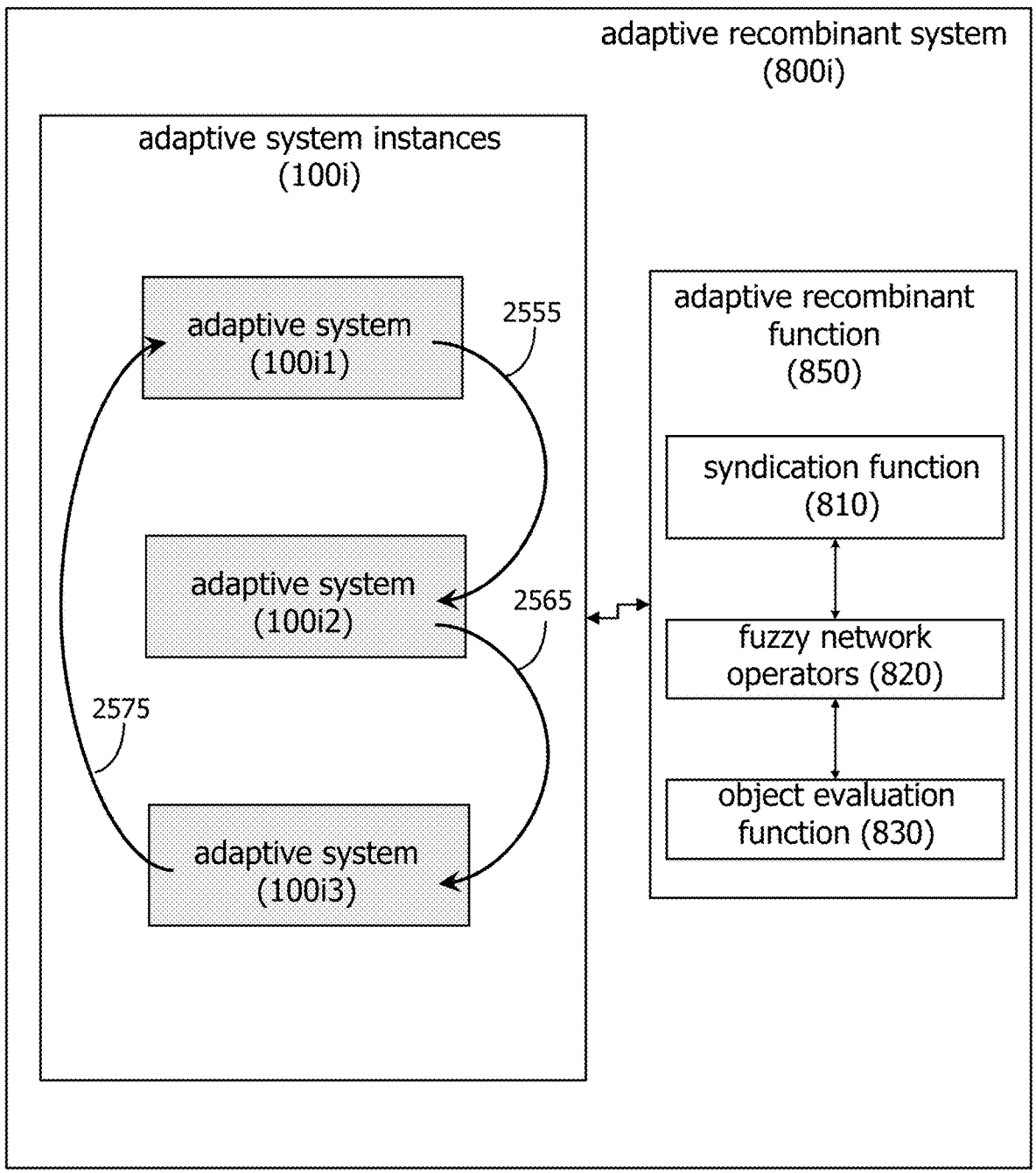
FIG. 48 is a block diagram of syndication and combination of elements of the structural aspects and usage aspects across multiple instances of adaptive systems of FIG. 7 within the adaptive recombinant system of FIG. 16, according to some embodiments.

FIG. 48 illustrates an alternative adaptive recombinant systems construct using an adaptive recombinant system 800*i* to manage syndication and recombination of network structures for a variety of process purposes, including enabling adaptive viral marketing process 901B. Adaptive recombinant system 800*i* includes multiple instances of adaptive system 100*i*. Although not shown in FIG. 48, each adaptive system instance, such as adaptive system 100*i*1, may have its own independent set of process participants 200, or the process participants 200 of each adaptive system instance may overlap.

In the embodiment of FIG. 48, each adaptive system instance 100*i* manages one or more networks within its structural aspect 210 (not shown). These networks may be content networks or process networks, and may be fuzzy networks. As an example, some or all of the structural aspect and/or usage aspect of the first adaptive system instance 100*i*1 may be syndicated 2555 to a second adaptive system instance 100*i*2, and the structural and/or usage aspects optionally combined. Some or all of the structural and/or usage aspects of the second adaptive system instance 100*i*2 may then be syndicated 2565 to a third adaptive system instance 100*i*3, and the structural and/or usage aspects optionally combined. A closed loop may be formed, as some or all of the structural and/or usage aspects of the third adaptive system instance 100*i*3 may be syndicated 2575 back to the original adaptive system instance 100*i*1.

Thus, the process of syndication, modification, and combination may continue indefinitely. At each stage, it should be understood that an entire adaptive system instance 100*i* may be syndicated to a recipient that does not have access to the adaptive system instance 800*i*1. And at each stage, the selection, syndication, modification, or combination is enabled by the functions of the adaptive recombinant system 800, as described previously. Thus, the adaptive recommendations function 240 of each adaptive system instance 100*i* may be applied to facilitate these syndications, modifications, and combinations based, in part, on inferences of preferences and interests from usage behaviors 920 of process participants 200.

The systems and methods described in FIG. 47 and FIG. 48 may be applied to enabling adaptive viral marketing process 901B, in some embodiments, as depicted in FIGS. 49A and 49B. In FIGS. 49A and 49B, the syndication and recombination of content networks across organization are described. It should be understood that the content networks described may or may not be fuzzy networks, and may or may not be process networks. It should also be understood that the networks may include usage behavioral information associated with the usage aspect 220, in addition to, or instead of content networks associated with structural aspect 210c of the adaptive system 100. Further, although the syndication is to "organizations," it should be understood that the term as used herein may include a single person.

FIG. 49A depicts a the selection or sub-setting of content network "network 1" 2735 residing in "organization 1" 2650 to form "network 1*a*" 2695. "Network 1*a*" 2695 may contain substantive or non-substantive information (such as advertising or promotional content), and is syndicated to "organization 2" 2655 for the purposes of either direct promotion, with an option for indirect promotion through re-syndication by "organization 2" 2655; or the syndication to "organization 2" 2655 may be for the primary or sole purpose of indirect promotion through "organization 2's" 2655 expected re-syndication of the network.

In this example, "network 1*a*" 2700 and the existing "network 2" 2705 in "organization 2" are combined 2710 to form "network 2*a*" 2715 in "organization 2" 2655. This combination may be either for the direct benefit of "organization 2" 2655, or the purposes of continuing the chain of promotion through re-syndication of a network of substantive and/or non-substantive information that is expected to be increasingly valuable to each new generation of recipients.

Continuing the example, "network 2*a*" 2715 is then syndicated to "organization 3" 2660, wherein "organization 3" 2660 does not already possess or have access to a content network.

FIG. 49B represents a continuation of FIG. 49A to depict the potentially closed-loop aspect of the adaptive viral marketing process. "Network 2*a*" 2725 in "organization 3" 2660 is syndicated to "organization 1" 2655. "Network 2*a*" 2725 is then combined with the original "network 1" 2735 in "organization 1" 2650 to generate "network 3" 2740 in "organization 1" 2650.

FIGS. 49A and 49B demonstrate that, in some embodiments, the adaptive recombinant process 901B may, without limit, enable sub-setting of networks of substantive and/or non-substantive information, syndicating the subsets to one or more destinations, and enabling the syndicated networks to be combined with one or more process networks at the destinations. At each combination step, functions of adaptive recombinant system 800C may be applied, including the relationship resolution functions and the adaptive recommendations function, to create and update process structure (and content) as appropriate. The participants 200 in the adaptive viral marketing process may or may not be directly conscious of playing a role in marketing or promotion.

As a specific example of the economics of viral marketing, the originator of the adaptive viral marketing process 901B may supply a product or service for which there are complementary products or services; by complementary, it is meant that the supplier can sell more of its product or services to a customer if the customer has access to, or can purchase, the complementary products or services. So, for example, commentary by other process participants, particularly process participants with special expertise of relevant reputation, may be a complement to selling a tangible or intangible product, such as a video. Through the initiation of the viral marketing approach, delivery or targeted, complementary commentary may be efficiently achieved that could stimulate greater demand for the video itself.

The adaptive viral marketing process 901B of FIGS. 49A and 49B may also apply methods associated with location-aware collectively adaptive system 2200 and process 900H, and may further apply the systems and methods of the adaptive commercial solutions process (900G) depicted in FIG. 43.

Evolvable Processes

According to some embodiments, the adaptive recombinant process 901 may be used to deploy an evolvable process 901E across one or more organizations or environments. FIG. 50 depicts an embodiment of the adaptive recombinant computer-based application 925R of FIG. 4C, which includes an evolvable adaptive recombinant system 800e, which itself includes the adaptive recombinant function 850. The adaptive recombinant function 850 in turn includes a syndication function 810, a fuzzy network operators function 820, and an object evaluation function 830, all of which were described previously. The evolvable adaptive recombinant system 800e also contains one or more instances 100i of the adaptive system 100. Process participants 200 generate process usage behaviors 920 that are tracked and processed by the one or more adaptive system instances 800i. In addition, the evolvable adaptive recombinant system 800e contains a network evaluation function 860, which is used to evaluate the "fitness" of one or more content networks, which may include process networks, and works in concert 2905 with the adaptive recombinant function 850 to generate new generations of content networks from a previous generation of content networks deemed to be most fit by the network evaluation function 860.

Recall from FIG. 47 that an instance of the adaptive system 100 may contain multiple content networks. The network evaluation function 860 may evaluate 2915 one or more networks within an adaptive system instance 100i3. The adaptive recombinant function 850 may then be applied to create a new generation of recombinant content networks within the adaptive system instance 100i3, based on the individual fitness of the previous generation of content networks.

Alternatively, the network evaluation function 860 may evaluate 2935 content networks across adaptive systems instances 100i. The adaptive recombinant function 850 may then be applied to create a new generation of recombinant content networks across adaptive system instances 100i, based on the individual fitness of the previous generation of content networks across system instances 100i.

The network evaluation function 860 may apply criteria derived from inferences on preferences and interests of usage behaviors 920 of process participants 200. These criteria may be augmented by additional evaluation criteria and logic as required.

The adaptive recombinant function 850 may generate new generations of content networks based on purely the inheritance of characteristics derived from combinations of previous generations of content networks (Lamarkian approach to network evolution), and/or the adaptive recombinant function 850 may apply random changes to the content networks, so as to create network mutations, which, in turn, increases network variation (Darwinian approach to network evolution). Genetic algorithms may be applied to generate network mutations and combinations.

Evolvable adaptive recombinant system 800e can therefore enable the evolvable process 901E, which can serve as a means of accelerating the development of the most adaptive possible processes for a given organizational environment.

Computing Infrastructure

Figure 51:
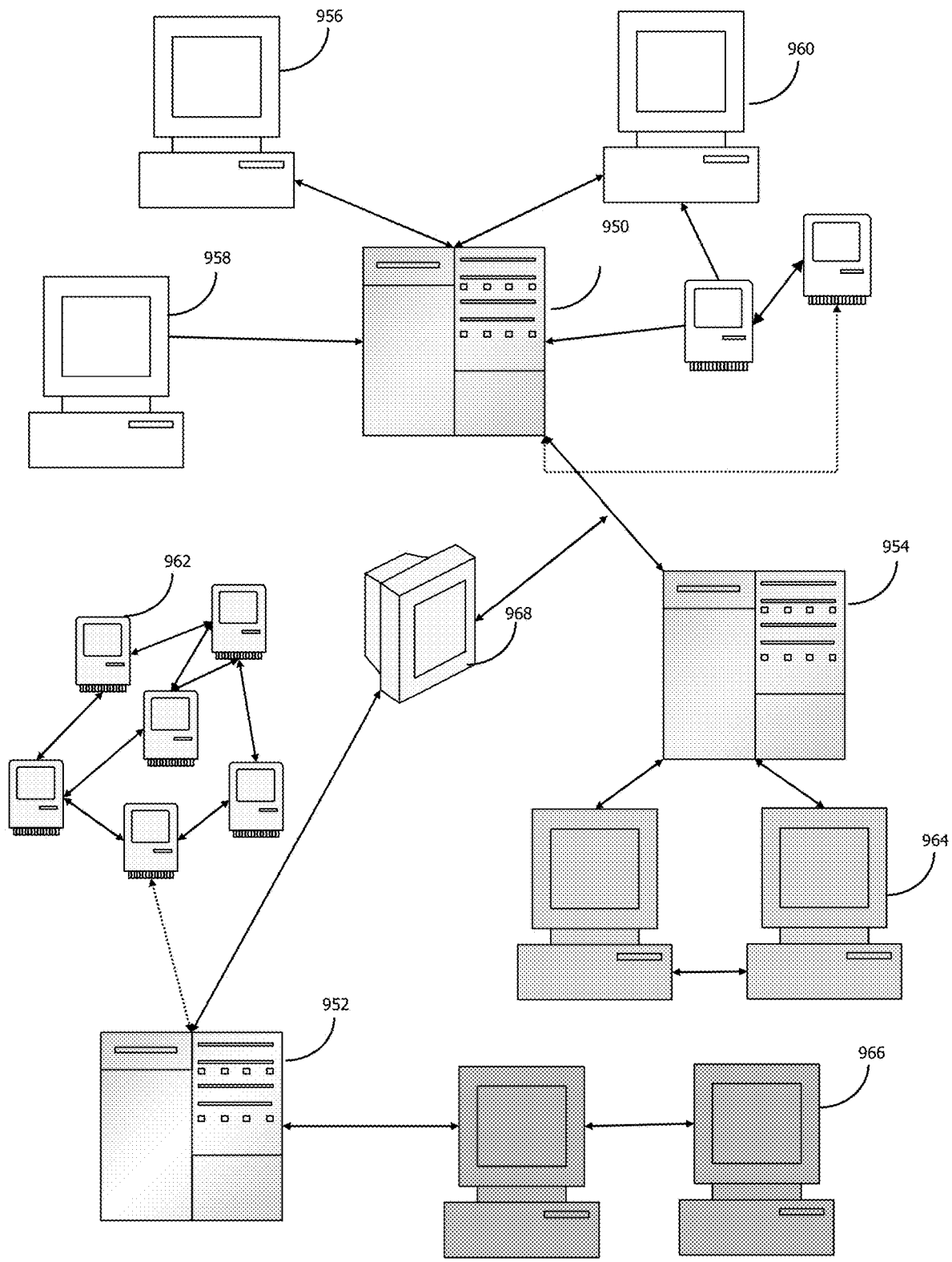
FIG. 51 is a diagram of alternative computing topologies of adaptive recombinant processes, according to some embodiments.

FIG. 51 depicts various hardware topologies that the adaptive process 900, the adaptive recombinant process 901, the adaptive computer-based application 925, the adaptive recombinant computer-based application 925R, the adaptive system 100, or the adaptive recombinant system 800 may embody. Further, the adaptive asset management process 900A, the adaptive real-time learning process 900B, the innovation network process 900C, the adaptive publishing process 900D, the adaptive commerce process 900E, the adaptive price discovery process 900F, the adaptive commercial solutions process 900G, the location-aware collectively adaptive process 900H, the recombinant process network process 901A, the adaptive viral marketing process 901B, the evolvable process 901E, or other applications of the adaptive process 900 or adaptive recombinant process 901 not described herein may utilize the hardware and computing topologies of FIG. 51. These various systems are referred to as the "relevant systems," below.

Servers 950, 952, and 954 are shown, perhaps residing at different physical locations, and potentially belonging to different organizations or individuals. A standard PC workstation 956 is connected to the server in a contemporary fashion. In this instance, the relevant systems, in part or as a whole, may reside on the server 950, but may be accessed by the workstation 956. A terminal or display-only device 958 and a workstation setup 960 are also shown. The PC workstation 956 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 51 also features a network of wireless or other portable devices 962. The relevant systems may reside, in part or as a whole, on all of the devices 962, periodically or continuously communicating with the central server 952, as required. A workstation 964 connected in a peer-to-peer fashion with a plurality of other computers is also shown. In this computing topology, the relevant systems, as a whole or in part, may reside on each of the peer computers 964.

Computing system 966 represents a PC or other computing system, which connects through a gateway or other host in order to access the server 952 on which the relevant systems, in part or as a whole, reside. An appliance 968, includes software "hardwired" into a physical device, or may utilize software running on another system that does not itself host the relevant systems. The appliance 968 is able to access a computing system that hosts an instance of one of the relevant systems, such as the server 952, and is able to interact with the instance of the system.

The relevant systems may utilize database management systems, including relational database management systems, to manage to manage associated data and information, including objects and/or relationships among objects. The relevant systems may apply intelligent "swarm" peer-to-peer file sharing techniques to facilitate the syndication of large networks of content, by enabling a plurality of peer computing devices to collectively serve as file servers, thus acting to de-bottleneck the sharing of large networks of information. Further, adaptive recombinant processes may apply intelligent swarm peer-to-peer sharing to the entire network of information (objects and relationships) that is to be syndicated, rather than just individual files. The relevant systems may apply special algorithms to optimally syndicate elements of one or more networks of information across a plurality of peer computing devices to enable the collective set of peer computing devices to be utilized as servers in a manner to enable the most efficient syndication of large-scale networks of information.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A method comprising:
accessing through execution of a computer-implemented function on a processor-based device a plurality of usage behaviors that are performed through a first user's use of a portable processor-based device;
identifying a physical location of a second user, wherein the physical location of the second user is automatically inferred from information provided by a global positioning system (GPS) receiver;
delivering to the first user through execution of a computer-implemented function on a processor-based device a plurality of objects that are arranged in a temporal sequence, wherein at least two of the plurality of objects comprise user activities, wherein one of the at least two user activities comprises a reference to the physical location of the second user, and wherein the plurality of objects are selected for delivery to the first user in accordance with an inference of a preference based, at least in part, on a plurality of inference weightings that are determined in accordance with usage behavior priority rules that are applied to the plurality of usage behaviors; and
delivering to the first user the plurality of objects, wherein the plurality of objects are selected for delivery to the first user in accordance with the inference of the preference, wherein the inference of the preference is based, at least in part, on a computer-implemented structural aspect comprising a plurality of affinities among a plurality of computer-implemented objects, wherein the plurality of affinities are generated based on usage behaviors associated with a plurality of users.

2. A method comprising:
accessing through execution of a computer-implemented function on a processor-based device a plurality of usage behaviors that are performed through a first user's use of a portable processor-based device;
identifying a physical location of a second user, wherein the physical location of the second user is automatically inferred from information provided by a global positioning system (GPS) receiver;
delivering to the first user through execution of a computer-implemented function on a processor-based device a plurality of objects that are arranged in a temporal sequence, wherein at least two of the plurality of objects comprise user activities, wherein one of the at least two user activities comprises a reference to the physical location of the second user, and wherein the plurality of objects are selected for delivery to the first user in accordance with a computer-implemented structural aspect comprising a plurality of affinities among a plurality of computer-implemented objects, wherein the plurality of affinities are generated based on the plurality of usage behaviors and the plurality of objects are further selected in accordance with an inference of a preference based, at least in part, on a plurality of inference weightings that are determined in accordance with usage behavior priority rules that are applied to the plurality of usage behaviors; and
delivering to the first user the plurality of objects, wherein at least one object of the plurality of objects comprises an activity performed by a processor-based device.

3. A device comprising:
a processor configured to enable a first user to contribute a plurality of usage behaviors to a computer-implemented usage function;
a processor configured to identify a physical location of a second user, wherein the physical location of the second user is automatically inferred from information provided by a global positioning system (GPS) receiver;
a processor configured to enable the first user to interact with a plurality of objects that are delivered to the first user arranged in a temporal sequence, wherein at least two of the plurality of objects comprise user activities, wherein one of the at least two user activities comprises a reference to the physical location of the second user, and wherein the plurality of objects are selected for delivery to the first user in accordance with a computer-implemented structural aspect comprising a plurality of affinities among a plurality of computer-implemented objects, wherein the plurality of affinities are generated based on the plurality of usage behaviors and the plurality of objects are further selected in accordance with an inference of a preference based, at least in part, on a plurality of inference weightings that are determined in accordance with usage behavior priority rules that are applied to the plurality of usage behaviors; and
the processor configured to enable the first user to interact with the plurality of objects, wherein the interaction comprises a performance of a gesture.

4. A device comprising:
a processor configured to enable a first user to contribute a plurality of usage behaviors to a computer-implemented usage function;
a processor configured to identify a physical location of a second user, wherein the physical location of the second user is automatically inferred from information provided by a global positioning system (GPS) receiver;
a processor configured to enable the first user to interact with a plurality of objects that are delivered to the first user arranged in a temporal sequence, wherein at least two of the plurality of objects comprise user activities, wherein one of the at least two user activities comprises a reference to the physical location of the second user, and wherein the plurality of objects are selected for delivery to the first user in accordance with a computer-implemented structural aspect comprising a plurality of affinities among a plurality of computer-implemented objects, wherein the plurality of affinities are generated based on the plurality of usage behaviors and the plurality of objects are further selected in accordance with an inference of a preference based, at least in part, on a plurality of inference weightings that are determined in accordance with usage behavior priority rules that are applied to the plurality of usage behaviors; and the processor configured to enable the first user to interact with the plurality of objects, wherein the interaction comprises an audio-based communication.

\* \* \* \* \*